(12) United States Patent
Kaneko et al.

(10) Patent No.: US 9,387,641 B2
(45) Date of Patent: Jul. 12, 2016

(54) SOLID-LIQUID SEPARATION DEVICE

(75) Inventors: Kazuo Kaneko, Yokohama (JP); Yusuke Tezuka, Yokohama (JP); Yoshitaka Nakamura, Yokohama (JP); Yuki Kadowaki, Yokohama (JP); Hirokazu Kobayashi, Yamato (JP)

(73) Assignees: AMUKON KABUSHIKI KAISHA, Yokohama-shi (JP); AMCON NA, INC., Los Angeles, CA (US)

( * ) Notice: Subject to any disclaimer, the term of this patent is extended or adjusted under 35 U.S.C. 154(b) by 614 days.

(21) Appl. No.: 13/699,500

(22) PCT Filed: Jan. 17, 2012

(86) PCT No.: PCT/JP2012/000237
§ 371 (c)(1),
(2), (4) Date: Nov. 21, 2012

(87) PCT Pub. No.: WO2012/101980
PCT Pub. Date: Aug. 2, 2012

(65) Prior Publication Data
US 2013/0062268 A1    Mar. 14, 2013

(30) Foreign Application Priority Data

Jan. 24, 2011   (JP) .................................. 2011-012428
Apr. 28, 2011   (JP) .................................. 2011-102514

(51) Int. Cl.
*B01D 29/82*    (2006.01)
*B01D 29/46*    (2006.01)
(Continued)

(52) U.S. Cl.
CPC .............. *B30B 9/121* (2013.01); *B01D 25/127* (2013.01); *B01D 29/35* (2013.01); *B01D 29/46* (2013.01);
(Continued)

(58) Field of Classification Search
CPC ...... B01D 25/127; B01D 29/35; B01D 29/46; B01D 29/50; B01D 29/52; B01D 29/6469; B01D 29/6476; B01D 29/828; B01D 29/0064; B01D 33/37; B01D 33/648; B01D 33/801; B01D 35/00; B01D 35/16; B01D 33/015; B01D 33/275; B01D 33/80; B01D 29/23; B01D 29/6479; B30B 9/12; B30B 9/121; B30B 9/26; B30B 9/267; B30B 9/262; B30B 9/14; B30B 9/16
USPC .................. 210/383, 385, 396, 413, 414, 415
See application file for complete search history.

(56) References Cited

U.S. PATENT DOCUMENTS 3,802,566 A * 4/1974 Hata .................... B01D 29/118
100/117
4,419,239 A * 12/1983 Frankl .......................... 210/413
(Continued)

FOREIGN PATENT DOCUMENTS

CN          101 905 098      12/2010
EP            2314446 A2 *   4/2011
(Continued)

*Primary Examiner* — David C Mellon
(74) *Attorney, Agent, or Firm* — Davidson, Davidson & Kappel, LLC

(57) ABSTRACT

A solid-liquid separation device includes a plurality of fixed members and movable members that are movably disposed between the adjacent fixed members, and a screw extending through the fixed members and the movable members in a state where the screw is not in contact with the fixed members and the movable members. The screw is rotationally driven about a center axis line thereof. A filtrate separated from an object is discharged to the outside of the solid-liquid separation portion through filtrate discharge gaps, and the object that has a reduced liquid content ratio is discharged from the outlet to the outside. In order to increase significantly a dewatering ratio, the movable members are formed to move while penetrating closer to the center axis line of the screw than an outer circumferential edge of the blade of the screw, without coming into contact with the screw.

13 Claims, 44 Drawing Sheets

(51) Int. Cl.
   *B01D 29/35* (2006.01)
   *B30B 9/14* (2006.01)
   *B30B 9/26* (2006.01)
   *B30B 9/12* (2006.01)
   *B01D 29/52* (2006.01)
   *B01D 29/64* (2006.01)
   *B01D 25/127* (2006.01)

(52) U.S. Cl.
   CPC ............ *B01D 29/52* (2013.01); *B01D 29/6476* (2013.01); *B01D 29/828* (2013.01); *B30B 9/12* (2013.01); *B30B 9/14* (2013.01); *B30B 9/26* (2013.01)

(56) References Cited

U.S. PATENT DOCUMENTS

| | | | | |
|---|---|---|---|---|
| 4,467,717 A * | 8/1984 | Yamamoto | ................ | B30B 9/26 100/117 |
| 5,380,436 A * | 1/1995 | Sasaki | ................ | B30B 9/26 100/117 |
| 6,258,262 B1 * | 7/2001 | Katabe | ................ | B01D 29/23 100/116 |
| 6,338,411 B1 | 1/2002 | Katabe | | |
| 7,191,700 B2 * | 3/2007 | Sasaki | ................ | 100/117 |
| 7,767,173 B2 * | 8/2010 | Hamano | ................ | B01D 29/35 100/117 |
| 8,596,195 B2 * | 12/2013 | Hong | ................ | B30B 9/26 100/117 |
| 2006/0037905 A1 | 2/2006 | Sasaki | | |

FOREIGN PATENT DOCUMENTS

| | | |
|---|---|---|
| FR | 2 892 657 | 5/2007 |
| JP | 59 218 298 | 12/1984 |
| JP | 2000 135595 | 5/2000 |
| JP | 2001246500 A | 9/2001 |
| JP | 2002045997 | 2/2002 |
| JP | 3638597 B1 | 4/2005 |
| JP | 2005 230 852 | 9/2005 |
| JP | 2007 136311 | 6/2007 |
| JP | 4036383 | 6/2007 |
| JP | 4321876 B1 | 8/2009 |
| JP | 4374396 | 12/2009 |
| JP | 2010 119 898 | 6/2010 |
| JP | 2010119900 | 6/2010 |
| WO | WO 00/32292 | 6/2000 |

* cited by examiner

Fig. 12
(a)
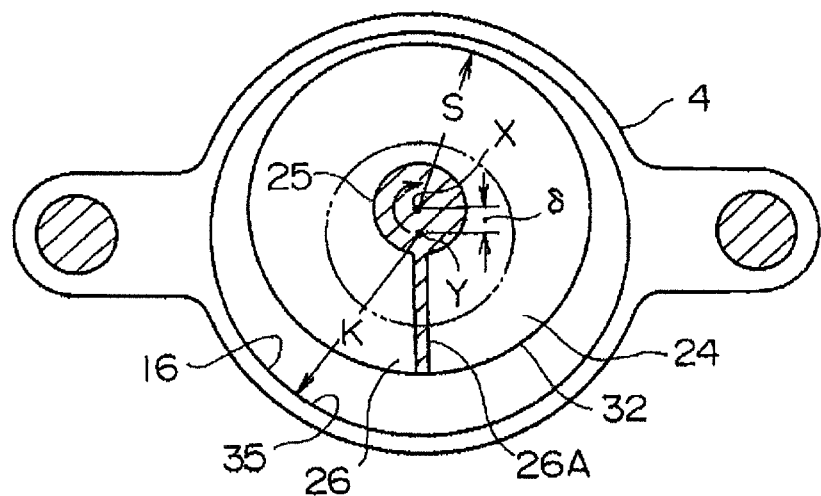
(b)
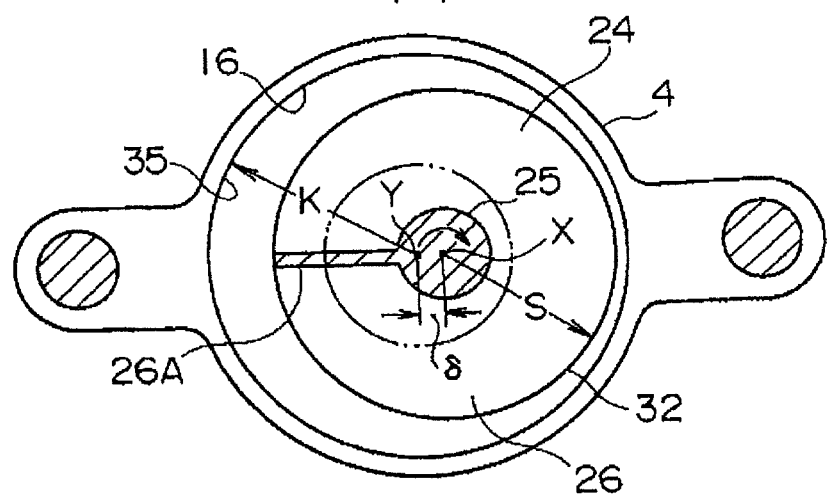

Fig. 17
(a)
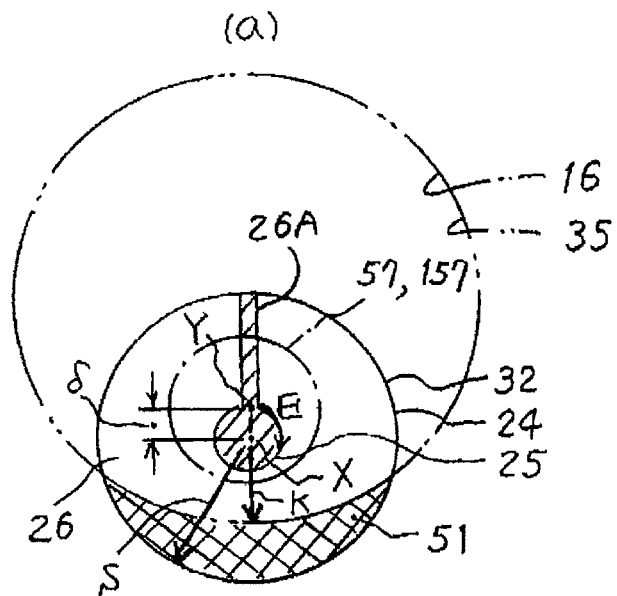
(b)
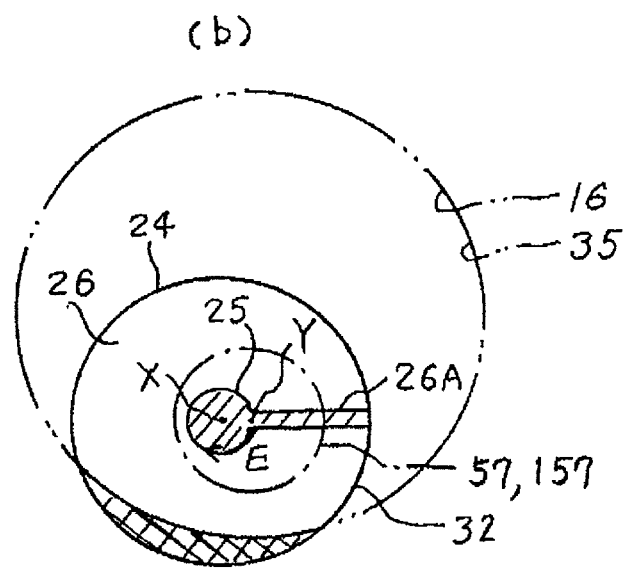

Fig. 19
(a)
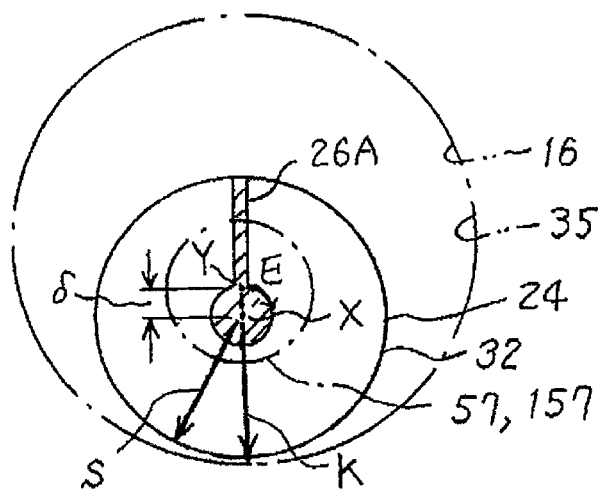
(b)
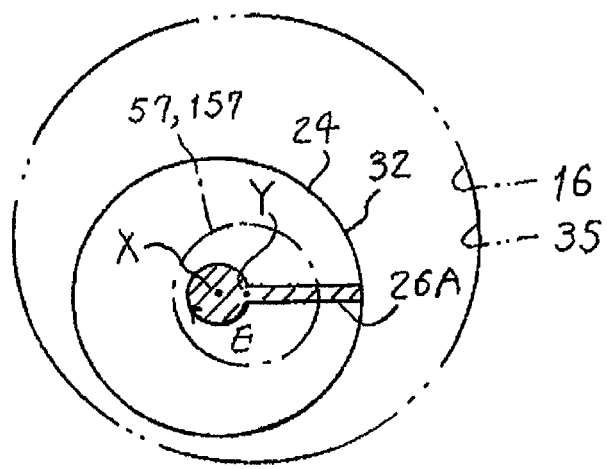

[Fig. 20]
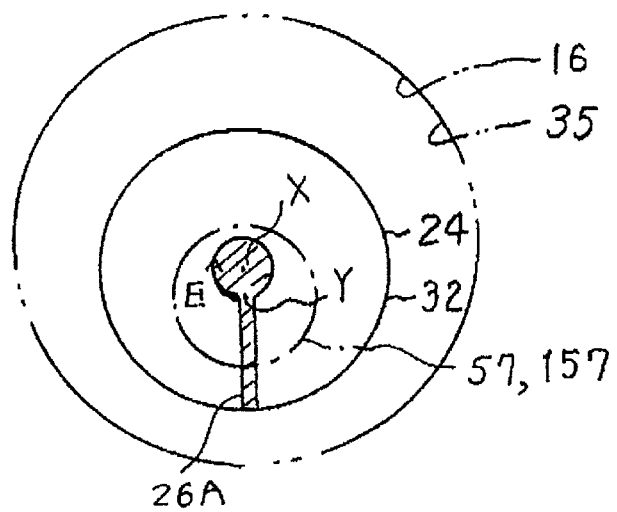
(a)
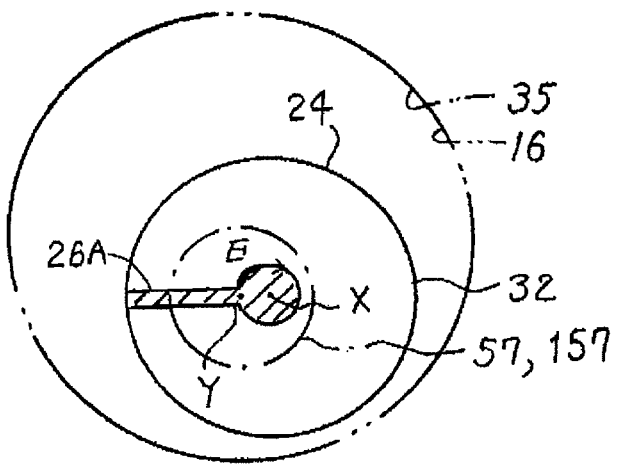
(b)

Fig. 22
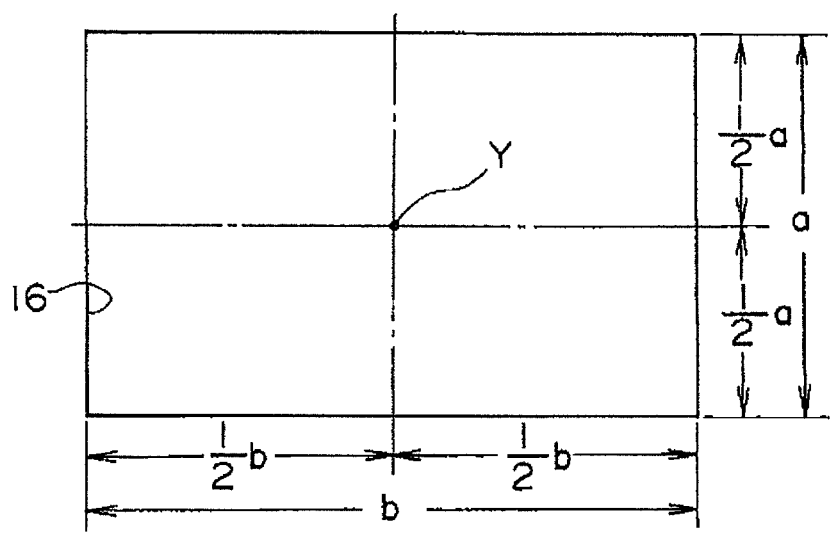
(a)
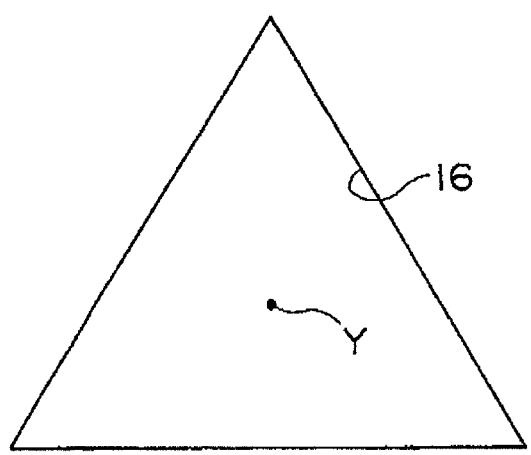
(b)

Fig. 23
(a)
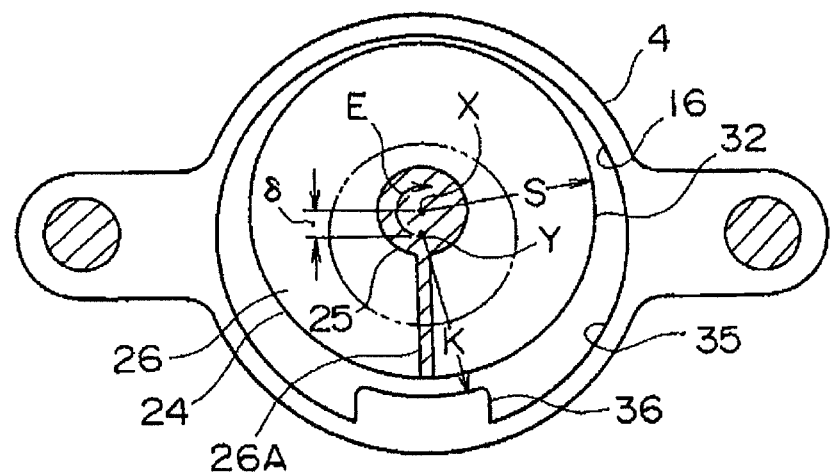
(b)
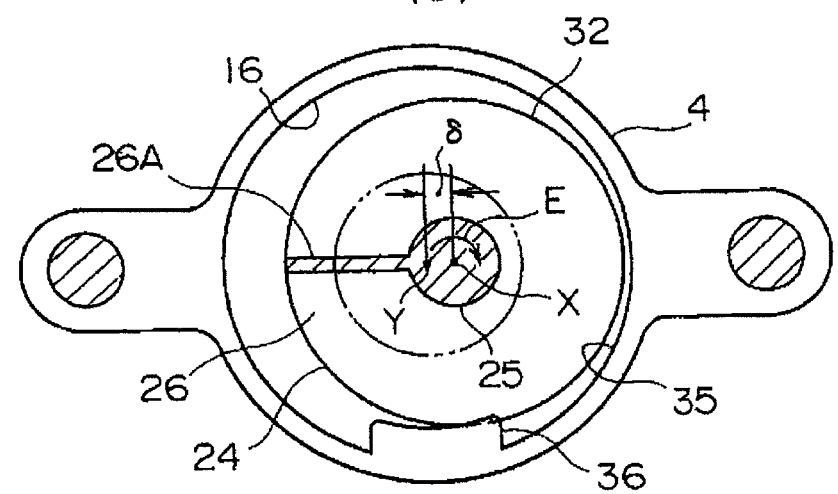

Fig. 25
(a)
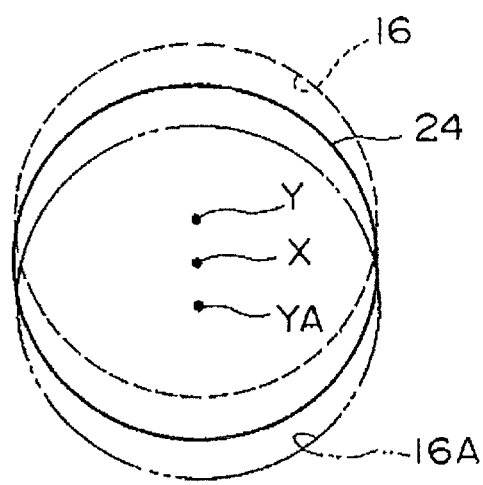
(b)
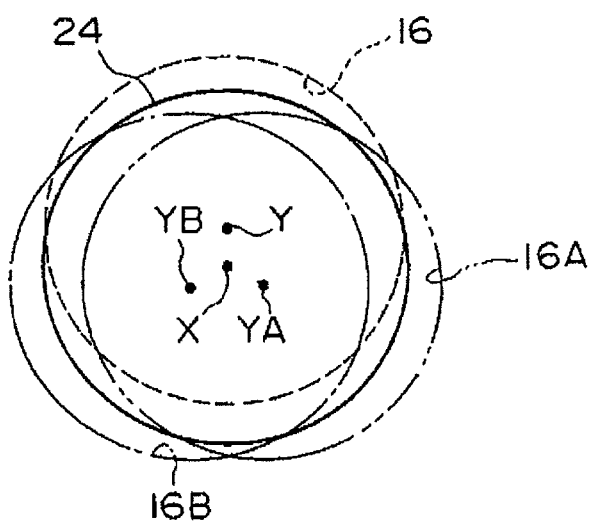

SOLID-LIQUID SEPARATION DEVICE

The present invention relates to a solid-liquid separation device/separator which includes a plurality of fixed members, a plurality of movable members that are disposed between the adjacent fixed members, and at least one screw extending through the fixed members and the movable members in a state where the screw is not in contact with the fixed members and the movable members, with this screw being rotationally driven about a center axis line thereof while an object to be treated that has penetrated into a solid-liquid separation portion demarcated by the fixed members and the movable members bring caused to move toward an outlet of the solid-liquid separation portion by rotation of the screw, and a filtrate separated from the object to be treated being discharged to the outside of the solid-liquid separation portion through filtrate discharge gaps between the fixed members and the movable members, and then the object to be treated that has a reduced water content ratio being discharged from the outlet to the outside of the solid-liquid separation portion.

BACKGROUND

A solid-liquid separator of the above-described system in which a screw does not come into contact with movable members and fixed members (solid-liquid separator of a contactless system) is well known as one of solid-liquid separators suitable for separating a liquid from an object to be treated, for example, organic sludge such as soybean wastes, wastewater from food processing, sewage drainage, and wastewater discharged from hog farms, sludge obtained by decomposition of the aforementioned organic sludge with microorganisms, inorganic sludge such as waste liquid from plating, ink waste liquid, pigment waste liquid, and paint waste liquid, and also vegetable wastes, fruit peelings, food residues, and tofu refuse.

JP-S59-218298-A discloses a screw-press dewatering apparatus in which a plurality of sliding plates disposed between fixed plates are integrally connected to each other, and a screw passes through holes in the fixed plates and the sliding plates.

WO00/32292 A1 (page 5) describes a configuration in which a screw passes through an inner circumferential contour of a filtration tube in which fixed plates and movable plates are arranged alternately with mutual superposition, opening edges of the fixed plates form the inner circumferential contour, and the movable plates oscillate in a range in which the opening edges do not penetrate into the inner circumferential contour in the fixed plates.

JP-2000-135595-A discloses a screw press device in which a screw passes inside a cylindrical space defined by the inner circumferential surface of a filtration tube having a large number of annular fixed plates arranged successively with gaps therebetween and a large number of annular movable plates arranged in corresponding gaps.

Other examples of patent documents disclosing solid-liquid separators of a contactless system include JP-2005-230852-A, JP-4036383-B2, and JP-4374396-B1.

SUMMARY OF THE INVENTION

In the solid-liquid separator of a contactless system, movable members perform a movement such as a circular movement, a reciprocating linear movement, or a reciprocating inclined movement with respect to fixed members. Therefore, solids can be prevented from clogging the filtrate discharge gaps between the fixed members and the movable members. Moreover as the movable members are not in contact with the screw, the movable members can be prevented from being rapidly worn out. However, a problem associated with the solid-liquid separator of a contactless system is that the efficiency of liquid removal from the object to be treated is low and the object to be treated cannot be subjected to liquid removal treatment with good efficiency. A reason therefor has been unclear for a long time. The inventors have conducted comprehensive tests to clarify the reason for the aforementioned problem and clarified the following facts.

In the solid-liquid separator of a contactless system, where the movable members moving with respect to the fixed members interfere with the screw blade, the movable members are rapidly worn out or the movable members can be damaged by such interference. Therefore, a configuration has been used in which the movable members move outside the outer circumferential edge of the screw blades at all times, thereby preventing the movable members from coming into contact with the screw. For example, JP-S59-218298-A describes the configuration in which the sliding plates perform a circular movement such that holes at both sides come into point contact. As has been mentioned hereinabove, WO00/32292 A1 (page 5) describes the configuration in which the movable plates oscillate within a range in which the opening edges do not penetrate into the interior of the inner circumferential contour of the fixed plates. JP-2000-135595-A also describes the configuration in which the dimensions are set such that the opening edges of movable plates cannot narrow the inner circumferential surface of the tubular space determined by a row of openings of the fixed plates when the movable plates oscillate. Where the movable members thus oscillate outside the outer circumferential edge of the screw blade, the movable members do not come into contact with the screw and therefore the movable members are prevented from being rapidly worn out. Therefore, such an approach has been a common technical knowledge. However, a large number of tests conducted by the inventors demonstrated that when a solid-liquid separator of a contactless system is configured on the basis of such common technical knowledge, the squeezing action that should be applied by the movable members to the object to be treated that is conveyed by the rotating screw is insufficient. As a result the efficiency of liquid removal from the object to be treated decreases and the object to be treated cannot be subjected to liquid removal treatment with good efficiency.

The present invention is based on the above-described new information and it is an object to provide a solid-liquid separator of a contactless system in which movable members can be prevented from being rapidly worn out and the efficiency of liquid removal from the object to be treated can be greatly increased.

The present invention provides a solid-liquid separator of a contactless system that has been described hereinabove in which at least some of the movable members are formed to move, while penetrating closer to the center axis line of the screw than an outer circumferential edge of the screw blade, without coming into contact with the screw.

In accordance with the present invention the movable members do not come into contact with the screw and therefore the movable members can be prevented from being rapidly worn out. Furthermore, since at least part of the movable members move, while penetrating closer to the center axis line of the screw than the outer circumferential edge of the screw blade, these movable members that move, while penetrating closer to the center axis line of the screw, apply a large shear force as they penetrate so as to cut into the object to be treated that is conveyed by the rotating screw. As a consequence, the efficiency of liquid removal from the object to be treated is increased and the object to be treated can be subjected to liquid removal treatment with good efficiency.

BRIEF DESCRIPTION OF DRAWINGS

FIG. 12 is a cross-sectional view which is similar to that of FIG. 8 and clarifies the operation of the movable member positioned in the region in which penetration is impossible;

FIG. 17 is an explanatory drawing illustrating how the movable member penetrates closer to the center axis line of the screw than the outer circumferential edge of the blade of the screw in the case where the center axis line of the through hole formed in the movable member does not coincide with the center axis line of the eccentric cam;

FIG. 19 is an explanatory drawing illustrating how the movable member cannot penetrate closer to the center axis line of the screw than the outer circumferential edge of the blade of the screw in the case where the center axis line of the through hole formed in the movable member does not coincide with the center axis line of the eccentric cam;

FIG. 20 is an explanatory drawing illustrating how the movable member cannot penetrate closer to the center axis line of the screw than the outer circumferential edge of the blade of the screw in the case where the center axis line of the through hole formed in the movable member does not coincide with the center axis line of the eccentric cam;

FIG. 22 is an explanatory drawing illustrating through holes of movable members having quadrangular and triangular shapes;

FIG. 23 is a cross-sectional view illustrating how a movable member having a protruding section formed in part of the circumferential edge of the movable member demarcating the through hole performs a circular movement;

FIG. 25 illustrates a solid-liquid separator in which the center axis line of the through holes of some movable members does not coincide with the center axis line of the through holes of other movable members;

DETAILED DESCRIPTION

The embodiments of the present invention will be described below in greater detail with reference to the appended drawings.

Figure 1:
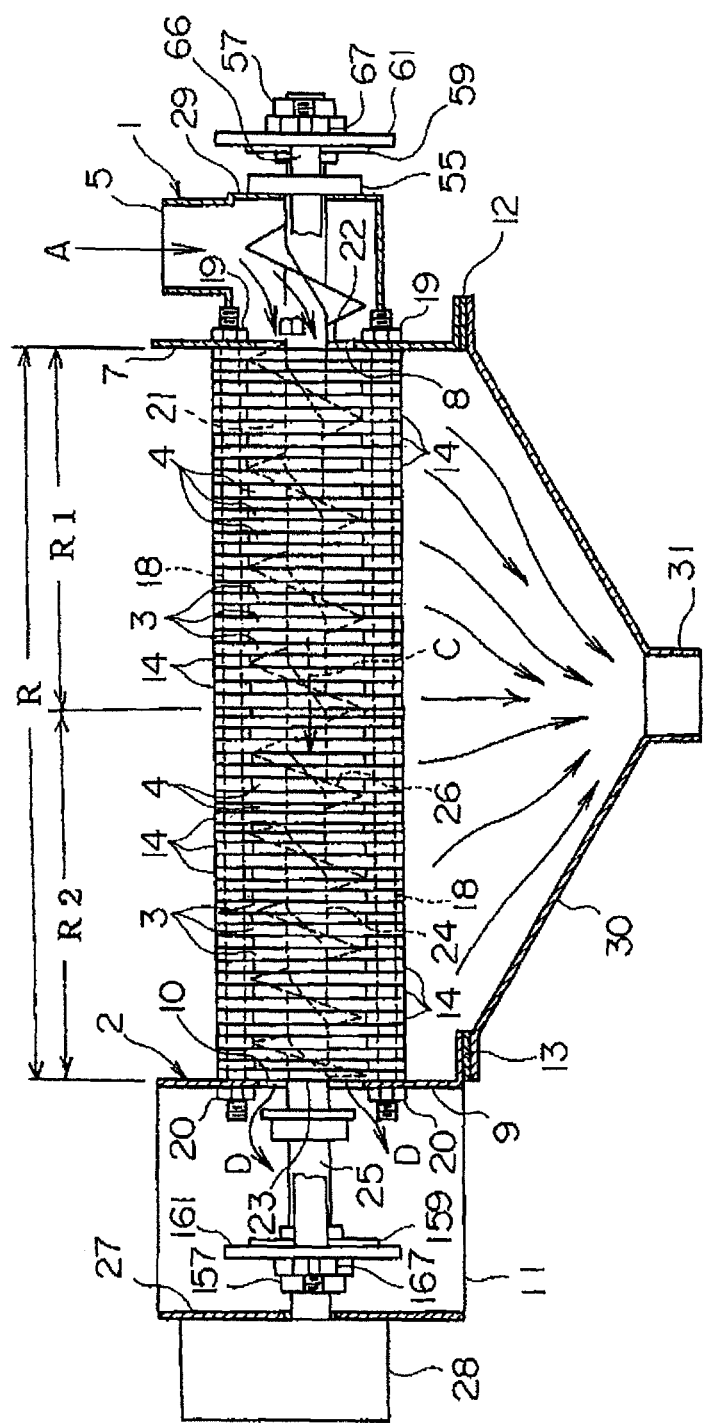
FIG. 1 is a front view, with a partial cross section, of a solid-liquid separator; the depiction of some members is herein omitted to facilitate the understanding of the figure and only end portions of the connecting rods, in the longitudinal direction thereof, are shown.
Figure 2:
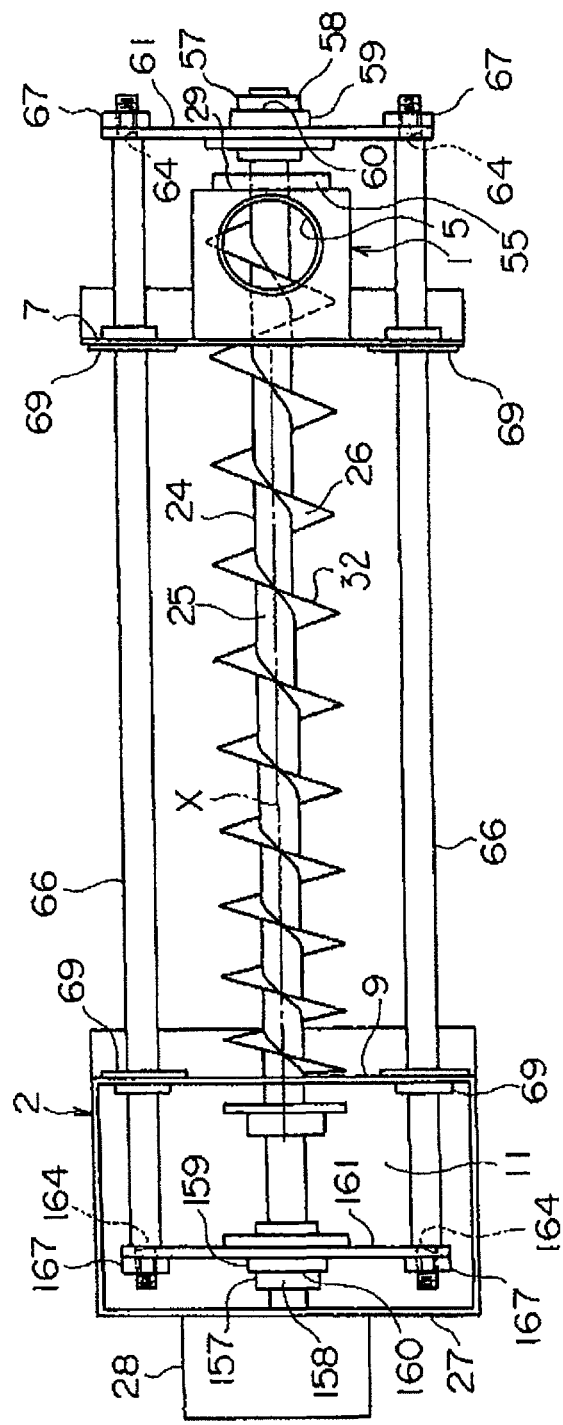
FIG. 2 is a plan view of the solid-liquid separator; in this figure, the depiction of the fixed members, movable members, filtrate receiving members that receive the filtrate, stay bolts, and nuts screwed on the stay bolts is omitted.
Figure 3:
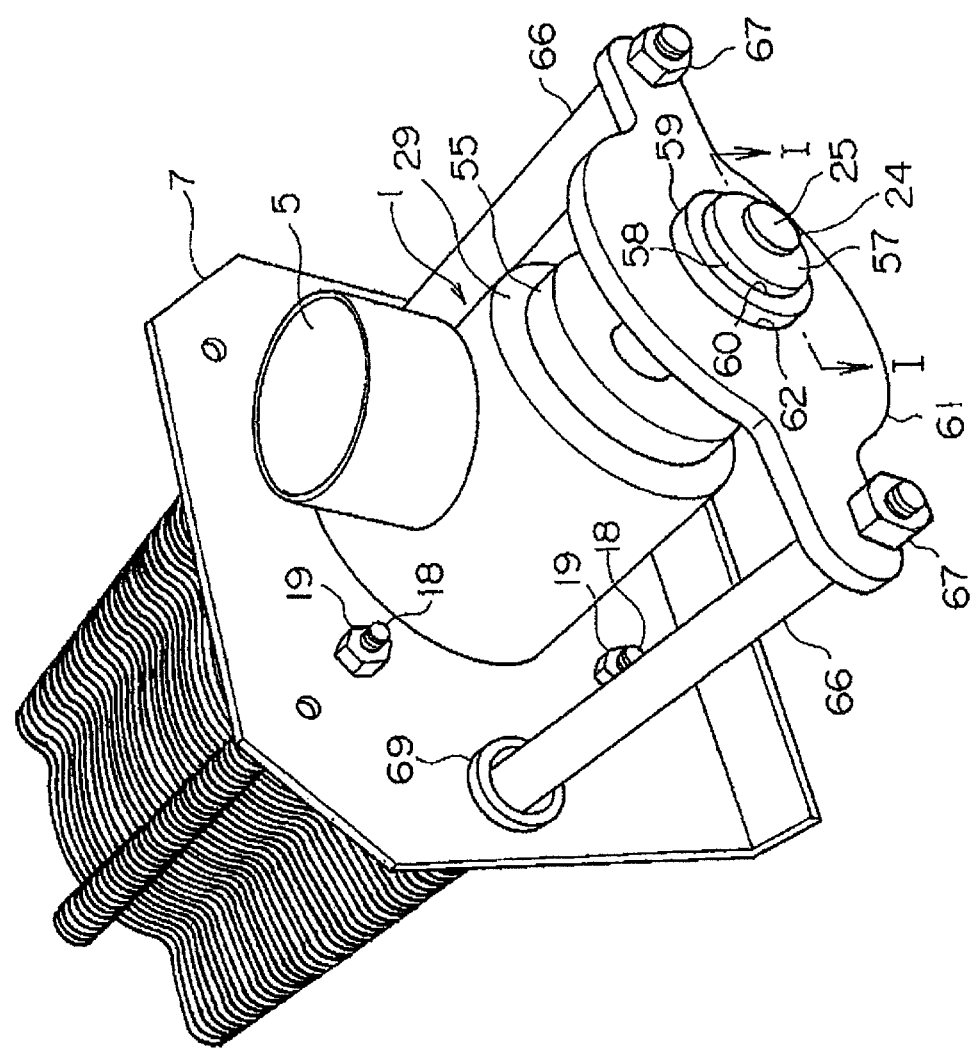
FIG. 3 is a perspective view illustrating part of the solid-liquid separator.

FIG. 1 is a front view, with a partial cross section, of a solid-liquid separator. FIG. 2 is a plan view of the solid-liquid separator. In this figure, the depiction of the below-describe fixed members and movable members is omitted. FIG. 3 is a perspective view illustrating part of the solid-liquid separator. The solid-liquid separator shown in these figures is suitable for solid-liquid separation of various treatment objects including a liquid, but the explanation below will be performed with reference to the case in which a sludge including a large amount of water is dewatered.

A solid-liquid separator of a contactless system shown in FIGS. 1 to 3 includes an inlet member 1 in which an inflow port 5 is formed in the upper portion and which is formed to have a hollow interior, an outlet member 2 having formed in the lower portion thereof a discharge port 11 for discharging a cake-like sludge obtained by dewatering, a plurality of fixed members 3 disposed between the outlet member 2 and the inlet member 1, and movable members 4 disposed between the adjacent fixed members 3. Each movable member 4 performs a circular movement as will be described hereinbelow.

Figure 4:
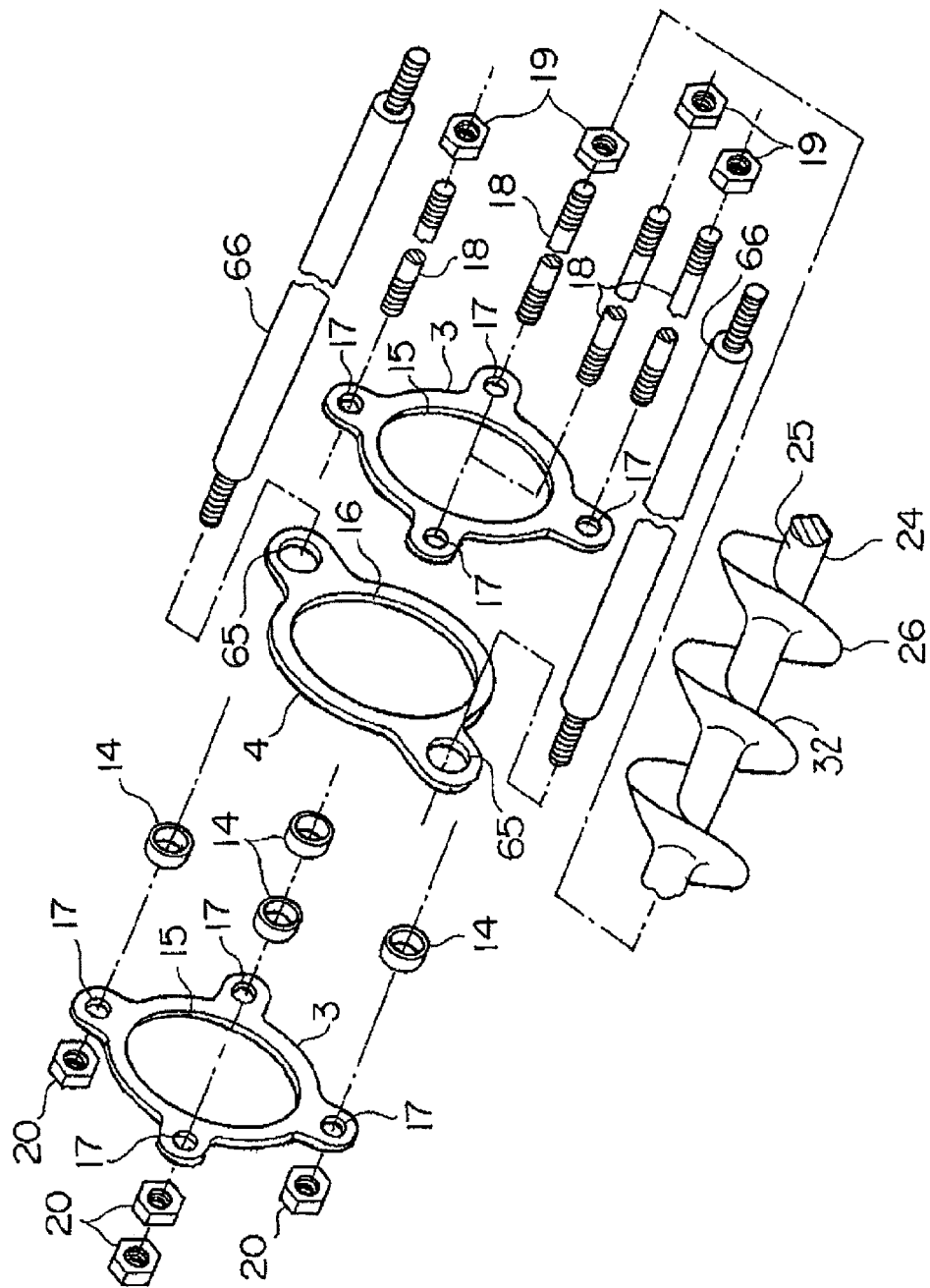
FIG. 4 is a perspective view illustrating two adjacent fixed members, a movable member disposed between these two fixed members, and some members relating thereto.
Figure 5:
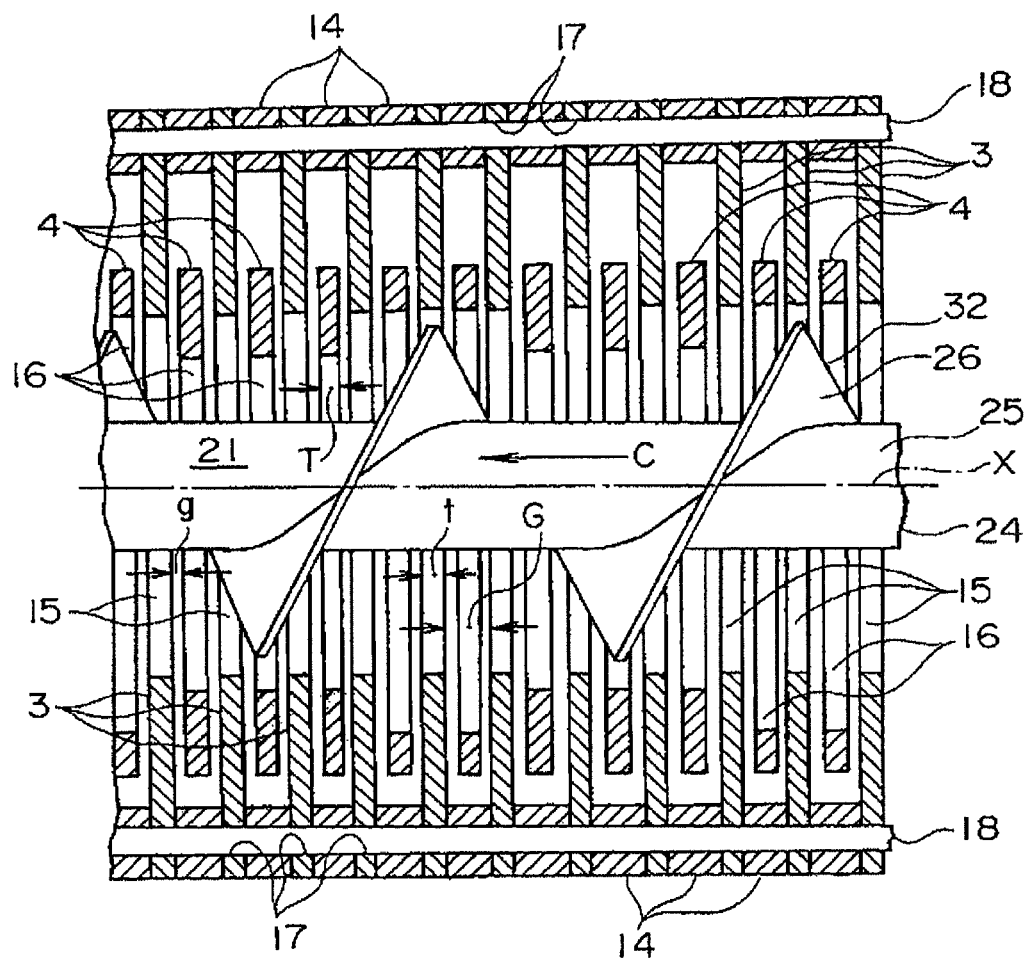
FIG. 5 is an enlarged vertical sectional view illustrating fixed members, movable members, and part of the screw extending therethrough.

FIG. 4 is an exploded perspective view illustrating two adjacent fixed members 3 and one movable member 4 disposed between these two fixed members 3. FIG. 5 is an enlarged vertical sectional view illustrating some of a large number of fixed members 3 and movable members 4. As follows from FIGS. 1, 4, and 5, the fixed members 3 and movable members 4 are arranged in the axial direction in mutually parallel postures. A plurality of fixed members 3 are disposed concentrically with a clearance in the axial direction, this arrangement being set by small ring-shaped spacers 14 disposed between the adjacent fixed members 3, and one movable member 4 is disposed between the adjacent fixed members 3. In the example shown in the figure, four spacers 14 are disposed between the adjacent fixed members 3.

The fixed members 3 and the movable members 4 of the present embodiment are constituted by ring-shaped plates having round through holes 15, 16 formed therein. As shown in FIG. 1, an opening 8 is formed in a side plate 7 of the inlet member 1 on the side facing the fixed members 3 and the movable members 4, and an opening 10 is formed in a side plate 9 of the outlet member 2 on the side facing the fixed members 3 and the movable members 4. As shown in FIG. 5, a hollow solid-liquid separation portion 21 demarcated by the through holes 15, 16 of the fixed members and movable members is formed inside the fixed members 3 and the movable members 4. As shown in FIG. 1, the openings 8, 10 formed in the inlet member 1 and the outlet member 2 are positioned correspondingly to the through holes 15, 16 of the fixed members 3 and the movable members 4. Thus, the solid-liquid separation portion 21 is demarcated by the fixed members 3 and the movable members 4 inside the fixed members and the movable members, and as shown in FIG. 1, the end portion of the solid-liquid separation portion 21 on the side of the inlet member 1 becomes an inlet port 22 of the solid-liquid separation portion 21, and the end portion on the side of the outlet member 2 becomes an outlet port 23 of the solid-liquid separation portion 21. Further, as shown in FIG. 1, the lower portion of the side plate 7 of the inlet member 1 is fixed to a stay 12 of a support frame, and the lower portion of the side plate 9 of the outlet member 2 is also fixed to a stay 13 of the support frame.

As shown in FIGS. 4 and 5, four attachment holes 17 are formed in each fixed member 3, and stay bolts 18 extend through the attachment holes 17 and central holes of spacers 14 disposed between the adjacent fixed members 3. As shown in FIG. 1, these stay bolts 18 pass through the side plate 7 of the inlet member 1 and the side plate 9 of the outlet member 2, and nuts 19, 20 are screwed and tightened on the male threads formed at the end portions, in the longitudinal direction, of each stay bolt 18 (see also FIG. 3). As a result, a plurality of fixed members 3 is integrally fixed and connected to each other, and the fixed members 3 are also fixed to the inlet member 1 and the outlet member 2. In FIG. 2, the stay bolts 18 and the nuts 19, 20 screwed on the stay bolts 18 are omitted. FIGS. 8A, 8B and FIGS. 9A, 9B are explanatory cross-sectional views clarifying the state in which the movable members 4 perform the circular movement as will be described hereinbelow, and these drawings make it possible to understand clearly the state of the fixed members 3, movable members 4, stay bolts 18, and spacers 14 when the solid-liquid separation portion 21 is viewed in the axial direction.

A single screw 24 extending through the through holes 15, 16 of the fixed members 3 and the movable members 4 that demarcate the solid-liquid separation portion 21 is disposed in the aforementioned solid-liquid separation portion 21. The screw 24 has a single blade 26 extending spirally and a shaft 25 formed integrally with the blade 26. The shaft 25 constitutes the central portion of the screw 24, and the center axis line X (FIGS. 2, 5, 8, and 9) of the shaft 25 becomes the center axis line of the screw 24 itself. In particular, as clearly seen in FIGS. 8 and 9, where the screw 24 is viewed from the direction of the center axis line X thereof, the outer circumferential edge 32 of the blade 26 of the screw 24 has a circular shape.

As described hereinabove, a plurality of fixed members 3 and movable members 4 of the solid-liquid separator of the present embodiment have through holes 15, 16 formed therein, and the screw 24 extends through the through holes 15, 16 of the fixed members 3 and the movable members 4.

The fixed members 3 that are spaced from each other by spacers 14 can be assembled so as to allow a very small play thereof. It is also possible to form the spacer integrally with one fixed member of the two adjacent fixed members, form by this spacer a gap between two adjacent fixed members, and dispose the movable member 4 in the gap. Further, in the solid-liquid separator shown in FIGS. 1 to 5, one movable member 4 is disposed between the two adjacent fixed members 3, but a plurality of movable members 4 can be also disposed between the adjacent fixed member 3. At least one movable member 4 is disposed between the fixed members 3 adjacent in the axial direction.

As shown in FIG. 5, the thickness T of each movable member 4 disposed between the fixed members 3 is set to be less than the gap width "G" between the fixed members, and a very small filtrate discharge gap "g", for example, of about 0.1 mm to 1 mm is formed between the end surface of each fixed member 3 and the end surface of the movable member 4 corresponding thereto. These very small filtrate discharge gaps "g" serve to allow the water separated from the sludge in the below-described manner, that is, the filtrate, to pass therethrough. The thickness T of the movable member 4 is set, for example, to about 1.0 mm to 3 mm, and the gap width G to about 1.2 mm to 5 mm, for example. The thickness t of the fixed member 3 is set, for example, to about 1.5 mm to 3 mm. The values of the very small filtrate discharge gap "g", thicknesses "T" and "t", and gap width "G" are set as appropriate with consideration for the type of the object to be treated.

As shown in FIGS. 1 and 2, the end portion of the shaft 25 of the screw 24 on the side of the outlet member 2 is drivably connected to a drive unit constituted by an electric motor 28 equipped with a reducer that is fixed to and supported by a side plate 27 on the other side of the outlet member 2. The portion of the shaft 25 on the side of the inlet member 1 is rotatably supported by a bearing 55 at a side plate 29 on the other side of the inlet member 1. The drive unit constituted by the electric motor 28 serves to drive rotationally the screw 24 about the center axis line X thereof.

Figure 8:
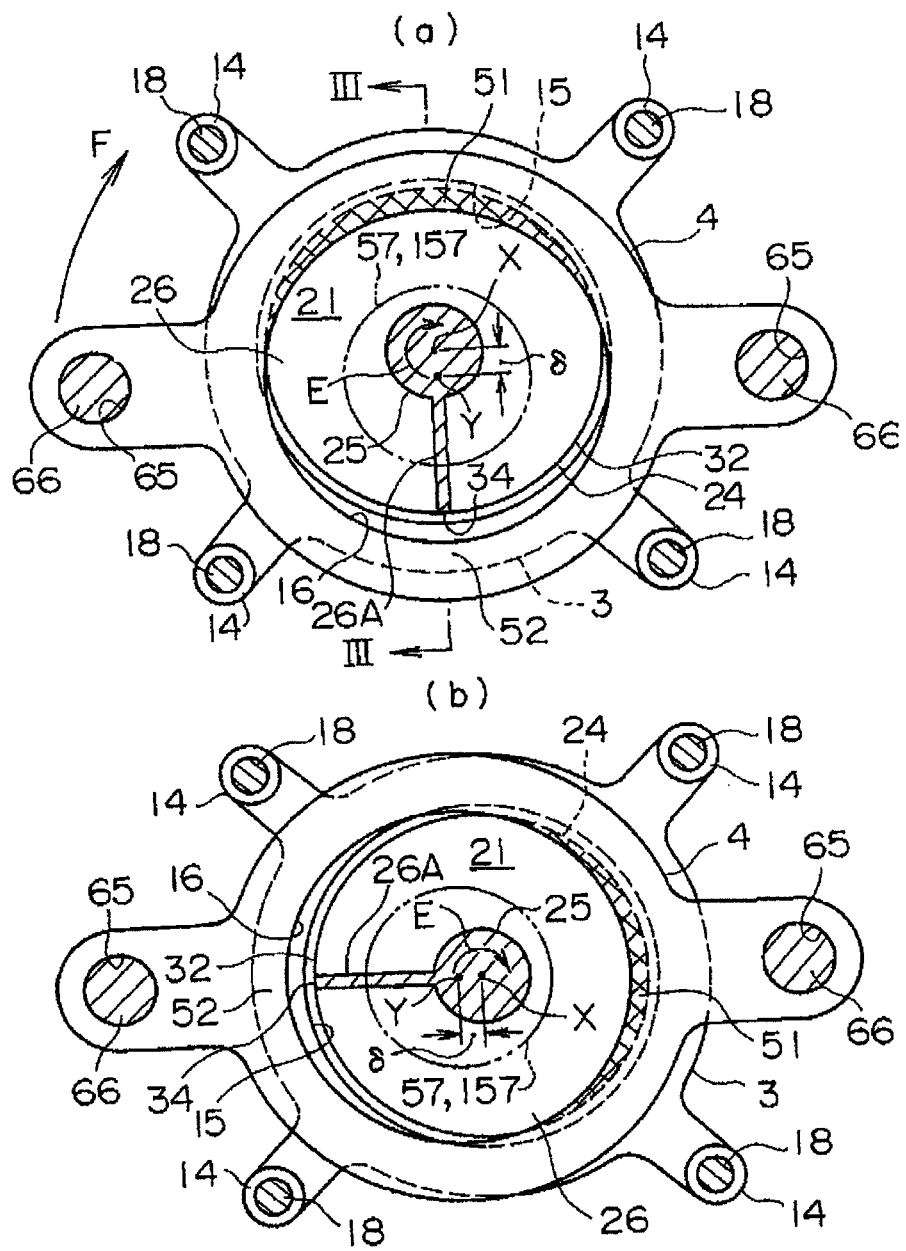
FIG. 8 is a cross-sectional view clarifying the circular movement of the movable member.
Figure 9:
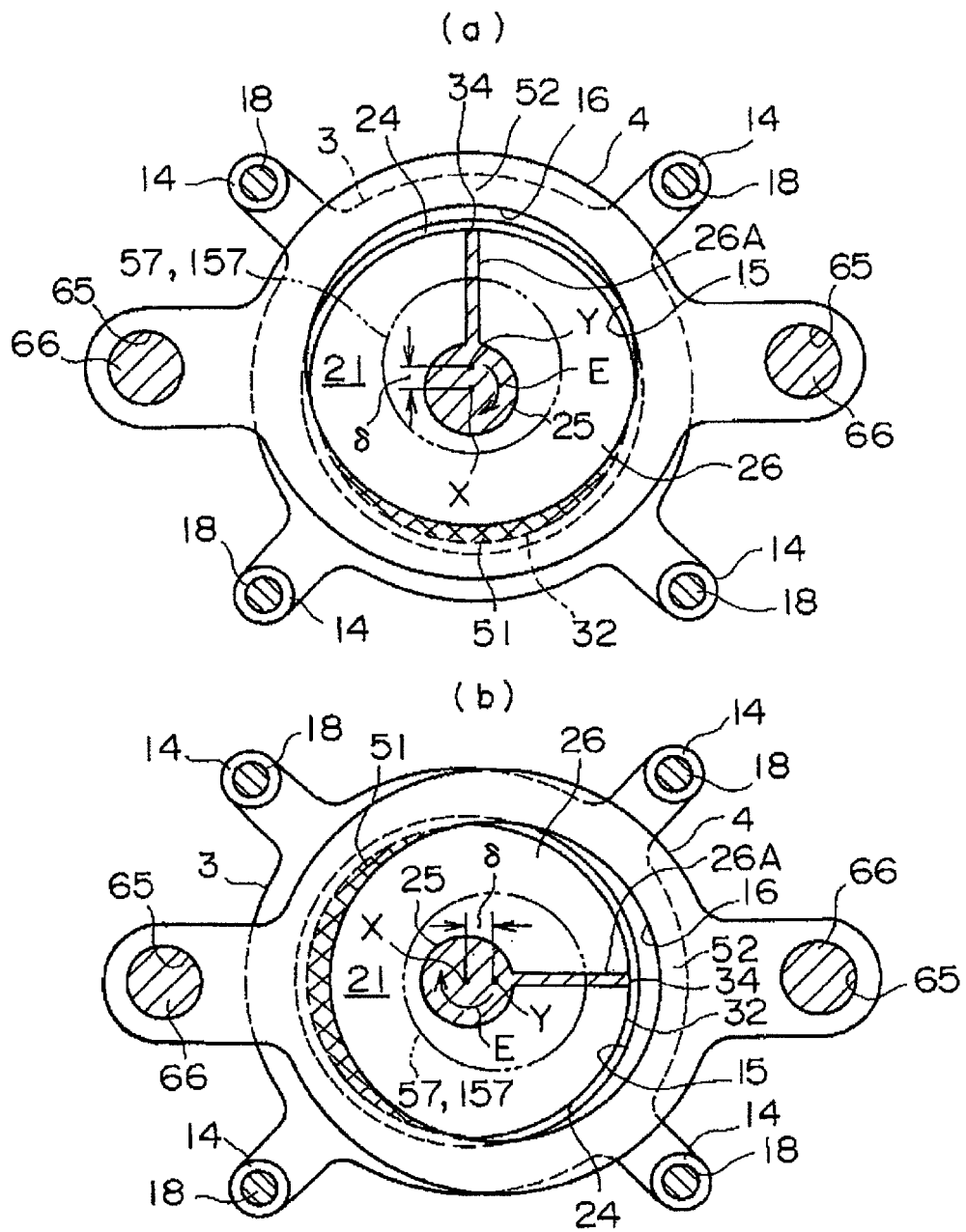
FIG. 9 is a cross-sectional view clarifying the circular movement of the movable member.

As shown in FIGS. 5, 8, and 9, the outer diameter of the blade 26 of the screw 24 is set to be less than the diameter of the circular through hole 15 formed in the fixed member 3. Furthermore, even when the movable members 4 perform the circular movement, as will be described hereinbelow, the screw 24 does not come into contact with the inner circumferential surfaces of the through holes 16 formed in the movable members 4 and openings 8, 10 formed in the side plates 7, 9. Thus, the solid-liquid separator of the present embodiment is provided with the screw 24 extending through the movable members 4 and the fixed members 3, without being in contact with the movable members 4 and the fixed members 3, and the drive unit that rotationally drives the screw 24 about the center axis line X thereof.

As shown by arrow A in FIG. 1, the sludge including a large amount of water flows from the inflow port 5 into the inlet member 1. In this case, the content ratio of water in the sludge before the treatment is, for example, about 99 wt %. A flocculant has been admixed to the sludge in advance and the sludge has been flocculated. When the sludge flows into the inlet member 1, the screw 24 is rotated by the operation of the electric motor 28 about the center axis line X of the screw. Therefore, the sludge passes through the opening 8 formed in the side plate 7 of the inlet member 1 and flows into the solid-liquid separation portion 21 constituted by the fixed members 3 and the movable members 4, as shown by arrow B in FIG. 1. Thus, the sludge flows into the solid-liquid separation portion 21 from the inlet port 22 at one end side in the axial direction thereof. The depiction of the sludge in the figure is omitted.

The sludge that has flown into the solid-liquid separation portion 21 as described hereinabove is conveyed toward the outlet 23 at the other end side in the axial direction of the solid-liquid separation portion 21, as shown by arrow C in FIGS. 1 and 5, by the screw 24 that is rotationally driven by the electric motor 28. In this case, the water separated from the sludge, that is, the filtrate is discharged to the outside of the solid-liquid separation portion 21 through the filtrate discharge gaps "g" (FIG. 5) between the fixed members 3 and the movable members 4. The discharged filtrate is received by a filtrate receiving member 30 (not shown in FIG. 2) fixed to the stays 12, 13, as shown in FIG. 1, and then flows down through a filtrate discharge tube 31.

The content ratio of water in the sludge inside the solid-liquid separation portion 21 is thus reduced, and the cake-like sludge with reduced content of water is discharged from the outlet 23 on the other end side in the axial direction of the solid-liquid separation portion 21 as shown by arrow D in FIG. 1. The sludge discharged from the solid-liquid separation portion 21 falls down through the discharge port 11 located in the lower portion of the outlet member 2. The content ratio of water in the treated cake-like sludge is, for example, about 75 to 80 wt %.

The solid-liquid separator of the present embodiment is provided with following configuration in order to prevent the filtrate discharge gaps "g" (FIG. 5) between the fixed members 3 and the movable members 4 form being clogged by solids when the sludge is thus dewatered.

Figure 6:
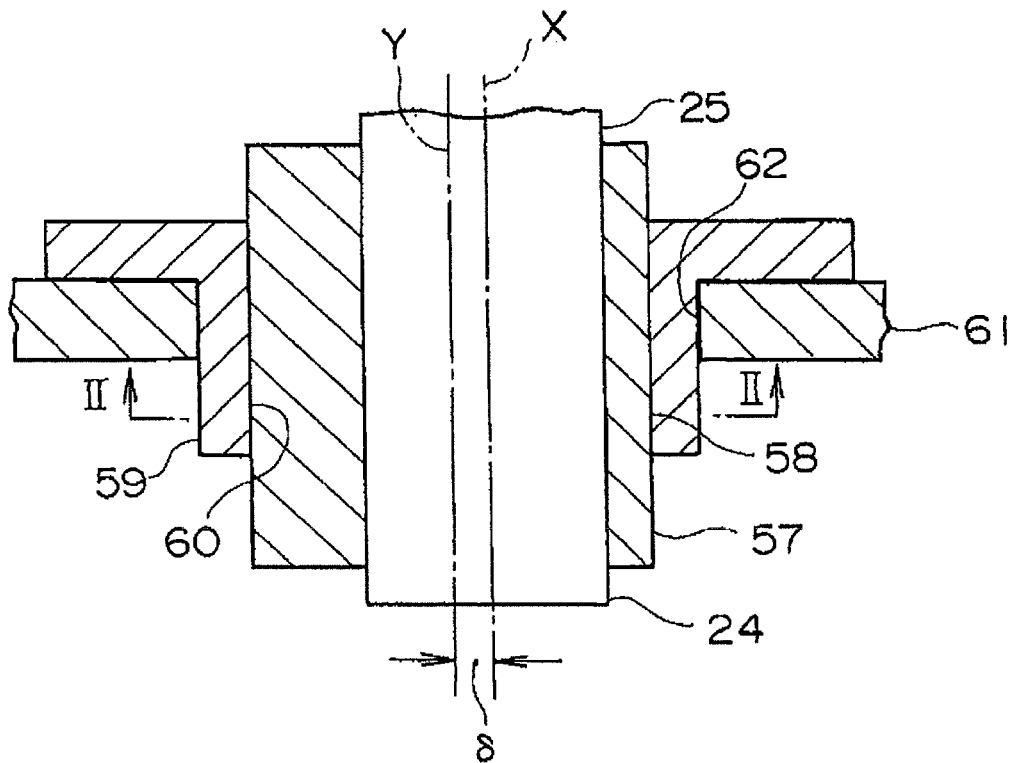
FIG. 6 is an enlarged cross-sectional view taken along the I-I line in FIG. 3.
Figure 7:
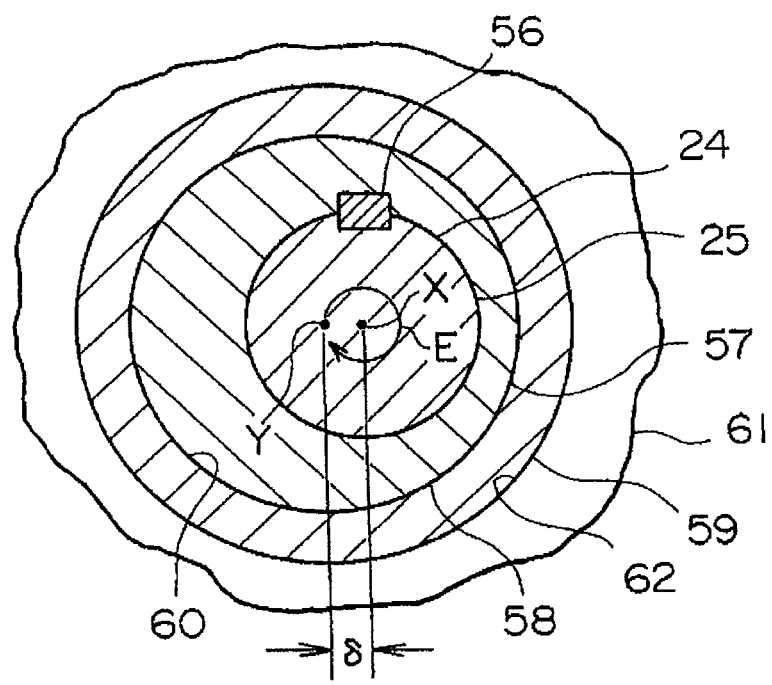
FIG. 7 is a cross-sectional view taken along the II-II line in FIG. 6.

As shown in FIGS. 1 to 3 and FIGS. 6 and 7, an eccentric cam 57 in which an outer circumferential surface 58 is formed to have a round shape is detachably attached, so as to be capable of rotating integrally with the shaft 25 of the screw 24, by a key 56 (FIG. 7) fitted in a key groove to one end portion of the shaft 25 of the screw 24. In particular, as shown in FIGS. 6 and 7, the center axis line Y of the eccentric cam 57 is offset by a distance represented by δ with respect to the center axis line X of the shaft 25 of the screw 24, and the round outer circumferential surface 58 of the eccentric cam 57 is mated with a round cam hole 60 of a bearing 59 constituted by a sliding bearing. In this case, the round outer circumferential surface 58 of the eccentric cam 57 slidably abuts, directly or with a lubricant located therebetween, on the inner circumferential surface of the round cam hole 60 of the bearing 59.

Further, the aforementioned bearing 59 is mated with an attachment hole 62 of the connection plate 61, and this bearing 59 is detachably attached, as shown in FIGS. 3 and 6, to the connection plate 61 with a bolt (not shown in the figure) and a nut (also not shown in the figure) that is screwed on this bolt and tightened. The bearing 59 of the present embodiment is thus fixed to the connection plate 61, but the bearing 59 can be also rotatably fitted into the attachment hole 62 formed in the connection plate 61. In any case, the connection plate 61 is connected to the bearing 59 in a manner such that the connection plate 61 can perform the below-described circular movement.

As shown in FIGS. 1 and 2, the above-described eccentric cam 57 and the bearing 59 mated with the eccentric cam 57 are provided at the shaft 25 of the screw 24 on the side of the inlet member 1. In the solid-liquid separator of the present embodiment, an eccentric cam 157, a bearing 159, and a connection plate 161 configured similarly to the above-described eccentric cam 57, bearing 59, and connection plate 61 are also provided at the portion of the shaft 25 on the side of the outlet member 2. The center axis lines Y of the two eccentric cams 57, 157 coincide, and the eccentricity δ of the eccentric cams 57, 157 with respect to the center axis line X of the screw 24 is the same.

The eccentric cams 57, 157, the bearings 59, 159 mated with the eccentric cams 57, 157, and the connection plates 61, 161 are provided by one each at each portion of the shaft 25 on the outside, in the longitudinal direction, of the blade 26 of the screw 24.

As shown in FIG. 2, attachment holes 64, 164 are formed in the pair of respective connection plates 61, 161 having the respective bearings 59, 159 fixed therein, at a ratio of two attachment holes per one connection plate. Further, as shown in FIG. 4, two attachment holes 65 are also formed in each of the plurality of movable members 4. As shown in FIGS. 2 to 4, a pair of connecting rods 66 (see also FIGS. 8 and 9) disposed symmetrically with respect to the center axis line X of the screw 24 pass through these attachment holes 64, 164, 65, and nuts 67, 167 are screwed and tightened on the male threaded portions formed on each end, in the longitudinal direction, of each connecting rod 66. A pair of connecting rods 66 also extends through the side plate 7 of the inlet member and the side plate 9 of the outlet member 2. In FIG. 1, only the end portions, in the longitudinal direction, are shown with respect to the connecting rod 66.

The connecting rods 66 of the present embodiment are fixedly connected to the connection plates 61, 161, but the connecting rods 66 can be also loosely connected to the connection plates 61, 161.

As mentioned hereinabove, a pair of connection plates 61, 161 are connected by the pair of connecting rods 66, and a large number of movable members 4 are installed at the two connecting rods 66. Each connecting rod 66 may be tightly inserted, without a gap, into the attachment hole 65 of each movable member 4 and the connecting rod 66 may be fixedly connected to each movable member 4, or the connecting rod 66 may be mated with the attachment hole 65, so that a certain gap remains therebetween. Moreover, three or more connecting rods may be provided.

The pair of connection plates 61, 161 and a plurality of connecting rods 66 constitute connection means for connecting a plurality of movable members 4, and the bearings 59, 159 are respectively connected to the connection plates 61, 161 of this connection means.

FIGS. 8 and 9 are cross-sectional views that clarify the relationship between the screw 24, movable members 4, and fixed members 3 (in the figures, the eccentric cams 57, 157 are additionally shown by virtual lines). As shown in the figures, the center axis line of the through holes 16 of the movable members 4 of the present embodiment coincides with the center axis line Y of the eccentric cams 57, 157. For this reason, in the figure, the center axis line of the through holes 16 is also denoted by the reference symbol Y. As follows from the figures, the center axis line Y of the through hole 16 of the movable member 4 of the present embodiment is offset by the eccentricity δ with respect to the center axis line X of the shaft 25 of the screw 24. Further, since the through hole 16 formed in the movable member 4 of the present embodiment has a round shape, the center axis line Y thereof becomes the center of the circle forming the through hole 16. Further, the center axis line Y of the eccentric cams 57, 157 is also the center of the circle forming the outer circumferential surfaces 58, 158 thereof, and the center axis lines of the below-described eccentric cams are likewise also the centers of round outer circumferential surfaces thereof.

As follows from the explanation provided hereinabove, the solid-liquid separator of the present embodiment is configured such that a plurality of movable members 4 can together perform a circular movement in the below-described manner. Therefore, the solid-liquid separator of the present embodiment includes the connection means for connecting a plurality of movable members 4, the eccentric cams 57, 157 that are decentered from the center axis line X of the shaft 25 of the screw 24 and rotate integrally with the shaft 25, and the bearings 59, 159 that are connected to the abovementioned connection means and provided with round cam holes 60, 160 mating with the round outer circumferential surfaces 58, 158 of the eccentric cams 57, 157. The round outer circumferential surfaces 58, 158 of the eccentric cams 57, 157 slidably abut, directly or with a lubricant located therebetween, on the inner circumferential surfaces of the round cam holes 60, 160 of the bearings 59, 159.

Further, in the solid-liquid separator of the present embodiment, the eccentric cams 57, 157 and the bearings 59, 159 mated with the eccentric cams 57, 157 are provided by one each at each portion of the shaft 25 on the outside, in the longitudinal direction, of the blade 26 of the screw 24. Furthermore, the connection means has a pair of connection plates 61, 161 connected to the bearings 59, 159, respectively, and a plurality of connecting rods 66 connected to a plurality of movable members 4, and the connecting rods 66 are connected to respective connection plates 61, 161.

As mentioned hereinabove, in the solid-liquid separator of the present embodiment, the center axis line of the through holes 16 of the movable members 4 and the center axis line of the eccentric cams 57, 157 coincide, and the center axis line Y of all of the movable members 4 also coincide. However, a configuration can be also used in which the center axis lines Y of the through holes 16 of the movable members 4 do not coincide, or the center axis line of the through holes 16 of the movable members 4 does not coincided with the center axis line of the eccentric cams 57, 157 and these center axis lines are decentered from each other. Further, as will be described hereinbelow, the through holes 16 can be formed in a shape other than the round shape, and the through holes 16 can be also formed in a shape in which the center axis line of the through hole 16 is not defined.

Where the electric motor 28 shown in FIGS. 1 and 2 starts operating and the screw 24 rotates (revolves) about the center axis line X thereof, the eccentric cams 57, 157 rotate following the rotation of the screw 24, while the center axis line Y of the eccentric cams 57, 157 describes a circle with a radius equal to the eccentricity δ of the eccentric cams 57, 157 about the center axis line X of the shaft 25 of the screw 24, as shown by arrow E in FIG. 7. In this case, the eccentric cams 57, 157 are connected to the connection plates 61, 161, the plurality of movable members 4 are connected by the plurality of connecting rods 66 to the connection plates 61, 161, and the center axis line of the eccentric cams 57, 157 and the center axis line of the through holes 16 of the plurality of movable members 4 connected by the connection means coincide, as shown by the reference symbol Y representing both center axis lines. Therefore, simultaneously with the above-described rotation of the eccentric cams 57, 157, the connection means constituted by the connection plates 61, 161 and the connecting rods 66 and the plurality of movable members 4 connected by the connection means perform a circular movement with a radius equal to the eccentricity δ of the eccentric cams 57, 157. As follows from FIGS. 8A, 8B, 9A, and 9B, since the center axis line Y of the eccentric cams 57, 157 rotates in the direction of arrow E about the center axis line X of the screw 24, the radius of the trajectory being the eccentricity δ, the movable members 4 connected by the connection means also perform a circular movement such that the center axis line Y of the through holes 16 describes a circle with a radius equal to the eccentricity δ of the eccentric cams about the center axis line X of the shaft 25 of the screw 24 in the order shown in FIGS. 8A, 8B, 9A, and 9B. Since the center axis line Y of the eccentric cams 57, 157 and the center axis line Y of the through holes 16 of the plurality of movable members 4 connected by the connection means coincide and the eccentric cams 57, 157 rotate following the rotation of the screw 24 so that the center axis line Y of the eccentric cams describes a circle with a radius equal to the eccentricity δ of the eccentric cams 57, 157 about the center axis line X of the shaft 25 of the screw 24, the plurality of movable members 4 connected by the connection means perform a circular movement such that the center axis line Y of the through holes 16 of the movable members describes a circle with a radius equal to the eccentricity δ of the eccentric cams 57, 157 about the center axis line X of the shaft 25 of the screw 24.

As described hereinabove, in the present embodiment, the center axis line of the through holes 16 of the movable members 4 coincides with the center axis line of the eccentric cams 57, 157, and the center axis lines Y of the through holes 16 of all of the movable members 4 also coincide. However, the movable members 4 also perform a circular movement with a radius equal to the eccentricity δ of the eccentric cams 57, 157 when, by contrast with the above-described configuration, the center axis line of the through holes 16 of the movable members 4 and the center axis line of the eccentric cams 57, 157 do not coincide, or the center axis lines of the through holes 16 of the movable members 4 do not coincide with each other, and also when the center axis line of the through hole 16 of the movable member is not defined. Thus, the movable members 4 are connected to the eccentric cams 57, 157 so that in any of the cases the movable members 4 perform a circular movement with a radius equal to the eccentricity δ of the eccentric cams 57, 157.

As described hereinabove, when the sludge is dewatered while moving inside the solid-liquid separation portion 21, the movable members 4 perform a circular movement in the aforementioned manner, whereas the fixed members 3 remain immovable. Therefore, the solid matter that has penetrated into the filtrate discharge gaps "g" (FIG. 5) between the mutually adjacent movable members 4 and the fixed members 3 is effectively discharged from the gaps g and the gaps are prevented from the being clogged by the solid matter. Further, since the blade 26 of the rotating screw 24 does not come into contact not only with the fixed members 3, but also with the movable members 4, the movable members 4 can be prevented from being rapidly worn out.

However, since the eccentric cams 57, 157 rotate so that the round outer circumferential surfaces 58, 158 thereof slide along the inner circumferential surfaces of the round cam holes 60, 160 of the bearings 59, 159, the eccentric cams 57, 157 or the bearings 59, 159, or both the eccentric cams and the bearings unavoidably wear out with time, but the amount of this wear is reduced in the following manner.

As described hereinabove, the round outer circumferential surfaces 58, 158 of the eccentric cams 57, 157 come into contact, directly or with a lubricant being interposed therebetween, with the inner circumferential surfaces of the round cam holes 60, 160 of the bearings 59, 159 over the entire circumference thereof. As a result, the external force acting upon the round outer circumferential surfaces 58, 158 of the eccentric cams 57, 157 and the inner circumferential surfaces of the round cam holes 60, 160 of the bearings 59, 159 is dispersed and the contact pressure per unit surface area of both circumferential surfaces is low. Therefore, the amount of wear of the eccentric cams 57, 157 or the bearings 59, 159 or both the eccentric cams and the bearings can be reduced, the service life thereof can be extended, and the replacement frequency of these parts can be reduced. Furthermore, since the connection plates 61, 161 are driven by the eccentric cams 57, 157 fixed to the shaft 25 of the screw 24, rather than by the pair, left and right, of eccentric cams, although the round outer circumferential surfaces 58, 158 of the eccentric cams 57, 157 and the inner circumferential surfaces of the round cam holes 60, 160 of the bearings 59, 159 are in contact with each other over the entire circumference, the connection plates 61, 161 can be caused to perform an accurate circular movement even when the shape accuracy or installation accuracy of the eccentric cams 57, 157 and bearings 59, 159 is not that high.

When the movable members 4 and the connection means perform a circular movement in the above-described manner, the connection plates 61, 161, connecting rods 66, and movable members 4 rotate (revolve) in the direction shown by arrow F in FIG. 8A about the center axis line X of the screw 24 under the effect of the external force applied to the connection plates 61, 161 of the connection means from the eccentric cams 57, 157, and the movable members 4 can abut on and damage the fixed members 3 or spacers 14 located between the fixed members. Accordingly, in the solid-liquid separator of the present embodiment, as shown in FIGS. 2 and 3, ring-shaped guides 69 (not shown in FIG. 1) are detachably attached with a bolt and a nut (not shown in the figure) to the holes of the side plates 7, 9 through which the connecting rods 66 are inserted. When the connecting rod 66 performs the aforementioned circular movement, the connecting rod 66 is guided while sliding along the inner circumferential surface of the ring-shaped guides 69, and the connecting rod 66 is prevented from rotating in the direction of arrow F shown in FIG. 8A. Thus, the guides 69 are used to cause the connection means to rotate together with the plurality of movable members 4 connected by this connection means in the direction of arrow F around the center axis line X of the shaft 25 of the screw 24 and to prevent the movable members 4 from abutting on other members.

In the above-described solid-liquid separator, the eccentric cams 57, 157 are constituted as members separate from the screw 24, but the eccentric cams 57, 157 can be also formed integrally with the screw 24. Further, where the eccentric cams 57, 157 are detachably attached to the shaft 25 of the screw 24, as in the present embodiment, the eccentric cams 57, 157 can be taken off from the shaft 25 when the eccentric cams are worn out and new eccentric cams can be easily mounted on the shaft 25.

In the above-described solid-liquid separator, a single screw 24 is used that has a single blade 26. However, it is also possible to use a screw having two or more blades, or to use two or more screws extending through the fixed members and movable members, as described in JP-4374396-B1. Furthermore, it is also possible to use the fixed members and movable members constituted by plates having recesses formed in the upper portions thereof as described in JP-4374396-B1. In this case, it is also possible to use at least one screw extending through the fixed members and movable members, without coming into contact with the fixed members and movable members. Further, in the case of the solid-liquid separator shown in the figure, the movable members 4 disposed between the adjacent fixed members are configured to perform a rotational movement, while maintaining the posture parallel to the fixed members 3, this movement being such that the center axis line Y of the through holes 16 thereof describes a circle around the center axis line X of the screw 24, but it is well-known that the movable members can be also configured to perform a reciprocating linear movement or reciprocating tilted movement, while maintaining the posture parallel to the fixed members (see JP-S59-218298-A, WO00/32292 A1, JP-2000-135595-A, JP-2005-230852-A, and JP-4036383-B2, and JP-4374396-B1). Further, configurations described in these patent documents or other well-known configurations can be used as appropriate for driving the movable members. These specific configurations will be described hereinbelow in greater detail.

As described hereinabove, the solid-liquid separator in accordance with the present invention includes a plurality of fixed members, movable members that are disposed between the adjacent fixed members and can move, and at least one screw extending through the fixed members and the movable members in a state without contact with the fixed members and the movable members, and this solid-liquid separator is configured such that the screw is rotationally driven about a center axis line thereof, while the object to be treated that has penetrated into a solid-liquid separation portion demarcated by the fixed members and the movable members is caused to move toward an outlet of the solid-liquid separation portion by rotation of the screw, a filtrate separated from the object to be treated is discharged to the outside of the solid-liquid separation portion through filtrate discharge gaps between the fixed members and the movable members, and the object to be treated that has a reduced water content ratio is discharged from the outlet to the outside of the solid-liquid separation portion. This basic configuration is common to the below-described solid-liquid separators of various forms.

However, as has already been explained hereinabove, the drawback of the conventional solid-liquid separators of this system is that the movable members that move with respect to the fixed members are configured such that the movable members move at all times on the outside of the outer circumferential edge of the screw, thereby inevitably causing the decrease in efficiency of liquid removal from the object to be treated.

Accordingly, in the solid-liquid separator in accordance with the present invention, at least part of the movable members are formed to move, while penetrating closer to the center axis line of the screw than an outer circumferential edge of the screw blade, without coming into contact with the screw. With such a configuration, the movable members that move, while penetrating closer to the center axis line of the screw, apply a shear force to the object to be treated that is conveyed by the rotating screw, as they penetrate so as to cut into the sludge. Therefore, the efficiency of liquid removal from the object to be treated is greatly improved.

A specific example in which the above-described configuration, which is a characterizing feature of the present invention, is used in the solid-liquid separator explained hereinabove with reference to FIGS. 1 to 9 will be explained below.

Figure 10:
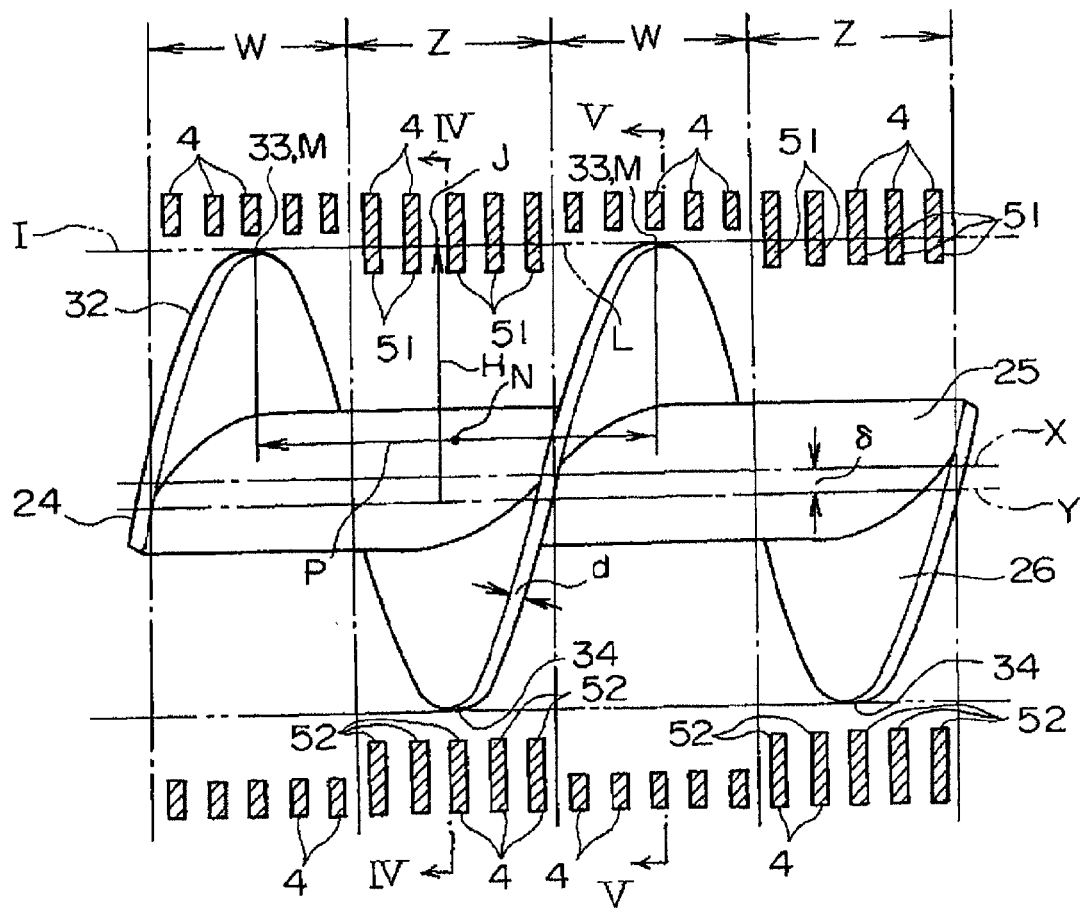
FIG. 10 is cross-sectional view for explaining the mutual arrangement of the screw and the movable members; this figure corresponds to a view obtained by cutting along the III-III line in FIG. 8A.

As mentioned hereinabove, FIGS. 8A, 8B, 9A, and 9B are cross-sectional views illustrating the circular movement of the movable member 4. In this figure, the portion denoted by the reference symbol 26A represents the cross section of the blade 26 extending spirally. FIG. 10 corresponds to a cross-sectional view obtained by cutting along the III-III line in FIG. 8A. This is an explanatory figure in which the depiction of the fixing members is omitted to clarify the mutual arrangement of the screw 24 and the movable members 4. Conversely, FIG. 8A corresponds to a cross-sectional view taken along the IV-IV line in FIG. 10. FIG. 10 illustrates the relationship between movable members 4 and the screw 24, and in this figure the relative positions of the movable members 4 and the screw 24 and the screw shape do not perfectly match those shown in FIG. 5 (the same is true for FIGS. 15, 16, 31, and 33).

Oblique hatching provided in FIGS. 8 and 9 represents a portion of the movable member 4 that penetrates closer to the center axis line X of the screw 24 than the outer circumferential edge 32 of the blade 26 of the screw 24. In FIGS. 8 to 10, this portion of the movable member 4 that penetrates closer to the center axis line X of the screw 24 than the outer circumferential edge 32 of the blade 26 of the screw 24 is denoted by the reference numeral 51. As follows from FIG. 10, this portion 51 of the movable member 4 that penetrates closer to the center axis line X of the screw 24 than the outer circumferential edge 32 of the blade 26 of the screw 24 is positioned between two adjacent blade portions 33 so as to avoid interference with the blade 26 of the screw 24. Where the attention is focused on a portion 52 of the movable member 4 positioned on the side opposite that of the portion 51 of the movable member 4 with respect to the center line X of the screw 24, as shown in FIG. 8A and FIG. 10, another portion 34 of the blade 26 is positioned closer to the movable member portion 52. However, since the movable member portion 52 is set apart from the blade portion 34 of the screw 24 in the radial direction thereof, the blade portion 34 does not interfere with the blade 26 of the screw 24.

Clarified hereinbelow are the conditions that allow the movable member 4 to penetrate closer to the center axis line X of the screw 24 than the outer circumferential edge 32 of the blade 26 of the screw 24, without interfering with the blade 26 of the screw 24.

Figure 11:
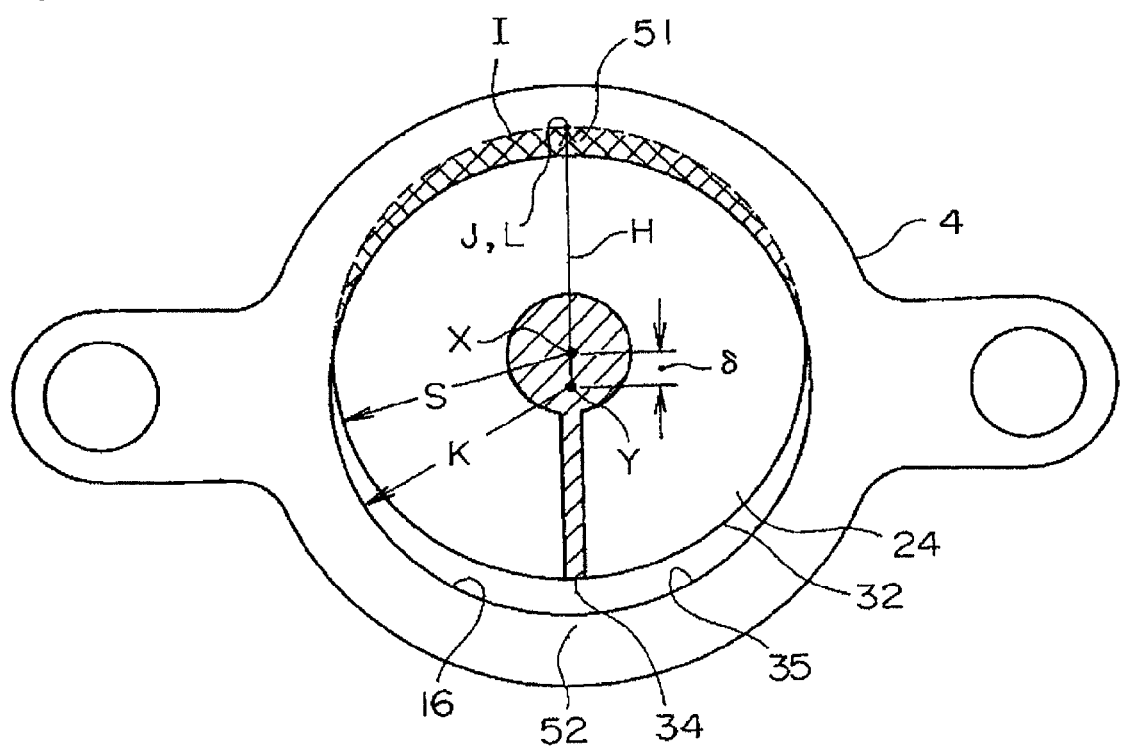
FIG. 11 is an enlarged cross-sectional view in which the screw and movable members shown in FIG. 8A are taken out.

FIG. 11 is an enlarged explanatory cross-sectional view in which the screw 24 and the movable member 4 shown in FIG. 8A are taken out to facilitate the understanding of the drawings. As shown in FIG. 11, the shortest distance from the center axis line Y of the through hole 16 of the movable member 4 to a circumferential edge 35 of the movable member 4 that demarcates the through hole 16 is denoted by K, the radius of the screw 24 is denoted by S, and the distance through which the center axis line Y of the through hole 16 is decentered from the center axis line X of the screw 24, that is, the eccentricity thereof, is denoted by $\delta$ as described hereinabove. In the solid-liquid separator of the present embodiment, since the through hole 16 has a round shape, the shortest distance K is the radius of the round through hole 16.

As clearly follows from FIG. 11, the condition of $K<S+\delta$ should be fulfilled in order that the portion 51 of the movable member 4, which is hatched obliquely in FIG. 11, could penetrate closer to the center axis line X of the screw 24. Conversely, the condition of $S=\delta<K$ should be fulfilled in order to prevent the portion 52 of the movable member 4 from interfering with the blade portion 34. These conditions remain unchanged when the movable member 4 occupies another position with respect to the screw 24, as shown in FIGS. 8B, 9A, and 9B. Thus, the through hole 16 of the movable member 4 that performs a circular movement, while penetrating closer to the center axis line X of the screw 24 than the outer circumferential edge 32 of the blade 26 of the screw 24, is formed such that the condition of $S-\delta<K<S+\delta$ is fulfilled. This condition is the first condition for penetration of the movable member.

Figure 16:
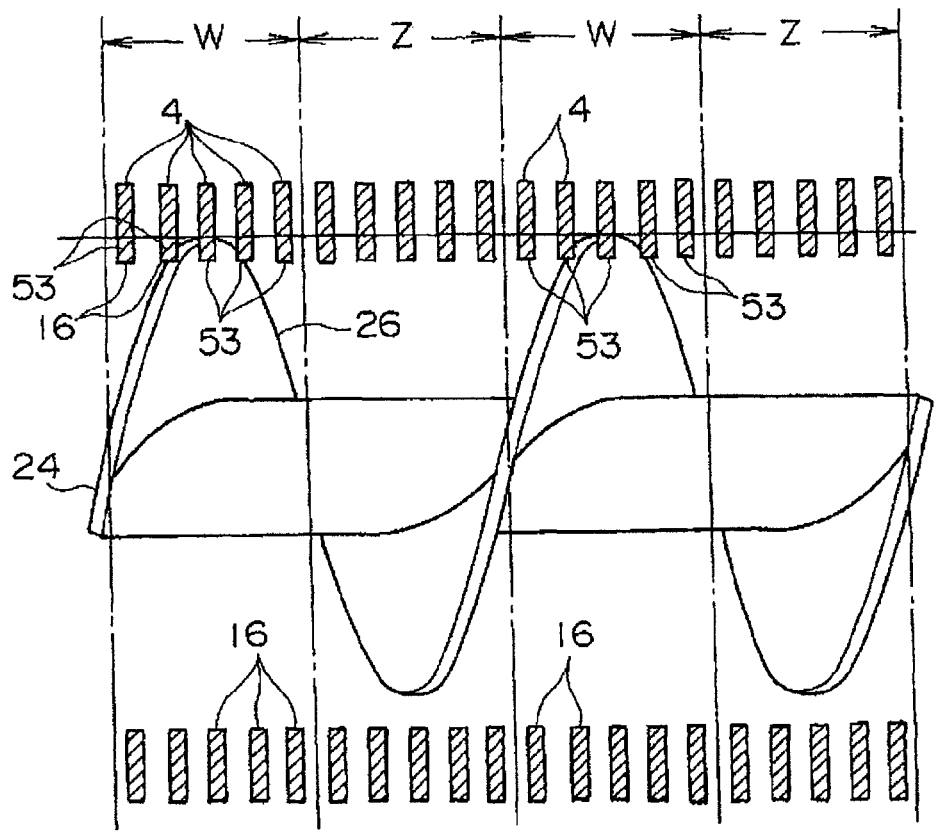
FIG. 16 is a cross-sectional view which is similar to that of FIG. 10 and explains how the movable member located in the region in which penetration is impossible cannot penetrate closer to the center axis line of the screw than the outer circumferential edge of the blade of the screw.

As follows from FIG. 10, the movable member portion 51 that has penetrated closer to the center axis line X of the screw 24 than the outer circumferential edge 32 of the blade 26 between the two adjacent blade portions 33 of the screw 24 is positioned within the range of a region Z in the center axis line direction of the screw 24. The entire center axis line Y of the through hole 16 of the movable member 4 in the present embodiment is offset by the same distance $\delta$ in the same direction with respect to the center axis line X of the screw 24. In addition, the blade 26 of the screw 24 extends spirally. Therefore, for the movable member 4 positioned in a region W outside the aforementioned region Z, even if the through hole 16 is formed such that the aforementioned first condition for penetration is fulfilled, the movable member 4 will interfere with the blade 26 of the screw 24. Therefore, the movable member 4 located in the region W cannot penetrate closer to the center axis line X of the screw 24 than the outer circumferential edge 32 of the blade 26 thereof. As shown in FIG. 16, assuming that the through hole 16 of the movable member 4 positioned in the region W is formed such that the aforementioned first condition for penetration is fulfilled, the portion 53 of the movable member 4 will interfere with the blade 26 of the screw 24. Therefore, the through hole 16 of the movable member 4 positioned in the region W actually cannot be formed such as to fulfill the first condition.

In the explanation below, the region Z shown in FIG. 10 will be referred to as a region in which penetration is possible and the region W shown in the same figure will be referred to as a region in which penetration is impossible.

FIGS. 12A, 12B, 13A, and 13B illustrate the relative positional relationship of the movable member 4 positioned in the region W in which penetration is impossible (shown in FIG. 10) and the screw 24. Similarly to FIG. 11, the fixed members are omitted and the cross section of the blade 26 of the screw 24 is denoted by the reference symbol 26A. FIG. 13A corresponds to the cross section taken along the V-V line in FIG. 10, these figures also illustrate how the movable member 4 performs a circular movement in which the center axis line Y of the through hole 16 of the movable member 4 describes a circle with a radius equal to the eccentricity δ around the center axis line X of the screw 24 in the order shown in FIGS. 12A, 12B, 13A, and 13B.

In this case, too, where the shortest distance K (in this example, the radius of the through hole 16) from the center axis line Y of the through hole 16 of the movable member 4 to the circumferential edge 35 of the movable member 4 that demarcates the through hole 16 is denoted by K and the radius of the screw 24 is denoted by S, the relationship between K, S, and eccentricity δ fulfills the condition of K>S+δ. This condition is called the movable member interference avoidance condition. As follows from FIGS. 12A, 12B, 13A, and 13B, where the interference avoidance condition is fulfilled, the movable member 4 does not penetrate closer to the center axis line X of the screw 24 than the outer circumferential edge 32 of the blade 26 of the screw 24 and, therefore, the movable member 4 does not interfere with the blade 26 when the movable member 4 present in the region W in which penetration is impossible occupies any position with respect to the screw 24. Thus, the through hole 16 of the movable member 4 that performs a circular movement, without penetrating closer to the center axis line X of the screw 24 than the outer circumferential edge 32 of the blade 26 of the screw 24, is formed to fulfill the condition K>S+δ.

In this case, the movable member 4 that can perform a circular movement, while penetrating closer to the center axis line X of the screw than the outer circumferential edge 32 of the blade 26 of the screw 24, should be positioned within the region Z in which penetration is possible (shown in FIG. 10); this region Z in which penetration is possible is determined in the following manner.

When the movable member 4 performs a circular movement such that the center axis line Y of the movable member 4 describes a circle with a radius equal to the eccentricity δ of the center axis line Y thereof around the center axis line X of the screw 24, as mentioned hereinabove, a point in which a straight line H that is drawn from the center axis line Y of the through hole 16 of the movable member 4 in the radial direction of the screw 24 toward the center axis line X of the screw 24 crosses a virtual tube I including the outer circumferential edge 32 of the screw 24 after passing beyond the center axis line X of the screw 24 is taken as an outer circumferential edge crossing point J, as shown in FIGS. 10 and 11. Where a straight line passing through the outer circumferential edge crossing point J and extending parallel to the center axis line X of the screw 24 is taken as a center parallel line L and crossing points of the center parallel line L with two blade portions 33 of the screw 24 that are adjacent in the direction of the center axis line X of the screw 24 are taken as blade crossing points M, a region of a predetermined width in the direction of the center axis line X of the screw 24 that is narrower than the distance between the aforementioned two blade portions 33 and includes a center point N of the two blade crossing points M will be the aforementioned region Z in which penetration is possible. As mentioned hereinabove, the region Z in which penetration is possible is narrower than the distance between the two adjacent blade portions 33, that is, narrower than a pitch P. The aforementioned movable member 4 that performs a circular movement, while penetrating closer to the center axis line X of the screw 24 than the outer circumferential edge 32 of the blade 26 of the screw 24, is positioned within the region of this width, that is, within the region Z in which penetration is possible. This condition is taken as the second conditions for penetration of the movable member. Where the aforementioned first and second conditions are fulfilled, the movable member 4 can perform a circular movement, while penetrating closer to the center axis line X of the screw 24 than the outer circumferential edge 32 of the blade 26 of the screw 24.

Figure 14:
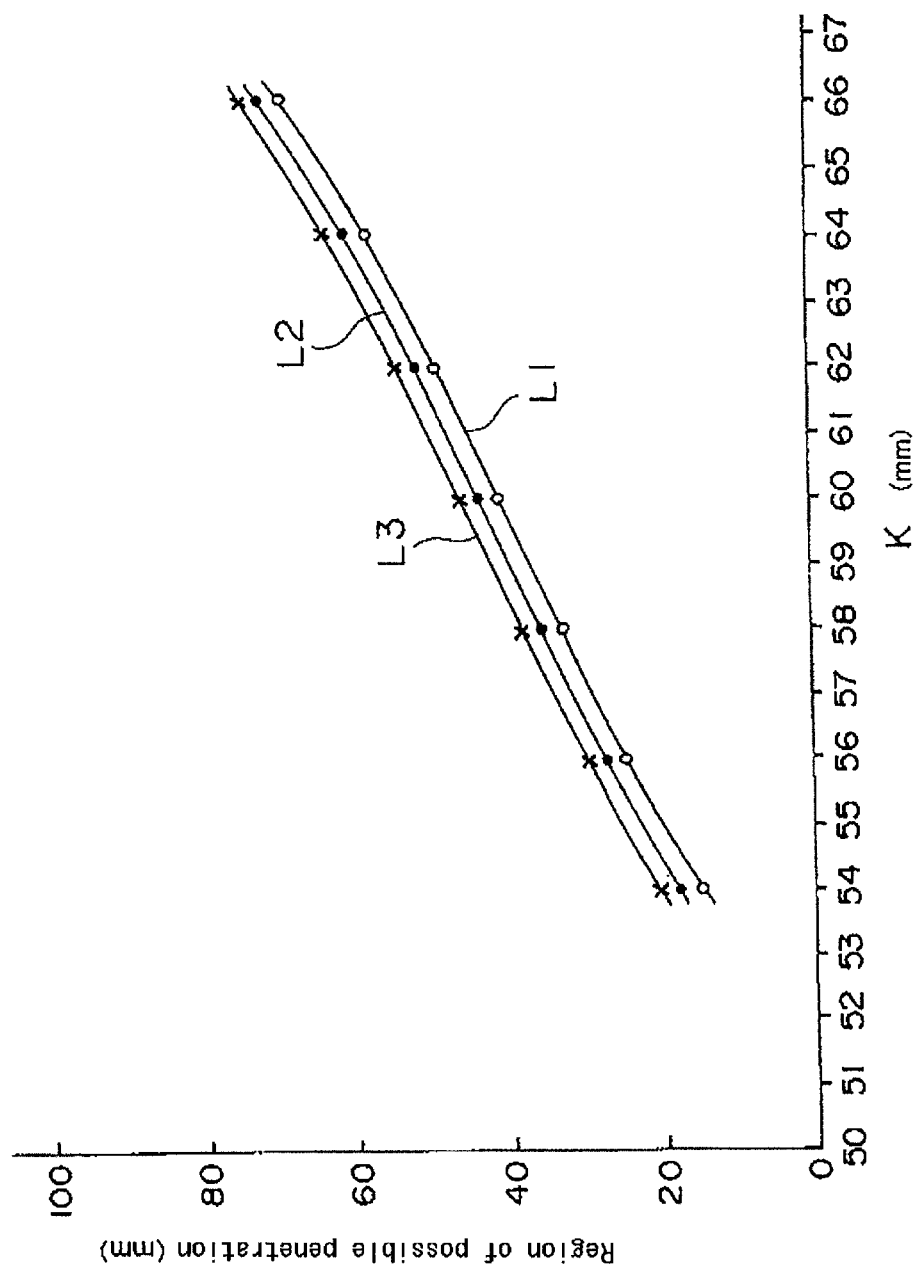
FIG. 14 is a graph showing by way of example the relationship between the radius of the through hole of the movable member and the region in which penetration is possible.
Figure 15:
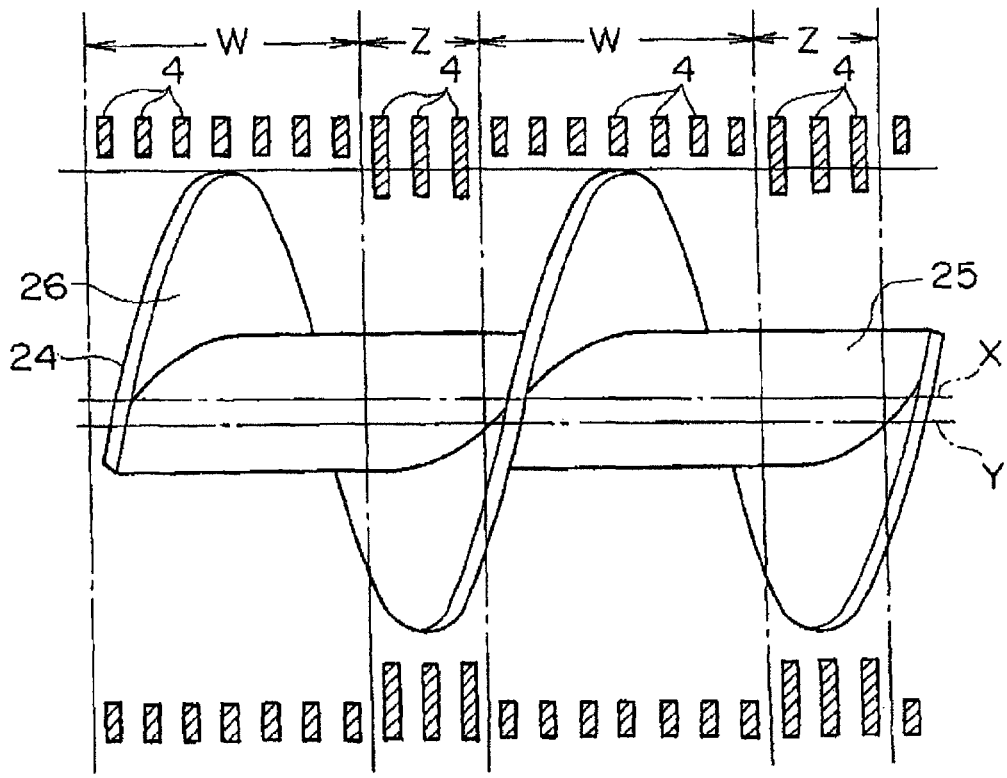
FIG. 15 is an explanatory cross-sectional view which is similar to that of FIG. 10 and illustrates an example in which the region in which penetration is possible is narrower than that in FIG. 10.

The abovementioned region Z in which penetration is possible is determined by the pitch P of the blade 26 of the screw 24 shown in FIG. 10, the thickness d of the blade 26, the aforementioned shortest distance K from the center axis line Y of the through hole 16 of the movable member, the aforementioned eccentricity δ, and the radius S of the screw 24. FIG. 14 shows graphs representing the results of analysis performed by using an actual solid-liquid separator to determine how the region Z in which penetration is possible changes according to the value of the shortest distance K (in this case, the radius of the through hole 16), when P=100 mm and δ=8 mm. In the figure, L1 shows the results obtained when d=2 mm, L2 shows the results obtained when d=4 mm, and L3 shows the results obtained when d=6 mm. As follows from this graph, the width of the region Z in which penetration is possible increases with the increase in the radius of the through hole 16 of the movable member 4. FIG. 15 illustrates an example in which the width of the region Z in which penetration is possible is decreased with respect to that in the case shown in FIG. 10.

In the example shown in FIGS. 8 to 13, the center axis line of the through hole 16 of the movable member 4 and the center axis line of the eccentric cams 57, 157 coincide, and the movable member 4 performs a circular movement, while the center axis line Y of the through hole 16 of the movable member 4 describes a circle around the center axis line X of the screw 24. In this case, the shortest distance K, as described hereinabove, becomes the shortest distance from the center axis line of the through hole 16 of the movable member 4 to the circumferential edge 35 of the movable member 4 demarcating the through hole 16. By contrast, where the case is included in which the center axis line of the through hole 16 and the center axis line of the eccentric cams 57, 157 do not coincide and the aforementioned shortest distance K is considered, this shortest distance K is defined as the shortest distance from the center axis line of the eccentric cams 57, 157 to the circumferential edge 35 of the movable member 4 demarcating the through hole 16 of the movable member 4.

FIGS. 17A, 17B, 18A, and 18B are explanatory drawings illustrating the above-described feature and showing a state of the region in which penetration is possible in the case in which the center axis line of the through hole 16 of the movable member and the center axis line Y of the eccentric cams 57, 157 formed with a round outer circumferential surface do not coincide. Here, for the sake of simplification of figures the through hole 16 of the movable member is shown by a two-dot-dash line, the eccentric cams 57, 157 are shown by a dot-dash line, the screw 24 is shown by a solid line, and the cross section of the blade 26 of the screw 24 is denoted by the reference symbol 26A. In this case, since the screw 24 rotates (revolves) around the center axis line X thereof, the eccentric cams 57, 157 fixed to the shaft 25 of the screw 24 rotate in the order shown in FIGS. 17A, 17B, 18A, and 18B, while, as shown by arrow E, the center axis line Y of the eccentric cams describes a circle with a radius equal to the eccentricity δ of the eccentric cams 57, 157 around the center axis line X of the screw 24. A portion of the movable member that is obliquely hatched in FIGS. 17 and 18 penetrates closer to the center axis line X of the screw 24 than the outer circumferential edge 32 of the blade 26 of the screw 24. However, in this example, the center axis line of the through hole 16 does not coincide with the center axis line Y of the eccentric cams 57, 157 and in this aspect the aforementioned configuration is different from that of the example shown in FIGS. 8, 9, and 11.

Figure 18:
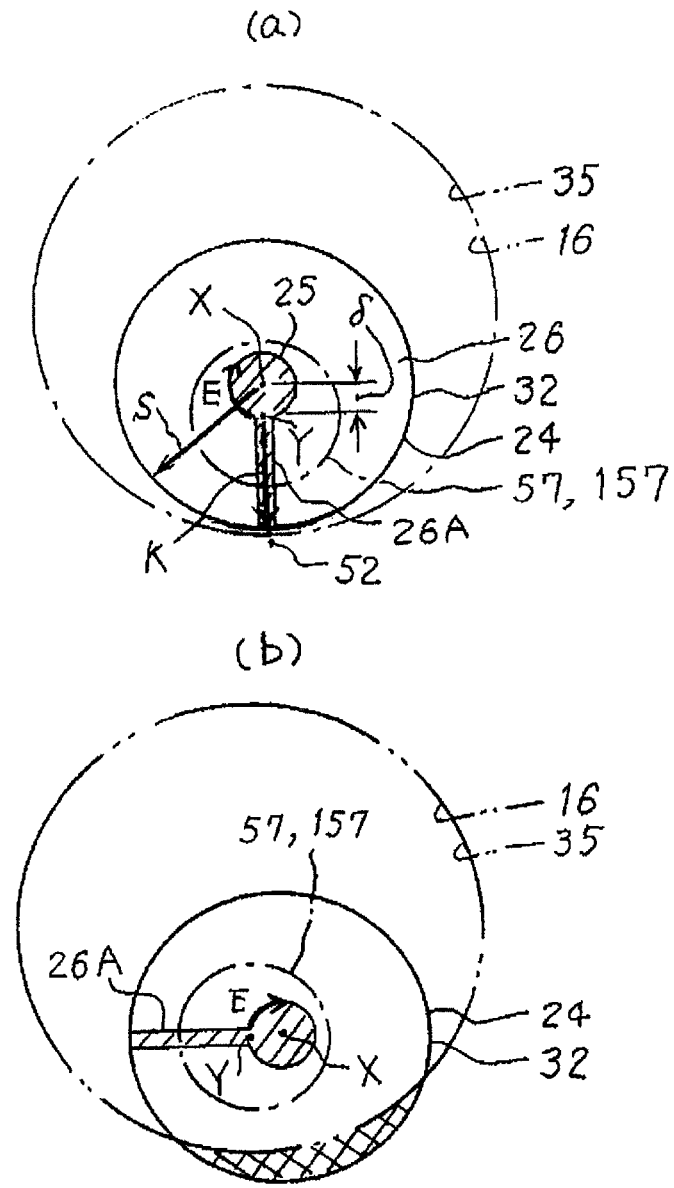
FIG. 18 is an explanatory drawing illustrating how the movable member penetrates closer to the center axis line of the screw than the outer circumferential edge of the blade of the screw in the case where the center axis line of the through hole formed in the movable member does not coincide with the center axis line of the eccentric cam.

Here, where the shortest distance from center axis line Y of the eccentric cams 57, 157 to the circumferential edge 35 of the movable member that demarcates the through hole 16 of the movable member is denoted by K, the radius of the screw 24 is denoted by S, and the eccentricity of the center axis line Y of the eccentric cams 57, 157 from the center axis line X of the screw 24 is denoted by δ, as shown in FIGS. 17A and 18A, the condition of K<S+δ should be fulfilled in order that the portion 51 of the movable member could penetrate closer to the center axis line X of the screw 24, as shown in FIG. 17A. Conversely, the condition of S−δ<K should be fulfilled in order to prevent the portion 52 of the movable member from interfering with the blade portion 34, as shown in FIG. 18A. In this case, the through hole 16 of the movable member that performs a circular movement, while penetrating closer to the center axis line X of the screw 24 than the outer circumferential edge 32 of the blade 26 of the screw 24, is also formed such that the condition of S−δ<K<S+δ, which is the first condition for penetration the movable members, is fulfilled. In the example shown in FIGS. 8, 9, and 11, the center axis line of the through hole 16 coincides with the center axis line of the eccentric cams 57, 157. Therefore, the shortest distance K from the center axis line Y of the eccentric cams 57, 157 to the circumferential edge 35 of the movable member that demarcates the through hole 16 becomes the shortest distance K from the center axis line of the through hole 16 to the circumferential edge 35 of the through hole 16. FIGS. 8, 9, and 11 illustrate a special case of the example shown in FIGS. 17 and 18.

Meanwhile, FIGS. 19A, 19B, 20A, and 20B are explanatory drawings similar to FIGS. 17 and 18 that show the state of the region in which penetration is impossible in the case in which the center axis line of the through hole 16 of the movable member does not match the center axis line Y of the eccentric cams 57, 157. The screw 24 rotates in the order shown in FIGS. 19A, 19B, 20A, and 20B, and the eccentric cams 57, 157 rotate, while, as shown by arrow E, the center axis line Y thereof describes a circle with a radius equal to the eccentricity δ of the center axis line Y around the center axis line X of the screw 24. As a result, the movable member having the through hole 16 performs a circular movement.

In this case, too, where the shortest distance from center axis line Y of the eccentric cams 57, 157 to the circumferential edge 35 of the movable member that demarcates the through hole 16 of the movable member is denoted by K, the radius of the screw 24 is denoted by S, and the eccentricity of the eccentric cams 57, 157 from the center axis line X of the screw 24 is denoted by δ, in the same manner as in FIGS. 17 and 18, it is clear from FIG. 19A that the movable member which performs a circular movement without penetrating closer to the center axis line X of the screw 24 than the outer circumferential edge 32 of the blade 26 of the screw 24 fulfills the condition K>S+δ which is an interference condition of the movable member. As clearly follows from FIGS. 19A, 19B, 20A, and 20B, when such condition is fulfilled, even when the movable member that is present in the region W in which penetration is impossible occupies any position with respect to the screw 24, this movable member does not penetrate closer to the center axis line X of the screw 24 than the outer circumferential edge 32 of the blade 26 of the screw 24 and, therefore, the movable member does not interfere with the blade 26.

Figure 13:
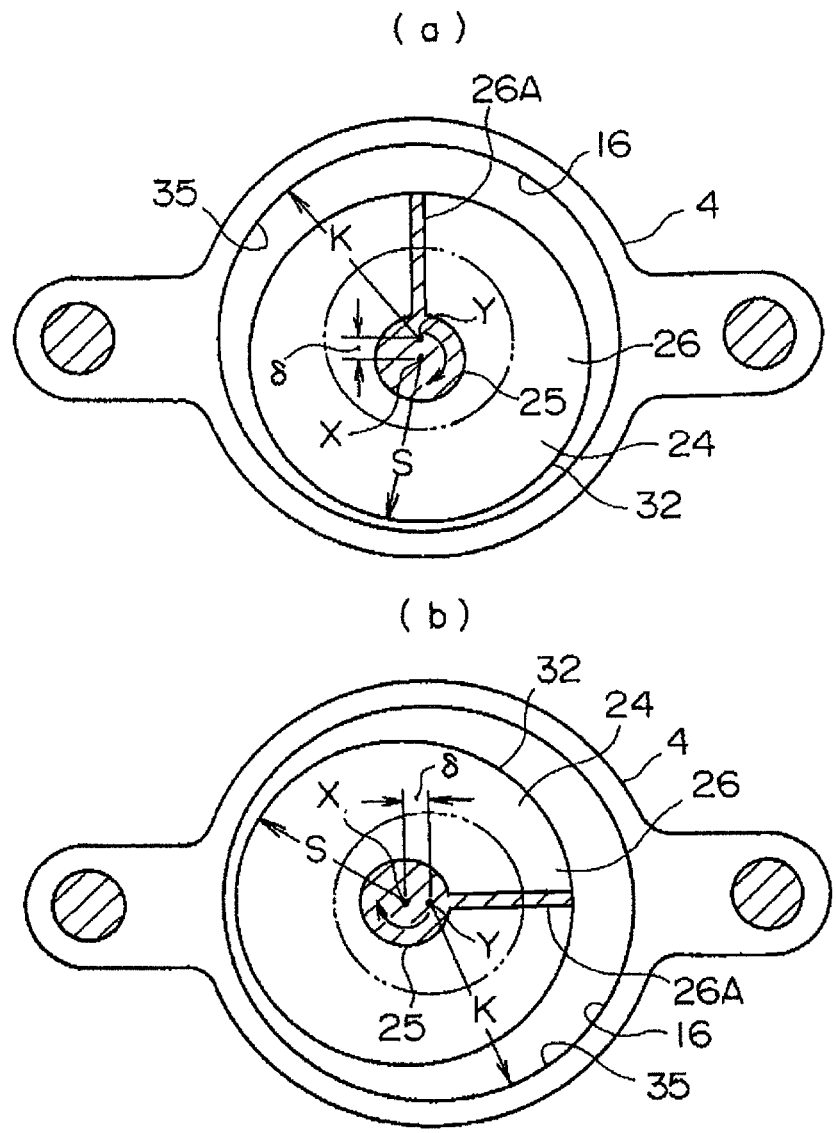
FIG. 13 is a cross-sectional view which is similar to that of FIG. 9 and clarifies the operation of the movable member positioned in the region in which penetration is impossible.

FIGS. 12 and 13 illustrate a special case of the example shown in FIGS. 19 and 20, that is, the case in which the center axis line of the through hole 16 and the center axis line of the eccentric cams 57, 157 coincide.

The region Z in which penetration is possible can be determined in the same manner as explained hereinabove in relation to FIG. 10, including the case in which the center axis line of the through hole 16 and the center axis line of the eccentric cams 57, 157 do not coincide. Thus, where a point in which a straight line H that is drawn from the center axis line Y of the eccentric cams 57, 157 in the radial direction of the screw 24 toward the center axis line X of the screw 24 crosses the virtual tube I including the outer circumferential edge 32 of the screw 24 after passing beyond the center axis line X of the screw 24 is taken as an outer circumferential edge crossing point J, a straight line passing through the outer circumferential edge crossing point J and extending parallel to the center axis line X of the screw 24 is taken as the center parallel line L and crossing points of the center parallel line L with two blade portions 33 of the screw 24 that are adjacent in the direction of the center axis line X of the screw 24 are taken as blade crossing points M, as shown in FIG. 10, the movable member 4 that performs a circular movement, while penetrating closer to the center axis line X of the screw 24 than the outer circumferential edge 32 of the blade 26 of the screw 24, is positioned within the region Z in which penetration is possible and which has a predetermined width in the direction of the center axis line X of the screw and is narrower than the distance between the aforementioned two blade portions 33 and includes a center point N of the two blade crossing points M, regardless of whether or not the center axis line of the through hole 16 and the center axis line of the eccentric cams 57, 157 coincide. When the center axis line of the through hole 16 and the center axis line of the eccentric cams 57, 157 coincide, the straight line H is drawn from the center axis line of the through hole 16 toward the center axis line X of the screw 24, as in the aforementioned special case.

In the solid-liquid separator explained hereinabove, the through hole 16 of the movable member 4 has a round form, but as mentioned hereinabove, the through hole 16 can have an appropriate shape other than the round shape, for example, an oval or polygonal shape. The oval shape as referred to herein includes not only an elliptical shape, but also a shape obtained by collapsing a circle.

Even when the shape of the through hole of the movable member is other than the round shape, the aforementioned first and second conditions for penetration of the movable members may be fulfilled in order to enable the movable members to perform a circular movement, while penetrating closer to the center axis line of the screw than the outer circumferential edge of the blade of the screw, without coming into contact with the screw. To be sure, a condition will be explained that relates to the case in which the center axis line of the through holes and the center axis line of the eccentric cams 57, 157 coincide and the through holes are ovals. Since the second condition for penetration of the movable members is absolutely identical to that described hereinabove, redundant explanation thereof is herein omitted, and the first condition for penetration of the movable members will be explained.

FIGS. 21A to 21D are explanatory drawings that are similar to FIGS. 8 and 9 and illustrate the relative positional relationship of the through hole 16 of the movable member positioned in the region in which penetration is possible and the screw 24. Here, the through hole 16 is shown by a two-dot-like line and the screw 24 is shown by a solid line to facilitate the understanding of the drawings. The reference symbol 26A in these drawings also denotes the cross section of the blade 26 of the screw 24. Since the through hole 16 of the movable member shown herein has an oval shape, the center axis line Y thereof is a crossing point of the long axis LA and short axis SA of the oval. In the same manner as in the example explained hereinabove, the movable member performs a circular movement in the order presented in FIGS. 21A to 21D, as shown by arrow E, while the center axis line Y of the through hole 16 describes a circle with a radius equal to the eccentricity $\delta$ of the center axis line Y of the through hole 16 with respect to the center axis line X of the screw 24. In this case, the obliquely hatched portion of the movable member in FIG. 21 also penetrates closer to the center axis line X of the screw 24 than the outer circumferential edge 32 of the blade 26 of the screw 24.

In this configuration, the shortest distance from the center axis line Y of the through hole 16 of the movable member to the circumferential edge 35 of the movable member that demarcates the through hole 16 is denoted by K, the radius of the screw 24 is denoted by S, and the eccentricity of the center axis line Y of the through hole 16 with respect to the center axis line X of the screw 24 is denoted by $\delta$. Since the through hole 16 shown herein is an oval, the shortest distance K from the center axis line Y thereof to the circumferential edge 35 is ½ of the short axis SA of the through hole 16.

As follows from FIG. 21A, the condition of $K<S+\delta$ should be fulfilled in order that the portion 51 of the movable member, which is hatched obliquely, could penetrate closer to the center axis line X of the screw 24 than the outer circumferential edge 32 of the blade 26 of the screw 24. Further, the condition of $K>S-\delta$ should be fulfilled in order to prevent the portion 52 of the movable member from coming into contact with the blade 26 of the screw 24. As a result, the condition for enabling the movable member to penetrate closer to the center axis line X of the screw 24 is $S-\delta<K<S+\delta$ and this condition matches the aforementioned first condition. Where the first condition is fulfilled, as shown in FIG. 21A to 21D, even when the through hole 16 of the movable member assumes any position with respect to the screw 24, the movable member can penetrate closer to the center axis line X than the outer circumferential edge 32 of the blade 26, without interfering with the screw 24.

Figure 21:
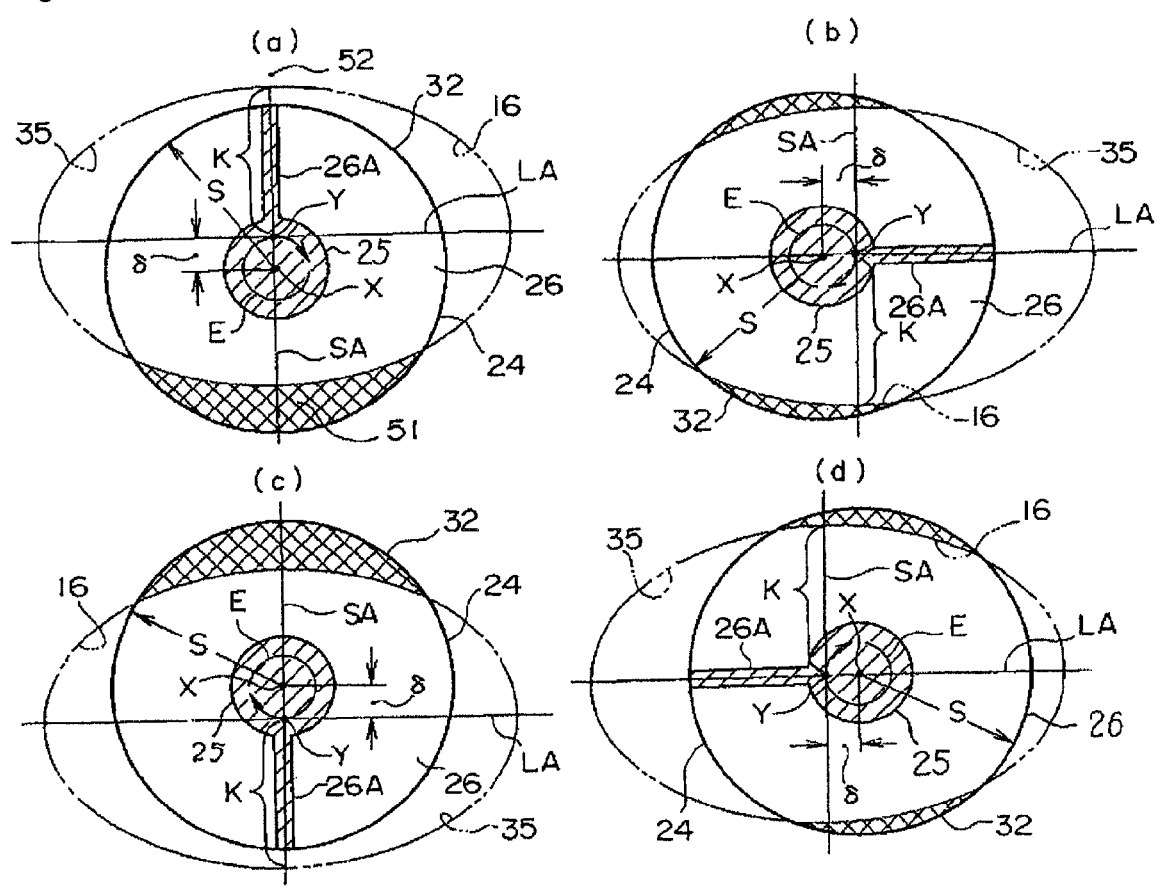
FIG. 21 is an explanatory drawing illustrating the circular movement of the movable member with an oval through hole.

It follows from FIG. 21A that in order to avoid interference of the movable member positioned in the region in which penetration is impossible with the screw 24, the shortest distance K should be larger than the sum of the radius S and the eccentricity $\delta$ of the screw, that is, the condition of $K>S+\delta$ should be fulfilled. This condition matches the aforementioned interference avoidance condition. Where such condition is fulfilled, even when the movable member present in the region in which penetration is impossible occupies any position with respect to the screw 24, this movable member can perform a circular movement without interfering with the screw 24. Other features and operations of the solid-liquid separator shown in FIG. 21 are similar to those of the solid-liquid separator explained hereinabove with reference to FIGS. 1 to 15.

When the shape of the through hole of the movable member is other than round or oval, the region Z in which penetration is possible, region W in which penetration is impossible, first and second conditions for penetration, and interference avoidance condition can be determined in exactly the same manner as described above, and the movable member having the through hole of such shape can be used without any obstacle. As shown in FIG. 22A, when the through hole 16 of the movable member has a quadrangular shape, the length of one side is (a), and the length of the other side is (b), the crossing point of the lines equal to ½ of each side is the center axis line Y thereof. As shown in FIG. 22(*b*), when the through hole 16 of the movable member has a triangular shape, the center axis line Y thereof is the position of the center of gravity of the triangle.

From the standpoint of increasing the conveying ability of the object to be treated in the solid-liquid separation portion and the dewatering efficiency thereof, it is more preferred that the through hole of the movable member have a round or oval shape than the polygonal shape. Further, a large number of zigzag protrusions and depressions can be also formed at the circumferential edge 35 demarcating the round, oval, or polygonal through holes 16 of the movable members 4.

FIGS. 23A, 23B, 24A, and 24B, similarly to FIGS. 8A, 8B, 9A and 9B, are cross-sectional views illustrating another example serving to clarify the circular movement of the movable member 4 positioned in the region in which penetration is possible. In FIGS. 23 and 24, the depiction of fixed members is omitted in the same manner as in FIG. 11. The through hole 16 of the movable member 4 shown herein has a round basic shape centered on the center axis line Y, a protruding section 36 is formed in the circumferential edge 35 of the movable member 4 demarcating the through hole 16, and the through hole is configured such that the protruding section 36 penetrates closer to the center axis line X of the screw 24 than the outer circumferential portion 32 of the blade 26 of the screw 24. More specifically, the movable member 4 that performs a circular movement, while penetrating closer to the center axis line X of the screw 24 than the outer circumferential portion 32 of the blade 26 of the screw 24 is configured such that part of the circumferential edge 35 of the movable member 4 demarcating the through hole 16 of the movable member 4 protrudes closer to the center axis line Y of the through hole 16 than other circumferential edge portions, and this protruding section 36 penetrates closer to the center axis line X of the screw 24 than the outer circumferential portion 32 of the blade 26 of the screw 24. In FIGS. 23 and 24, the reference symbol 26A also denotes the cross section of the blade 26 integrated with the shaft 25 of the screw 24.

In the case of the solid-liquid separator shown in FIGS. 23A, 23B, 24A, and 24B, the center axis line Y of the through hole 16 is also offset by $\delta$ with respect to the center axis line X of the screw 24, and the movable member 4 performs a circular movement in the order shown in FIGS. 23A, 24B, 24A, and 24B, while the center axis line Y of the through hole 16 thereof describes a circle having a radius equal to the eccentricity $\delta$ around the center axis line X of the screw 24, as shown by arrow E. In this case, the first and second conditions for penetration of the movable members that have been described hereinabove may be also fulfilled to enable the movable member 4 to perform a circular movement, without coming into contact with the screw 24, while the protruding section 36 of the movable member 4 penetrates closer to the center axis line X thereof than the outer circumferential edge 32 of the blade 26 of the screw 24. Since the second condition is obtained in exactly the same manner as explained hereinabove, only the first condition for penetration of the movable members 4 will be clarified below.

Figure 24:
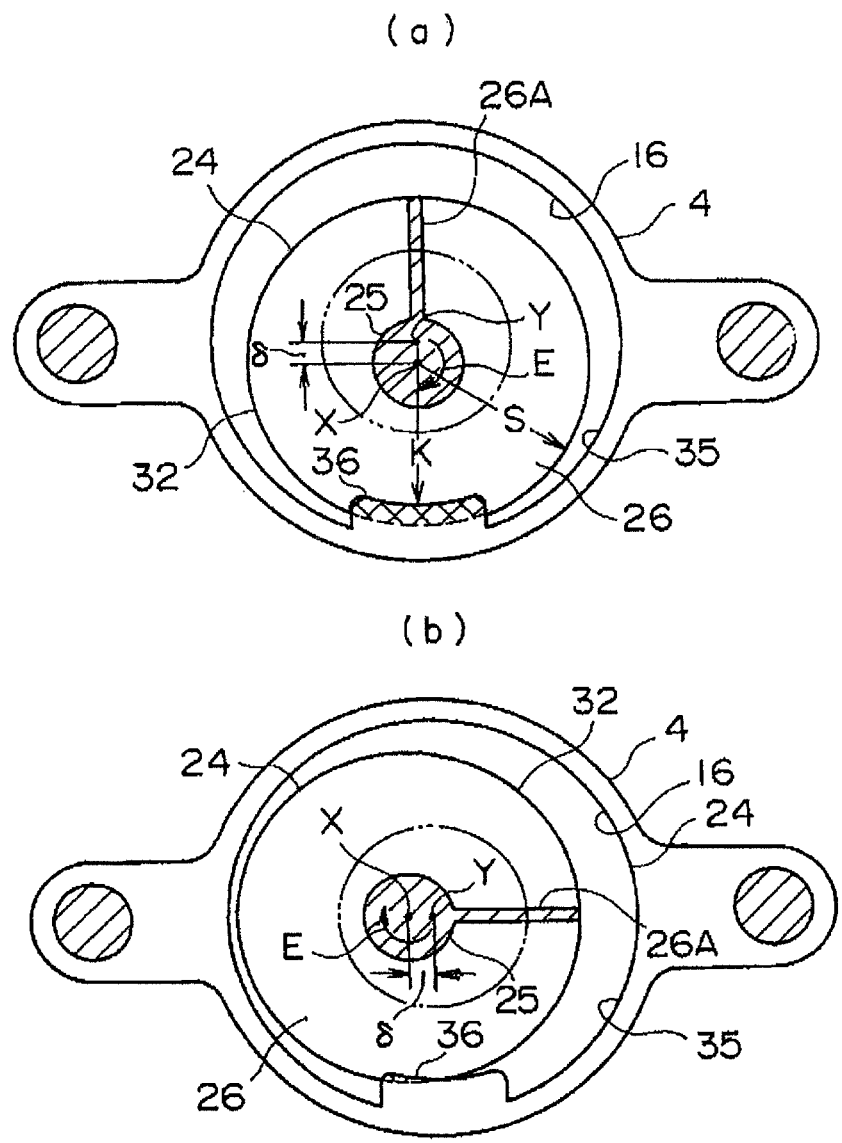
FIG. 24 is a cross-sectional view illustrating how a movable member having a protruding section formed in part of the circumferential edge of the movable member demarcating the through hole performs a circular movement.

In FIGS. 23 and 24, oblique hatching is also provided with respect to a portion in which the protruding section 36 of the movable member 4 penetrates closer to the center axis line X of the screw 24 than the outer circumferential edge 32 of the blade 26 of the screw 24. As shown in FIG. 23A and FIG. 24A, in this case, too, where the shortest distance from the center axis line Y of the through hole 16 to the circumferential edge 35 of the movable member 4 demarcating the through hole 16 is denoted by K, this shortest distance K will be the distance from the center axis line Y of the through hole 16 to the protruding section 36. Further, where the radius of the screw 24 is denoted by S and the eccentricity of the center axis line Y of the through hole 16 with respect to the center axis line X of the screw 24 is denoted by δ, in the same manner as described above, it follows from FIG. 24A that the condition of K<S+δ should be fulfilled in order that the protruding section 36 could penetrate closer to the center axis line X of the screw 24 than the outer circumferential edge 32 thereof. Further, as can be recognized in FIG. 23A, the condition of K>S−δ should be fulfilled in order to prevent the protruding section 36 from interfering with the blade 26. As a result, in this case, too, where the first condition of S−δ<K<S+δ is fulfilled, the movable member 4 can perform a circular movement, while penetrating closer to the center axis line X of the screw 24 than the outer circumferential edge 32 of the blade 26 thereof, without interfering with the screw 24.

Further, in the embodiment illustrated by FIGS. 23 and 24, the condition of K>S+δ should be also fulfilled, as follows from FIG. 24A, in order to prevent the movable member positioned in the region in which penetration is impossible from interfering with the screw 24. Where such condition is fulfilled, the movable member present in the region in which penetration is impossible can perform a circular movement without coming into contact with the screw 24. Other features of the solid-liquid separator shown in FIGS. 23 and 24 are similar to those of the abovementioned solid-liquid separator shown in FIGS. 1 to 20.

The solid-liquid separator explained hereinabove with reference to FIGS. 21, 23, and 24 is configured such that the center axis line of the through hole 16 of the movable member and the center axis line of the eccentric cams 57, 157 (see FIGS. 8 and 9) coincide and the movable member performs a circular movement such that the center axis line Y thereof describes a circle with a radius equal to the eccentricity δ of the eccentric cams 57, 157 around the center axis line X of the screw 24. However, the explanation provided hereinabove clearly demonstrates that where the shortest distance from the center axis line of the eccentric cams 57, 157 to the circumferential edge 35 of the movable member demarcating the through hole 16 of the movable member is denoted by K and the configuration is used in which the condition of S−δ<K<S+δ is fulfilled and the condition of K>S+δ is fulfilled, the movable member penetrates closer to the center axis line X than the outer circumferential edge 32 of the screw 24, without interfering with the screw 24, even when the center axis lines of the movable members do not coincide, or the center axis line of the through hole 16 and the center axis line of the eccentric cams 57, 157 do not coincide, or the center axis line of the through hole 16 is not defined.

Explained hereinabove is the solid-liquid separator in which the center axis lines Y of the through holes 16 of all of the movable members 4 coincide and the movable members perform a circular movement, while the center axis lines Y thereof describe a circle with a radius equal to the eccentricity δ of the center axis line Y of the through hole 16 of the movable member 4 around the center axis line X of the screw 24, but as mentioned hereinabove a configuration in which the center axis lines of the movable members 4 do not coincide can be also used. Furthermore, in another possible configuration, as shown schematically by a broken line and a two-dot-dash line in FIG. 25A, all of the center axis lines Y of the through holes 16 of some movable members coincide, all of the center axis lines YA of the through holes 16A of other movable members also coincide, the center axis line Y of the through holes 16 of some movable members does not coincide with the center axis line YA of the through holes 16A of other movable members, and the part of the plurality of movable members and other movable members perform circular movements, while the center axis lines Y, YA of the through holes 16, 16A thereof describe circles with radii equal to the eccentricities of the center axis lines Y, YA of the through holes 16, 16A of the movable members with respect to the center axis line X of the screw around the center axis line X of the screw 24 shown by the solid line in FIG. 25A.

FIG. 25A shows movable members of two types, namely, a movable member provided with the through hole 16 having the center axis line Y and a movable member provided with the through hole 16A having the center axis line YA that does not coincide with the center axis line Y, but movable members of three or more types in which the center axis lines do not coincide can be also provided. FIG. 25B illustrates a solid-liquid separator including a first plurality of movable members provided with through holes 16 having a center axis line Y, a second plurality of movable members provided with through holes 16A having a center axis line YA, and a third plurality of movable members provided with through holes 16B having a center axis line YB. The center axis lines Y, YA, YB are decentered from the center axis line X of the screw 24, and the center axis lines Y, YA, YB do not coincide with each other. The movable members of three types perform circular movements, while the center axis lines Y, YA, YB thereof describe circles with radiuses equal to the eccentricities of the center axis lines Y, YA, YB of the through holes 16, 16A, 16B of the movable members around the center axis line X of the screw 24.

As follows from FIGS. 25A and 25B, the solid-liquid separator can be configured to have a plurality of eccentric cams with center axis lines Y, YA, YB that do not coincide. The center axis lines Y, YA, YB of the plurality of eccentric cams are decentered from the center axis line X of the screw 24, and the plurality of eccentric cams rotate, while the center axis lines Y, YA, YB thereof describe circles with radii equal to the eccentricities of the eccentric cams around the center axis line X of the screw 24. Such a configuration can be used regardless of whether or not the center axis line of the movable member and the center axis line of the eccentric cams coincide.

Figure 26:
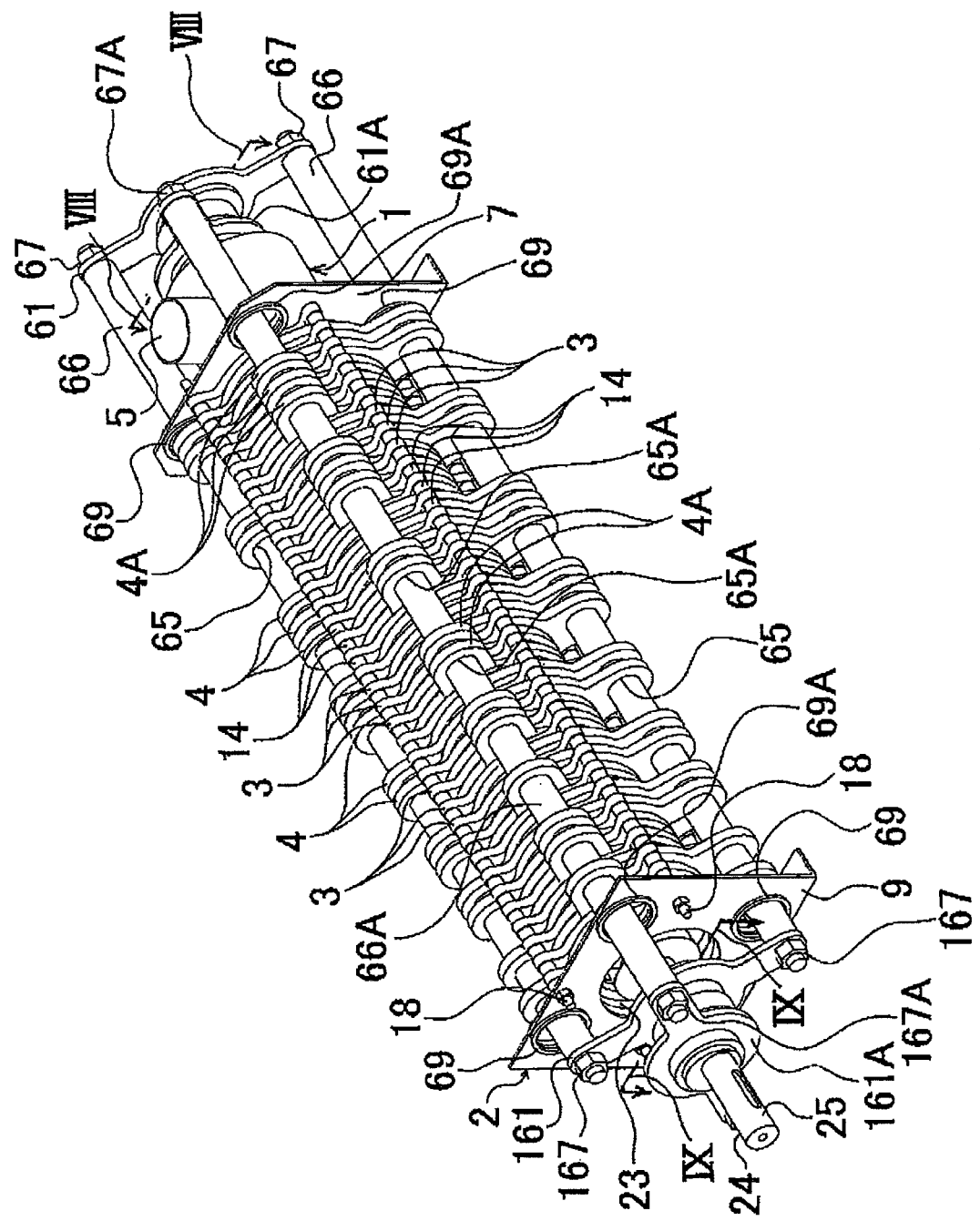
FIG. 26 is a perspective view of a solid-liquid separator in which the configuration shown in FIG. 21A is realized.
Figure 27:
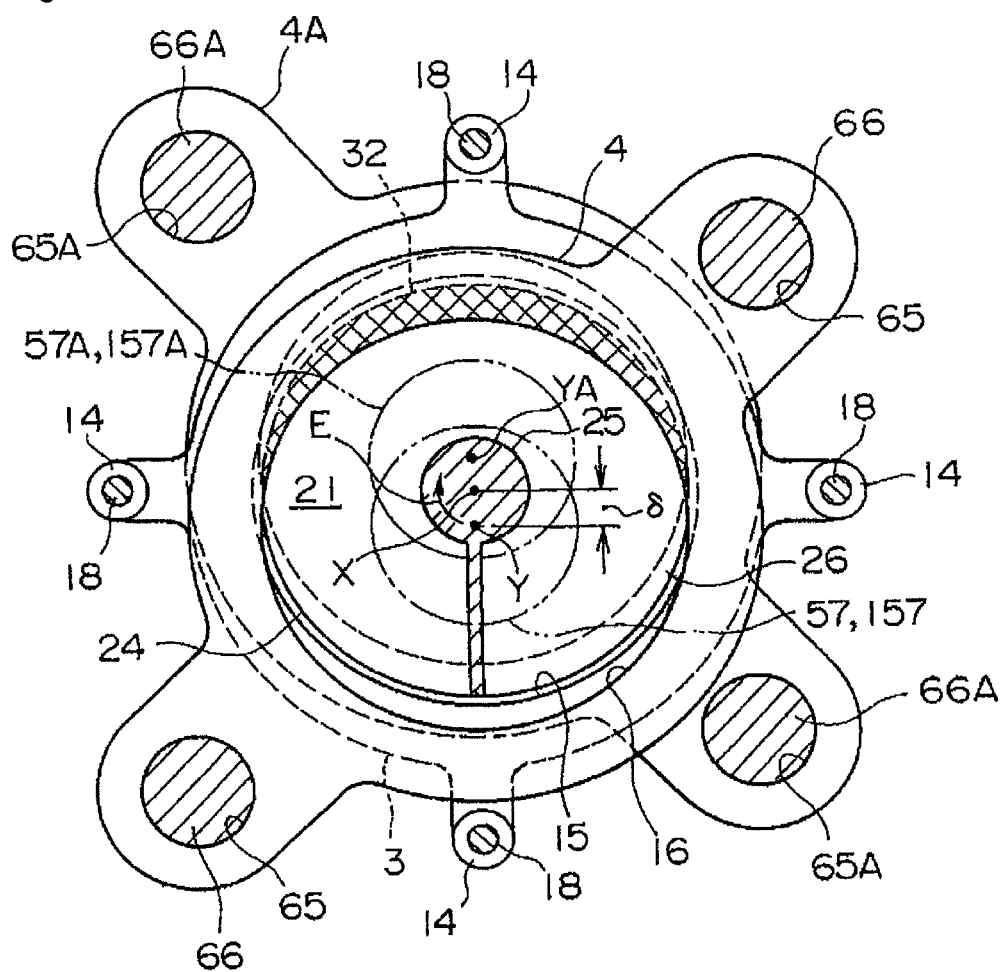
FIG. 27 is a cross-sectional view corresponding to the cross section taken along the VI-VI line in FIG. 31.
Figure 28:
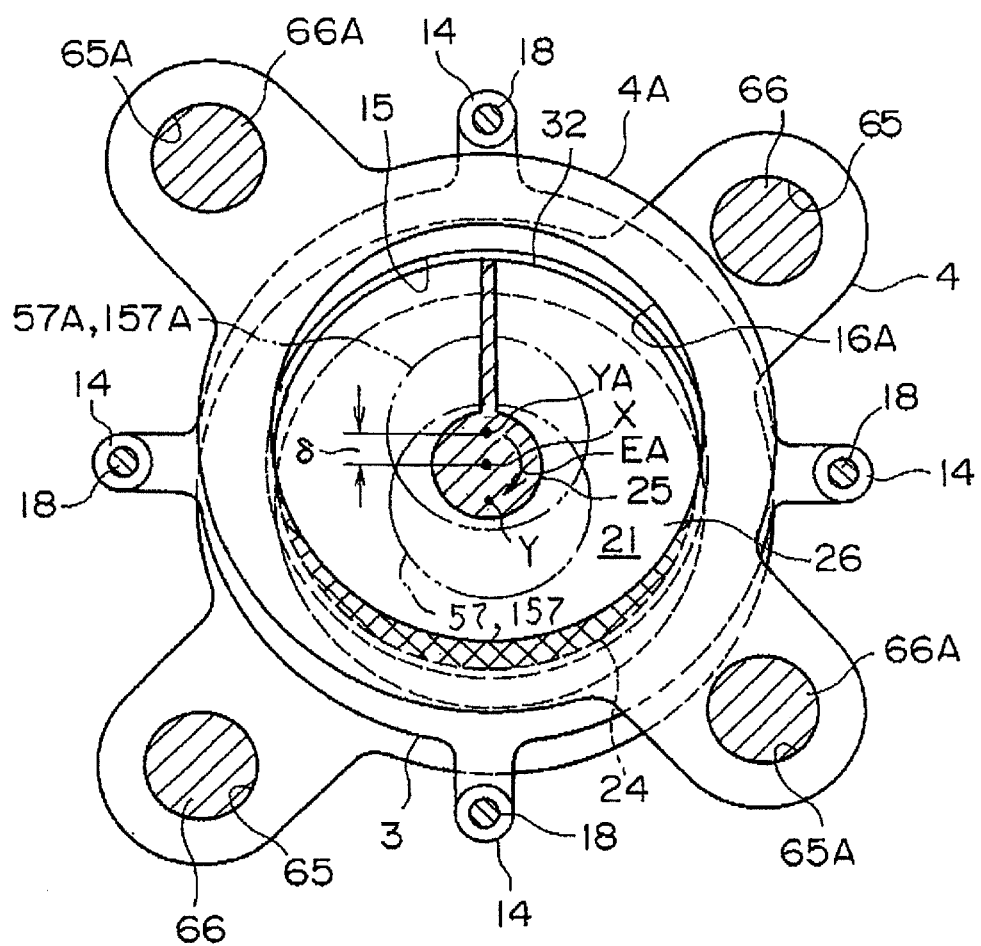
FIG. 28 is a cross-sectional view corresponding to the cross section taken along the VII-VII line in FIG. 31.
Figure 29:
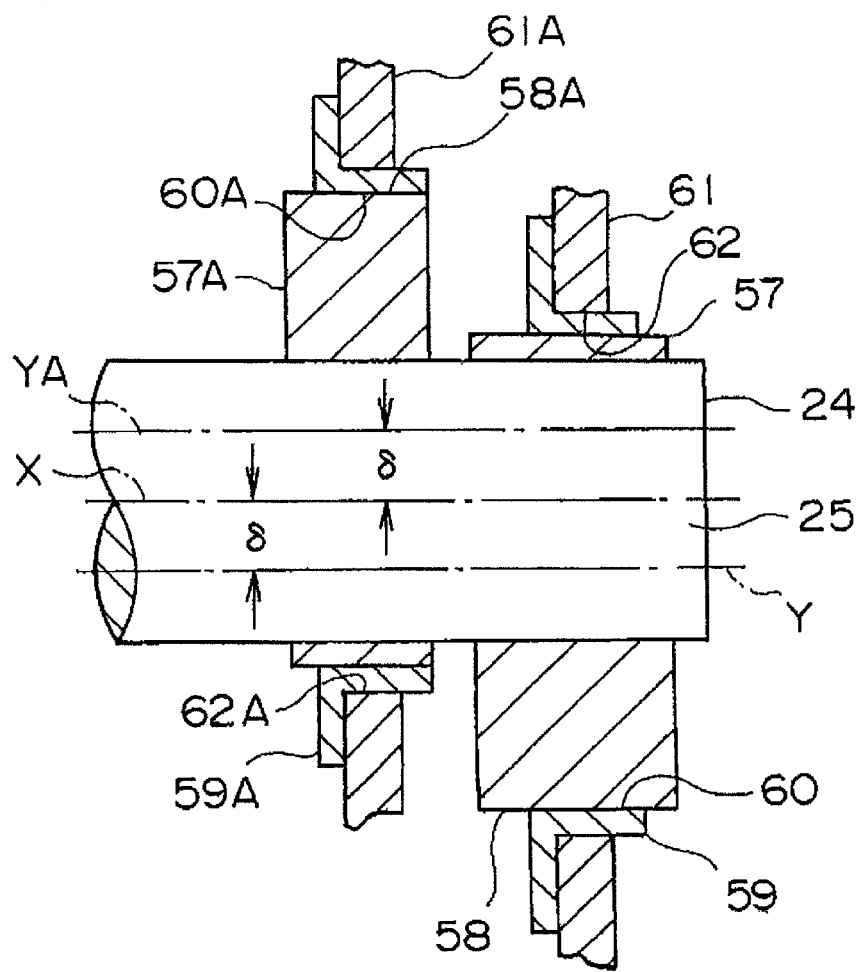
FIG. 29 is an enlarged cross-sectional view corresponding to the cross section taken along the VIII-VIII line in FIG. 26.
Figure 30:
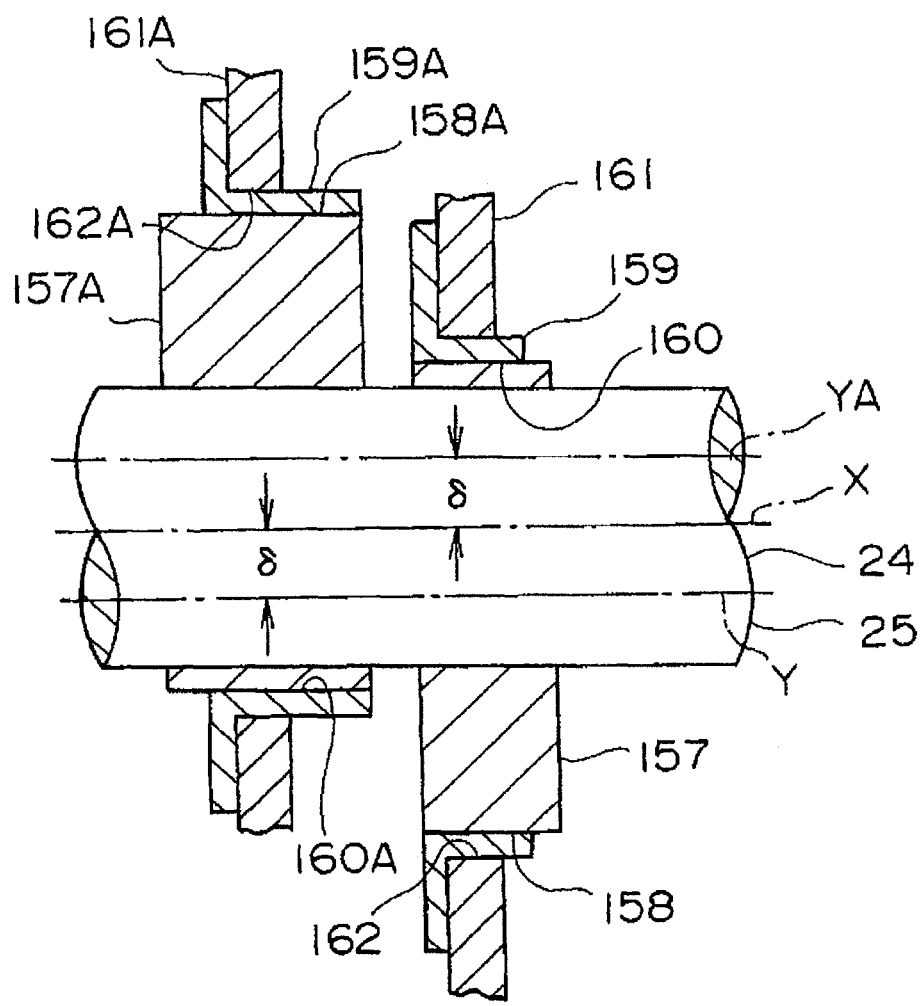
FIG. 30 is an enlarged sectional view taken along the IX-IX line in FIG. 26.
Figure 31:
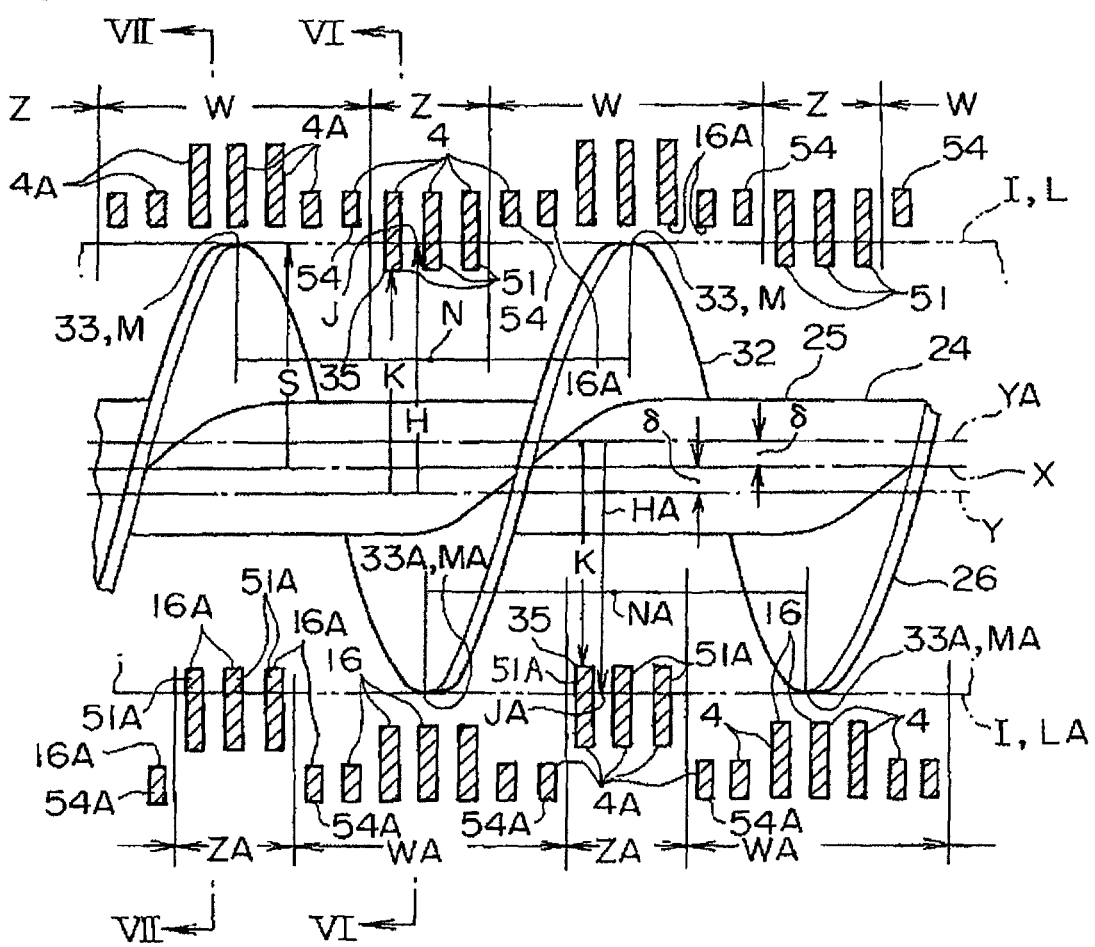
FIG. 31 is a cross-sectional view which is similar to that shown in FIG. 10 and illustrates the mutual arrangement of the movable members and the screw.
Figure 32:
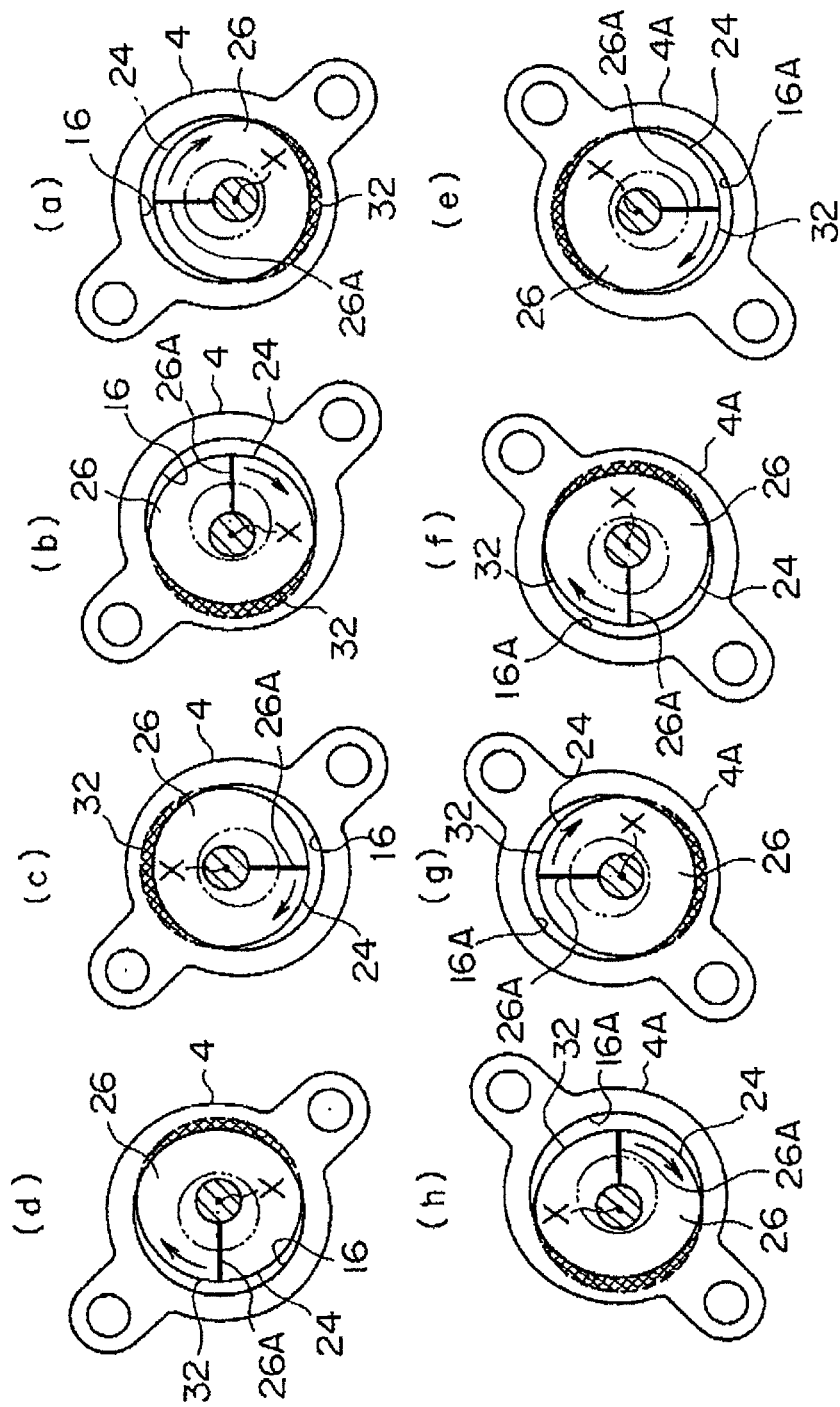
FIG. 32 is a cross-sectional view illustrating how the movable member performs a circular rotation.

FIG. 26 is a perspective view of a solid-liquid separator in which the configuration shown in FIG. 25A is realized. In this figure, the outlet member 2 shown in FIG. 1 is simplified and some elements such as the electric motor 28 shown in FIG. 1 is omitted. FIG. 31 illustrates the mutual arrangement of the movable members and the screw 24 in this solid-liquid separator. This figure is an explanatory cross-sectional view similar to that of FIG. 10, and the depiction of fixed members herein is omitted. FIG. 27 is a view corresponding to the cross section taken along the VI-VI line in FIG. 31. FIG. 28 is a view corresponding to the cross section taken along the VII-VII line in FIG. 31. These figures are cross-sectional views similar to those of FIGS. 8 and 9. FIG. 29 is an enlarged cross-sectional view corresponding to the cross section taken along the VIII-VIII line in FIG. 26. FIG. 30 is an enlarged sectional view taken along the IX-IX line in FIG. 26.

The basic configuration of the solid-liquid separator shown in FIGS. 26 to 31 is not different from that of the solid-liquid separator explained hereinabove. Thus, the solid-liquid separator of the present embodiment also has a plurality of fixed members 3, and the adjacent fixed members 3 are arranged at a distance from each other that is determined by spacers 14 disposed therebetween, as shown in FIGS. 26 to 28. The plurality of fixed members 3 are fixed to each other by four stay bolts 18 extending through the fixed members 3 and the spacers 14, and movable members 4, 4A are disposed between the adjacent fixed members 3. The round through hole 15 is formed in the fixed member 3, the round through holes 16, 16A are formed in the movable members 4, 4A, and the solid-liquid separation portion 21 is demarcated by the through holes 15, 16, 16A. A single screw 24 having one blade 26 extends through the through holes 15, 16, 16A of the fixed members 3 and the movable members 4, 4A, without coming into contact with the fixed members 3 and movable members 4, 4A.

Sludge is pumped in from the inflow port 5 of the inlet member 1 shown in FIG. 26 and flows into the solid-liquid separation portion 21 shown in FIGS. 27 and 28. In this case, the screw 24 is rotationally driven about the center axis line X thereof by an electric motor (not shown in FIG. 26). As a result, the sludge is conveyed toward the outlet 23 of the solid-liquid separation portion 21, the filtrate is discharged to the outside of the solid-liquid separation portion 21 through a filtrate discharge gaps between the fixed members 3 and the movable members 4, 4A, and the sludge with a reduced content ratio of water is discharged to the outside of the solid-liquid separation portion form the outlet 23. Similarly to the screw described hereinabove, the screw 24 of the solid-liquid separator of the present embodiment has the blade 26 and the shaft 25 that is formed integrally with the blade 26 and constitutes the center portion of the screw. Thus, the basic configuration and operation of the solid-liquid separator of the present embodiment are not different from those of the solid-liquid separator explained hereinabove.

As mentioned hereinabove, the solid-liquid separator of the present embodiment has a plurality of movable members 4 and also a plurality of movable members 4A shown in FIGS. 26 to 31, but if necessary the former movable member 4 can be referred to as "some movable members" and the latter movable members 4A can be referred to as "other movable members". As follows from FIGS. 27, 28, and 31, the center axial lines Y, YA of the round through holes 16, 16A of these movable members 4, 4A are both offset by δ with respect to the center axis line X of the shaft 25 of the screw 24, but all of the center axial lines Y of the through holes 16 of some movable members 4 coincide with each other, and all of the center axial lines YA of the through holes 16A of the other movable members 4A coincide with each other. However, the center axial lines Y of the through holes 16 of some movable members 4 do not coincide with the center axial lines YA of the through holes 16A of the other movable members 4A.

As shown in FIGS. 26, 29, and 30, in the solid-liquid separator of the present embodiment, similarly to the solid-liquid separator shown in FIGS. 1 to 15, the eccentric cams 57, 157 with round outer circumferential surfaces 58, 158 are detachably attached at end portions, in the longitudinal direction, of the shaft 25 of the screw 24, and the round outer circumferential surfaces 58, 158 of the eccentric cams 57, 157 are mated with the round cam holes 60, 160 of the bearings 59, 159 constituted by sliding bearings. The center axis line Y of the eccentric cams 57, 157 is offset by δ with respect to the center axis line X of the shaft 25 of the screw 24, and the round outer circumferential surfaces 58, 158 of the eccentric cams 57, 157 slidably abut, directly or with a lubricant located therebetween, on the inner circumferential surfaces of the round cam holes 60, 160 of the bearings 59, 159. The center axis lines Y of the two eccentric cams 57, 157 coincide. The bearings 59, 159 mate with the attachment holes 62, 162 of the connection plates 61, 161 and are detachably attached and connected to the connection plates 61, 161.

As shown in FIG. 26, two connecting rods 66 are detachably attached by nuts 67, 167 to the connection plates 61, 161, and the two connection plates 61, 161 are fixedly connected by the two connecting rods 66. The two connecting rods 66 extend through the attachment holes 65 (see also FIGS. 27 and 28) formed in the part of the plurality of movable members 4. Thus, in the case of the solid-liquid separator of the present embodiment, a pair of connection plates 61, 161 and the connecting rods 66 also constitute a connection means for connecting the part of the plurality of movable members 4. Further, the center axial lines Y of the round through holes 16 of the part of the plurality of movable members 4 coincide with the center axial lines Y of the eccentric cams 57, 157. Thus, the eccentric cams 57, 157 provided in the solid-liquid separator of the present embodiment and the aforementioned elements associated therewith are not substantially different from the eccentric cams 157, 157 of the solid-liquid separator shown in FIGS. 1 to 15 and the elements associated therewith.

In the solid-liquid separator of the present embodiment, a second eccentric cam and elements associated therewith are provided, as explained hereinabove, in addition to the aforementioned eccentric cams 57, 157. Therefore, the aforementioned eccentric cams 57, 157, bearings 59, 159, connection means, and connection plates 61, 161 and connecting rods 66 constituting the connection means will be referred to as the first eccentric cams 57, 157, first bearings 59, 159, first connection means, and first connection plates 61, 161, and first connecting rods 66, respectively.

As mentioned hereinabove, in the solid-liquid separator of the present embodiment, as shown in FIGS. 26, 29, and 30, second eccentric cams 57A, 157A are detachably attached to the end portions, in the longitudinal direction, of the shaft 25 of the screw 24, and these second eccentric cams 57A, 157A also have round external circumferential surfaces 58A, 158A formed therein. Furthermore, the center axial lines YA of the second eccentric cams 57A, 157A coincide, and the center axis line YA is offset by δ with respect to the center axis line X of the screw 24. Further, the center axis line YA of the round through hole 16A of the other movable members 4A coincides with the center axis line YA of the second eccentric cams 57A, 157A. As shown in FIGS. 27 to 30, the center axis line Y of the first eccentric cams 57, 157 does not coincide with the center axis line YA of the second eccentric cams 57A, 157A.

As shown in FIGS. 29 and 30, the round external circumferential surfaces 58A, 158A of the second eccentric cams 57A, 157A are also mated with the round cam holes 60A, 160A of the second bearings 59A, 159A constituted by sliding bearings, and the round outer circumferential surfaces 58A, 158A of the second eccentric cams 57A, 157A slidably abut along the entire circumference thereof, directly or with a lubricant located therebetween, on the inner circumferential surfaces of the round cam holes 60A, 160A of the second bearings 59, 159A. Further, the second bearings 59, 159A are mated with the attachment holes 62A, 162A of the second connection plates 61A, 161A and detachably attached and connected to the respective second connection plates 61A, 161A. Two connecting rods 66A are fixed by nuts 67A, 167A shown in FIG. 26 to the respective second connection plates 61A, 161A, and the second connection plates 61A, 161A are fixedly connected by the two second connecting rods 66A. As shown in FIGS. 27 and 28, the two second connecting rods 66A extend through the attachment holes 65A formed in the other part of the plurality of movable members 4A. Thus, a pair of second connection plates 61A, 161A and second connecting rods 66A constitute second connection means connecting the other part of the plurality of movable members 4A. Further, in FIGS. 27 and 28, the above-described first eccentric cams 57, 157 and second eccentric cams 57A, 157A are additionally shown by two-dot-dash lines.

As mentioned hereinabove, the center axis line Y of the first eccentric cams 57, 157 and the center axis line YA of the second eccentric cams 57A, 157A do not coincide, the center axis line Y of the through holes 16 of the part of the plurality of movable members 4 and the center axis line Y of the first eccentric cams 57, 157 coincide, and the center axis line YA of the through holes 16A of the other part of the plurality of movable members 4A and the center axis line YA of the second eccentric cams 57A, 157A coincide. Therefore, the center axis line Y of the through holes 16 of the part of the plurality of movable members 4 and the center axis line YA of the through holes 16A of the other part of the plurality of movable members 4A do not coincide.

In the solid-liquid separator shown in FIGS. 26 to 30, where the screw 24 is rotated by an electric motor (not shown in the figure) and the screw 24 revolves around the center axis line X thereof, as shown in FIG. 27, the first eccentric cams 57, 157 rotate, while the center axis line Y thereof describes a circle with a radius equal to the eccentricity δ around the center axis line X of the shaft 25 of the screw 24, as shown by arrow E. The part of the plurality of movable members 4 follow this rotation and perform a circular movement, while the center axis line Y thereof describes a circle around the center axis line X of the screw 24. At the same time, as shown in FIG. 28, the second eccentric cams 57A, 157A also rotate, while the center axis line YA thereof describes a circle with a radius equal to the eccentricity δ around the center axis line X of the shaft 25 of the screw 24, as shown by arrow EA. The other part of the plurality of movable members 4A follow this rotation and perform a circular movement, while the center axis line YA thereof describes a circle around the center axis line X of the screw 24. In this case, since the center axis lines Y and YA do not coincide, the part of the plurality of movable members 4 and other part of the plurality of movable members 4A perform circular movements with different phases. In the example shown in the figure, the movable members perform circular movements with a phase difference of 180°. The circular movements of the movable members 4, 4A prevent solid mater from clogging the space between the movable members and the fixed members 3.

As mentioned hereinabove, the solid-liquid separator shown in FIGS. 26 to 30 includes the first connection means for connecting the part of the plurality of movable members 4 so that the part of the plurality of movable members 4 can perform together a circular movement, the first eccentric cams 57, 157 that are decentered from the center axis line X of the shaft 25 of the screw 24 and rotate integrally with the shaft 25, the first bearings 59, 159 that are connected to the first connection means and provided with round cam holes 60, 160 that mate with the round outer circumferential surfaces 58, 158 of the first eccentric cams 57,157, the second connection means for connecting the other part of the plurality of movable members 4A so that the other part of the plurality of movable members 4A can perform together a circular movement, the second eccentric cams 57A, 157A that are decentered from the center axis line X of the shaft 25 of the screw 24 and rotate integrally with the shaft 25, and the second bearings 59A, 159A that are connected to the second connection means and provided with round cam holes 60A, 160A that mate with the round outer circumferential surfaces 58A, 158A of the second eccentric cams 57A, 157A, the center axis line Y of the first eccentric cams 57, 157 and the center axis line YA of the second eccentric cams 57A, 157A do not coincide, the round outer circumferential surfaces 58, 158 of the first eccentric cams 57, 157 slidably abut on the inner circumferential surfaces of the round cam holes 60, 160 of the first bearings 59, 159 over the entire circumference thereof, the round outer circumferential surfaces 58A, 158A of the second eccentric cams 57A, 157A slidably abut on the inner circumferential surfaces of the round cam holes 60A, 160A of the second bearings 59A, 159A over the entire circumference thereof, the center axis line Y of the first eccentric cams 57, 157 coincides with the center axis line Y of the through holes 16 of the part of the plurality of movable members 4 connected by the first connection means, the center axis line YA of the second eccentric cams 57A, 157A also coincides with the center axis line YA of the through holes 16A of the other part of the plurality of movable members 4A connected by the second connection means, the first eccentric cams 57, 157 rotate following the rotation of the screw 24, while the center axis line Y of the first eccentric cams describes a circle with a radius equal to the eccentricity δ of the first eccentric cams 57, 157 around the center axis line X of the shaft 25 of the screw 24, as a result of this rotation the part of the plurality of movable members 4 connected by the first connection means perform a circular movement, while the center axis line Y of the through hole 16 thereof describes a circle with a radius equal to the eccentricity δ of the first eccentric cams 57, 157 around the center axis line X of the screw 24, the second eccentric cams 57A, 157A rotate, while the center axis line YA thereof describes a circle with a radius equal to the eccentricity δ of the second eccentric cams 57A, 157A around the center axis line X of the shaft 25 of the screw 24, and the other part of the plurality of movable members 4A connected by the second connection means perform a circular movement, while the center axis line YA of the through hole 16A thereof describes a circle with a radius equal to the eccentricity δ of the second eccentric cams 57A, 157A around the center axis line X of the screw 24.

Furthermore, in the solid-liquid separator shown in FIGS. 26 to 30, the first eccentric cams 57, 157 and the first bearings 59, 159 mated with the first eccentric cams 57, 157 are provided by one each at each of the portions of the shaft 25 that are outside, in the longitudinal direction, of the blade 26 of the screw 24, the first connection means has a pair of first connection plates 61, 161 connected to respective first bearings 59, 159 and a plurality of first connecting rods 66 connected to the part of the plurality of movable members 4, each first connecting rod 66 is connected to the respective first connection plate 61, 161, the second eccentric cams 57A, 157A and the second bearings 59A, 159A mated with the second eccentric cams 57A, 157A are provided by one each at each of the portions of the shaft 25 that are outside, in the longitudinal direction, of the blade 26 of the screw 24, the second connection means has a pair of second connection plates 61A, 161A connected to respective second bearings 59A, 159A and a plurality of second connecting rods 66A connected to the other part of the plurality of movable members 4A, and each second connecting rod 66A is connected to the respective second connection plate 61A, 161A.

Further, in the solid-liquid separator shown in FIG. 26, similarly to the solid-liquid separator shown in FIGS. 1 to 15, the ring-shaped guides 69, 69A are detachably attached by bolts and nuts (not shown in the figure) to the holes in the side plates 7, 9 of the inlet member 1 and the outlet member 2 through which the first and second connecting rods 66, 66A pass. When the first and second connecting rods 66, 66A perform a circular movement, the first and second connecting rods 66, 66A are guided, while sliding along the inner circumferential surfaces of the ring-shaped first and second guides 69, 69A, and the first and second connecting rods 66, 66A are prevented from rotating about the center axis line X of the screw 24 (see arrow F in FIG. 8A). Thus, the solid-liquid separator of the present embodiment has the first guide 69 that prevents the first connection means from rotating together with the part of the plurality of movable members 4 connected by the first connection means around the center axis line X of the shaft 25 of the screw 24 and the movable members 4 from coming into contact with other members, and the second guide 69A that prevents the second connection means from rotating together with the other part of the plurality of movable members 4A connected by the second connection means around the center axis line X of the shaft 25 of the screw 24 and the movable members 4A from coming into contact with other members.

Described hereinabove with reference to FIGS. 25 to 30 is an example in which the configuration having the first eccentric cams 57, 157 and the second eccentric cams 57A, 157A is applied to the solid-liquid separator in which the center axis line of the first eccentric cams 57, 157 and the center axis line of the through holes 16 formed in the part of the plurality of movable members 4 coincide and the center axis line of the second eccentric cams 57A, 157A and the center axis line of the through holes 16A formed in the other part of the plurality of movable members 4A coincide. The configuration having a plurality of eccentric cams can be also applied to the solid-liquid separator in which the center axis line of the first eccentric cams 57, 157 and the center axis line of the through holes 16 formed in the part of the plurality of movable members 4 do not coincide and the center axis line of the second eccentric cams 57A, 157A and the center axis line of the through holes 16A formed in the other part of the plurality of movable members 4A do not coincide, and also to the solid-liquid separator in which the center axis lines of the part of the plurality of movable members 4 do not coincide with each other and the center axis lines of the other part of the plurality of movable members 4A do not coincide with each other. In this case, the basic configuration is not different from that shown in FIGS. 25 to 30. Thus, the first eccentric cams 57, 157 that are decentered from the center axis line X of the shaft 25 of the screw 24 and have a round outer circumferential surface and the second eccentric cams 57A, 157A that are also decentered from the center axis line X of the shaft 25 of the screw 24 and have a round outer circumferential surface are fixed to the shaft 25 of the screw 24, the center axis line of the first eccentric cams 57, 157 and the center axis line of the second eccentric cams 57A, 157A do not coincide, the part of the plurality of movable members 4 are connected to the first eccentric cams 57, 157 such that the part of the plurality of movable members 4 perform a circular movement with a radius equal to the eccentricity δ of the first eccentric cams 57, 157, and the other part of the plurality of movable members 4A are connected to the second eccentric cams 57A, 157A such that the other part of the plurality of movable members 4A perform a circular movement with a radius equal to the eccentricity δ of the second eccentric cams 57A, 157A. Further, the following configuration is used in this solid-liquid separator. Thus, the solid-liquid separator is provided with the first connection means that connects the part of the plurality of movable members 4 so that the part of the plurality of movable members 4 together perform a circular movement and the first bearings 59, 159 that are connected to the first connection means and provided with the round cam holes 60, 160 that mate with the round outer circumferential surfaces 58, 158 of the first eccentric cams 57, 157. The solid-liquid separator is also provided with the second connection means that connects the other part of the plurality of movable members 4A so that the other part of the plurality of movable members 4A together perform a circular movement and the second bearings 59A, 159A that are connected to the second connection means and provided with the round cam holes 60A, 160A that mate with the round outer circumferential surfaces 58A, 158A of the second eccentric cams 57A, 157A. The round outer circumferential surfaces 58, 158 of the first eccentric cams 57, 157 slidably abut on the inner circumferential surfaces of the round cam holes 60, 160 of the first bearings 59, 159 over the entire circumference thereof, and the round outer circumferential surfaces 58A, 158A of the second eccentric cams 57A, 157A slidably abut on the inner circumferential surfaces of the round cam holes 60A, 160A of the second bearings 59A, 159A over the entire circumference thereof. Following the rotation of the screw 24, the first eccentric cams 57, 157 rotate, while the center axis line thereof describes a circle with a radius equal to the eccentricity δ of the first eccentric cams 57, 157 around the center axis line X of the shaft 25 of the screw 24. As a result, the part of the plurality of movable members 4 connected by the first connection means perform a circular movement with a radius equal to the eccentricity δ of the first eccentric cams 57, 157. The second eccentric cams 57A, 157A rotate, while the center axis line thereof describes a circle with a radius equal to the eccentricity δ of the second eccentric cams 57, 157A around the center axis line X of the shaft 25 of the screw 24. As a result, the other part of the plurality of movable members 4 connected by the second connection means perform a circular movement with a radius equal to the eccentricity δ of the second eccentric cams 57A, 157A.

The part of the plurality of movable members 4 and the other part of the plurality of movable members 4A of the above-described embodiments are also configured such that at least part of the movable members perform a circular movement, while penetrating closer to the center axis line X of the screw 24 than the outer circumferential edge 32 of the blade 26 of the screw 24, without coming into contact with the screw 24. In this case, the aforementioned first condition and second condition for penetration of the movable members should be fulfilled in order that the movable members 4, 4A could penetrate closer to the center axis line X of the screw 24 than the outer circumferential edge 32 of the blade 26 of the screw 24. To be sure, the first and second conditions will be explained with respect to all of the examples relating to the cases in which the center axis line of the first eccentric cams 57, 157 and the center axis line of the through holes 16 formed in the part of the plurality of movable members 4 coincide, or these center axis lines do not coincide, and the cases in which the center axis line of the second eccentric cams 57A, 157A and the center axis line of the other part of the plurality of movable members 4A coincide, or these center axis lines do not coincide.

FIG. 31 is a cross sectional explanatory drawing that is similar to FIG. 10 and illustrates an example of the relationship between the movable members 4, 4A and the screw 24 in the solid-liquid separators of the above-described embodiments. In this figure, the depiction of the fixed members is omitted and the arrangement state of the movable members 4, 4A and the screw 24 does not coincide with that shown in FIG. 26. In FIG. 31, five of the some movable members 4 and five of the other movable members 4A are arranged alternately in the direction of the center axis line X of the screw 24.

In FIG. 31, a point in which the straight line H drawn from the center axis line Y of the first eccentric cams 57, 157 (see FIGS. 29 and 30) or from the center axis line Y of the through holes 16 of the part of the plurality of movable members 4 in the radial direction of the screw 24 toward the center axis line X of the screw 24 crosses the virtual tube I including the outer circumferential edge 32 of the screw 24 after passing beyond the center axis line X of the screw 24 is taken as an outer circumferential edge crossing point J. Where a straight line passing through the outer circumferential edge crossing point J and extending parallel to the center axis line X of the screw 24 is taken as a center parallel line L and crossing points of the center parallel line L with two blade portions 33 of the screw 24 that are adjacent in the direction of the center axis line X of the screw 24 are taken as blade crossing points M, a region of a predetermined width in the direction of the center axis line X of the screw 24 that is narrower than the distance between the aforementioned two blade portions 33 and includes a center point N of the two blade crossing points M will be a region Z in which penetration of the movable members 4 is possible. The movable member 4 that performs a circular movement, while penetrating closer to the center axis line X of the screw 24 than the outer circumferential edge 32 of the blade 26 of the screw 24, is positioned within the region Z in which penetration is possible. In the example shown in FIG. 31, the portions 51 of the three movable members 4 got closer to the center axis line X of the screw 24 than the outer circumferential edge 32 of the blade 26 thereof. This is the second condition under which the movable members 4 can penetrate and this conditions is not different from that explained hereinabove.

Further, for the movable members 4 present in the region Z in which penetration is possible to penetrate closer to the center axis line X than the outer circumferential edge 32 of the blade 26, without coming into contact with the screw 24, the shortest distance K (in this case, the radius of the round through hole 16) from the center axis line Y of the first eccentric cams 57, 157 or the center axis line Y of the through holes 16 of some movable members 4 to the circumferential edge 35 of the movable members 4 demarcating the through hole 16, the radius S of the screw 24, and the eccentricity δ of the through hole 16 should fulfill the relationship S−δ<K<S+δ. This is also the first condition for enabling the penetration of the movable members 4 described hereinabove.

In FIG. 31, the movable members 4 positioned in the region W, which is outside the above-described region Z in which penetration is possible and represents a region in which penetration is impossible, is specifically assigned with the reference numeral 54, and the through hole 16 of this movable members 54 is formed such that the condition K>S+δ (interference avoidance condition) is fulfilled. As a result, the movable members 54 can perform a circular movement, without coming into contact with the screw 24 or penetrating closer to the center axis line X than the outer circumferential edge 32.

FIGS. 32A to 32D are explanatory drawings illustrating the relative arrangement of the through hole 16 of the movable members 4 positioned in the region Z in which penetration is possible and the screw 24, and also the circular movement of the movable members 4. In this case, the reference symbol 26A also denotes the cross section of the blade 26 of the screw 24. Further, the portion of the movable members 4 that is shown by oblique hatching is shown to have penetrated closer to the center axis line X of the screw 24 than the circumferential outer edge 32 of the blade 26 thereof. These figures clearly demonstrate that the movable members 4 perform a circular movement, while penetrating closer to the center axis line X of the screw than the circumferential outer edge 32 of the blade 26 thereof.

Meanwhile, in FIG. 31, in the same manner as described hereinabove, a point in which a straight line HA drawn from the center axis line YA of the second eccentric cams 57A, 157A (see FIGS. 29 and 30) or from the center axis line YA of the through holes 16A of the other part of the plurality of movable members 4A in the radial direction of the screw 24 toward the center axis line X of the screw 24 crosses the virtual tube I including the outer circumferential edge 32 of the screw 24 after passing beyond the center axis line X of the screw 24 is taken as an outer circumferential edge crossing point JA, and a straight line passing through the outer circumferential edge crossing point JA and extending parallel to the center axis line X of the screw 24 is taken as a center parallel line LA. Where the crossing points of the center parallel line LA with two blade portions 33A of the screw 24 that are adjacent in the direction of the center axis line X of the screw 24 are taken as blade crossing points MA, a region of a predetermined width in the direction of the center axis line X of the screw 24 that is narrower than the distance between the aforementioned two blade portions 33A and includes a center point NA of the two blade crossing points MA will be a region ZA in which penetration of the movable members 4A is possible. The movable member 4A that performs a circular movement, while penetrating closer to the center axis line X of the screw 24 than the outer circumferential edge 32 of the screw 24, is positioned within the region ZA in which penetration is possible. In the example shown in FIG. 31, the portions 51A of three movable members 4A have penetrated closer to the center axis line X of the screw 24 than the outer circumferential edge 32. This is the second condition under which the movable members 4A can penetrate.

Further, for the movable members 4A present in the region ZA in which penetration is possible to penetrate closer to the center axis line X than the outer circumferential edge 32 of the blade 26, without coming into contact with the screw 24, the shortest distance K (in this case, the radius of the round through hole 16A) from the center axis line YA of the second eccentric cams 57A, 157A or the center axis line YA of the through holes 16A of the other movable members 4A to the circumferential edge 35 of the movable members 4A demarcating the through hole 16A, the radius S of the screw 24, and the eccentricity δ of the through hole 16A should fulfill the relationship S−δ<K<S+δ. This is the first condition for enabling the penetration of the movable members 4A.

In FIG. 31, the movable members 4A positioned in the region WA, which is outside the above-described region ZA in which penetration is possible and represents a region in which penetration is impossible, is specifically assigned with the reference numeral 54A, and the through hole 16A of this movable members 54A is formed such that the condition K>S+δ (interference avoidance condition) is fulfilled. As a result, the movable members 54A can perform a circular movement, without coming into contact with the screw 24 and penetrating closer to the center axis line X than the outer circumferential edge 32.

FIGS. 32E to 32H are explanatory drawings illustrating the relative arrangement of the through hole 16A of the movable members 4A positioned in the region ZA in which penetration is possible and the screw 24, and also the circular movement of the movable members 4A. In this case, the reference symbol 26A also denotes the cross section of the blade 26 of the screw 24. Further, the portion of the movable members 4A that is shown by oblique hatching is shown to have penetrated closer to the center axis line X of the screw 24 than the circumferential outer edge 32 of the blade 26 thereof. These figures clearly demonstrate that the movable members 4A perform a circular movement, while penetrating closer to the center axis line X of the screw than the circumferential outer edge 32 of the blade 26 thereof. In the example shown in FIGS. 32A to 32H, portions of the movable members 4 and movable members 4A that face each other with a phase difference of 180° are closer to the center axis line X than the circumferential outer edge 32 of the screw 24.

Explained hereinbelow with reference to FIGS. 26 to 32 is a specific example of the configuration shown in FIG. 25A, that is, the solid-liquid separator having movable members 4, 4A of two types with center axis lines Y, YA that do not coincide and also having the first and second eccentric cams with center axis lines Y, YA that do not coincide. However, a solid-liquid separator having movable members of three or more types and eccentric cams of three or more types with center axis lines Y, YA, YB that do not coincide, as shown in FIG. 25B, can be also configured in the same manner as described hereinabove. Thus, in the case of the configuration shown in FIG. 25B, eccentric cams of three types with center axis lines that do not coincide are used. Likewise, a solid-liquid separator can be also configured by using eccentric cams of four or more types with center axis lines that do not coincide.

As follows from above, where the movable members 4, 4A of two or more types that differ from each other in the direction in which the center axis line of the through hole is decentered from the center axis line X of the screw 24 are used, the number of movable members penetrating closer to the center axis line X than the outer circumferential edge 32 of the screw 24 can be increased and the effect of squeezing water from the sludge can be further increased.

Figure 33:
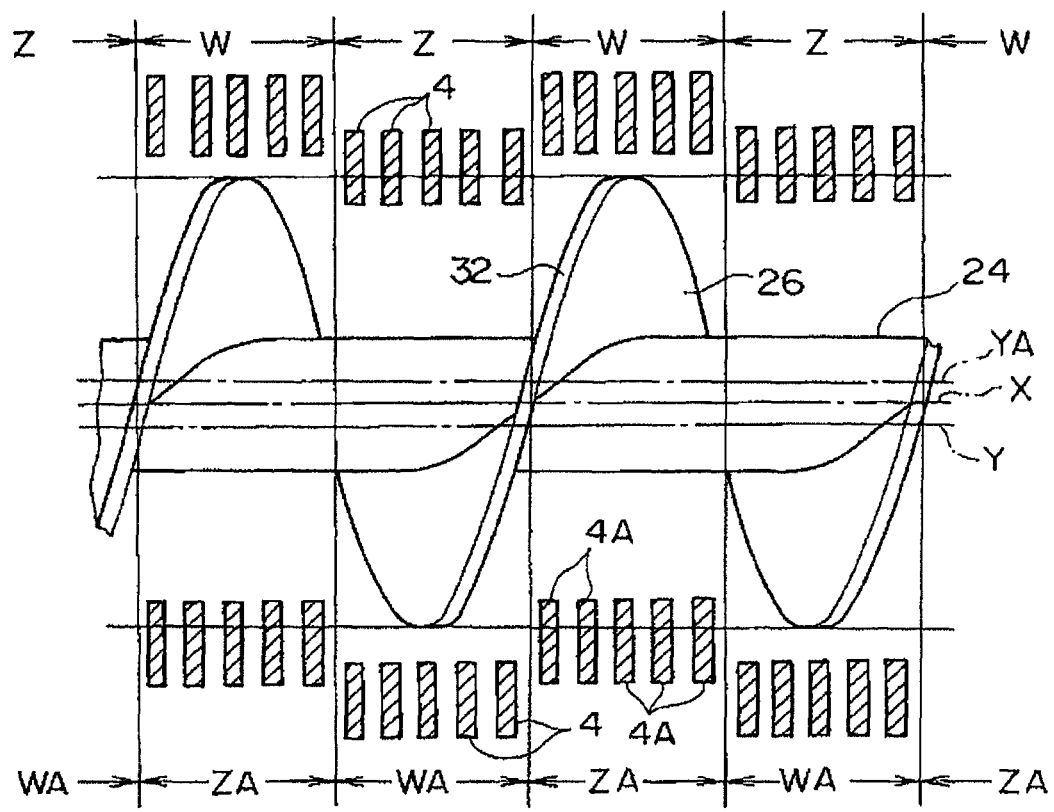
FIG. 33 is a cross-sectional view which is similar to that shown in FIG. 10 and illustrates the mutual arrangement of the movable members and the screw.

FIG. 33 shows the solid-liquid separator shown in FIGS. 26 to 30 in which the regions Z, ZA in which penetration of the part of the plurality of movable members 4 and the other part of the plurality of movable members 4A is possible are enlarged. This solid-liquid separator is configured such that the region ZA in which penetration is possible, that is, the region in which the other part of the plurality of movable members 4A can perform a circular movement, while penetrating closer to the center axis line X of the screw 24 than the outer circumferential edge 32 of the blade 26 of the screw 24, is positioned adjacently to the region Z in which penetration is possible, that is, the region in which the part of the plurality of movable members 4 can perform a circular movement, while penetrating closer to the center axis line X of the screw 24 than the outer circumferential edge 32 of the blade 26 of the screw 24. All of the movable members 4, 4A located in the regions Z, ZA in which penetration is possible perform a circular movement, while penetrating closer to the center axis line X of the screw 24 than the outer circumferential edge 32 of the blade 26 of the screw 24. In the case of this embodiment, since all of the movable members 4, 4A perform a circular movement, while penetrating closer to the center axis line X of the screw than the outer circumferential edge 32 of the blade 26 of the screw 24, the effect of squeezing water out of the sludge can be increased to a maximum limit.

Other features and operations of the solid-liquid separator shown in FIGS. 26 to 33 are not different from the features and operations of the solid-liquid separator shown in FIGS. 1 to 15. In the solid-liquid separator shown in FIGS. 26 to 33, the through holes 16, 16A of the movable members 4, 4A can be also formed to have an oval shape or a polygonal shape, and the movable members 4, 4A having protruding sections similar to the protruding section 36 shown in FIGS. 23 and 24 can be also used. Further, a large number of zigzag protrusions and depressions can be also formed at the circumferential edge 35 demarcating the through holes 16, 16A. These features can be also applied to the solid-liquid separator of the below-described embodiments.

The movable members 4, 4A that are present in the regions Z, ZA in which penetration is possible in the above-described solid-liquid separators can be configured, if necessary, such as not to penetrate closer to the center axis line X than the outer circumferential edge 32 of the blade 26 of the screw 24 outside a certain range. In other words, a configuration can be used in which only the movable members in a certain desired range penetrate closer to the center axis line X than the outer circumferential edge 32 of the blade 26 of the screw 24. In this case, the movable member that moves, while penetrating closer to the center axis line X of the screw 24 than the outer circumferential edge 32 of the blade 26 of the screw 24, is positioned in a region R2 downstream, in the movement direction of the treatment object, of the position corresponding to ½ the length R (FIG. 1) of the solid-liquid separation portion 21 in the movement direction of the treatment object. The sludge passing through the solid-liquid separation portion in the region R1 upstream of the ½ length usually includes a large amount of water, and even if the movable members 4, 4A apply a shear force to the sludge, while penetrating so as to cut into the sludge, the effect of squeezing out the water cannot be sufficiently increased. Since the content ratio of water in the sludge present in the downstream region R2 has already been decreased, where the movable members 4, 4A penetrate so as to cut into the sludge and apply a large shear force to the sludge, the effect of squeezing out the water can be sufficiently increased. This feature can be also applied to the solid-liquid separators of the below-described embodiments.

Described hereinabove is an example in which the present invention is applied to a solid-liquid separator in which eccentric cams connected to the end portions of the shaft 25 of the screw 24 are connected to the movable members and the movable members are caused to perform a circular movement by rotationally driving the screw 24. However, as mentioned hereinabove, the present invention can be also broadly applied to solid-liquid separators in which movable members disposed between the adjacent fixed members are moved by another appropriate means.

For example, JP-S59-218298-A discloses a solid-liquid separator including a plurality of fixed members, movable members disposed between the adjacent fixed members, and a screw extending via the through holes formed in the movable members and fixed members, without coming into contact with the through holes. The plurality of movable members are fixed by fixing rods, eccentric cams are inserted in a pair of round cam holes formed on the left and right sides, so as to sandwich the screw, of the movable members positioned at both ends in the axial direction, and the movable members are caused to perform a circular movement by rotationally driving the pair of eccentric cams. It is possible to apply the present invention to such a solid-liquid separator and obtain a configuration such that the movable members perform a circular movement, while penetrating closer to the center axis line of the screw than the outer circumferential edge of the blade of the screw, with the movable member being in no contact with the screw.

Figure 34:
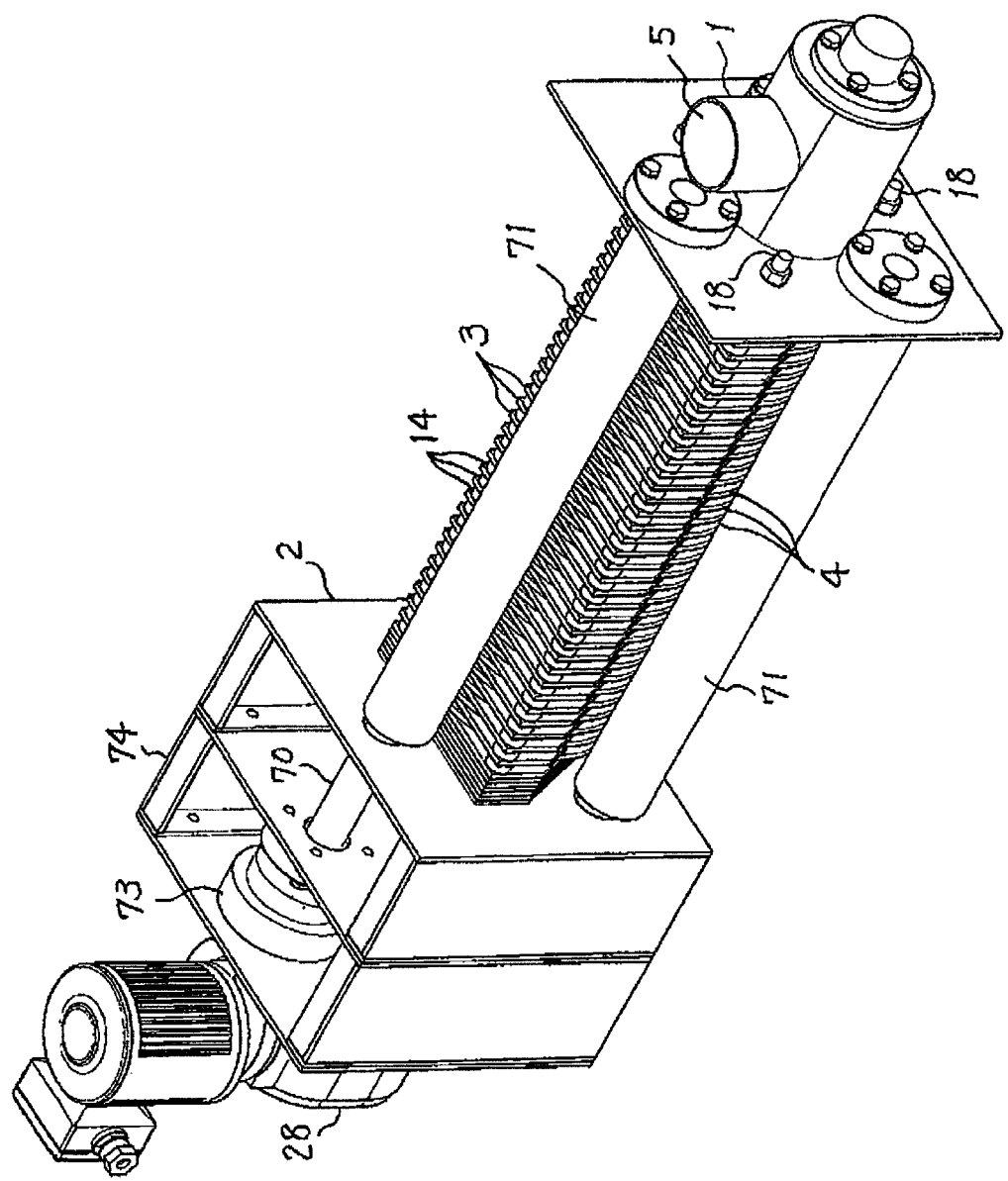
FIG. 34 is a perspective view illustrating another solid-liquid separator.
Figure 35:
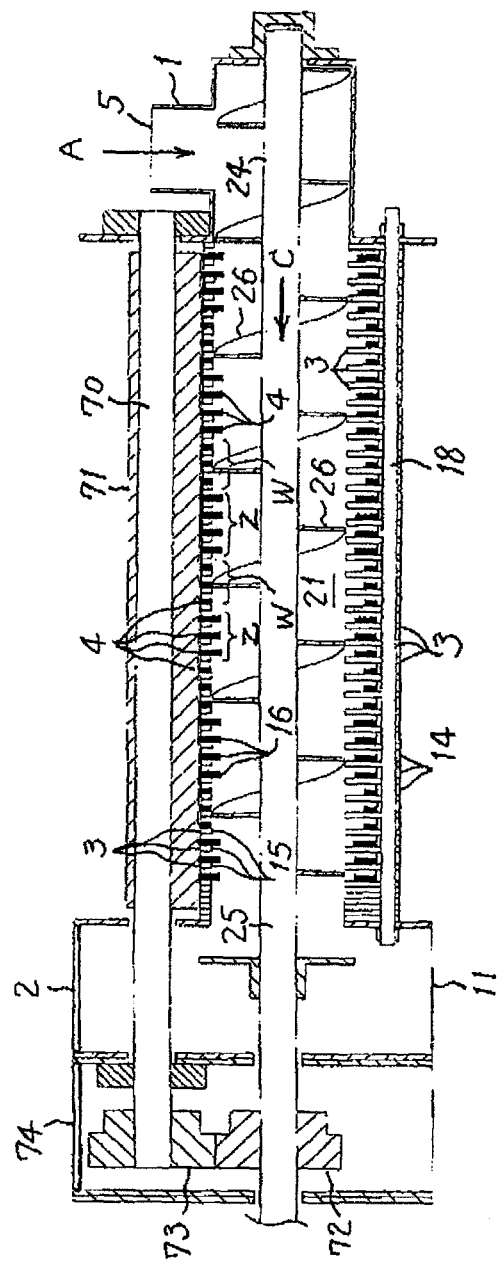
FIG. 35 is a vertical sectional view of the solid-liquid separator shown in FIG. 34.

The present invention can be also applied to the solid-liquid separator shown in FIGS. 34 and 35. The solid-liquid separator shown in these figures also includes a plurality of fixed members 3 disposed with a small clearance therebetween formed by spacers 14, movable members 4 disposed between the adjacent fixed members 3, and a screw 24 extending through the through holes 15, 16 formed in the fixed members 3 and the movable members 4. The through holes 15, 16 are formed such as to avoid contact with the screw 24. Further, a large number of fixed members 3 are fixed to the inlet member 1 and the outlet member 2 by a plurality of stay bolts 18 and nuts, the end portion of the screw 24 on the side of the inlet member 1 is rotatably supported by a bearing on the inlet member 1, the end portion of the screw 24 on the side of the outlet member 2 is drivably connected to the electric motor 28 (FIG. 34), and the electric motor 28 is fixedly supported on a gear box 74 fixed to the inlet member 2. In FIG. 35, hatching representing the cross section of the fixed member 37 is omitted and the cross section of the movable member 4 is painted black to facilitate the understanding of the drawing.

Figure 36:
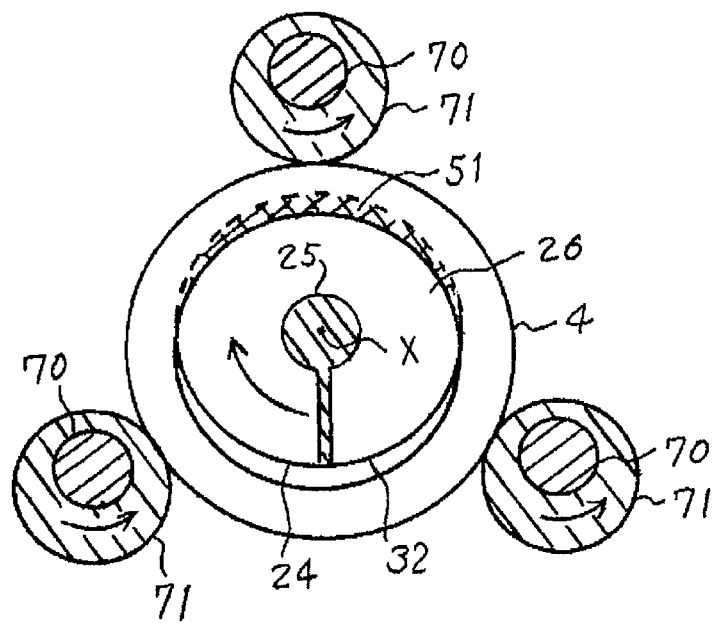
FIG. 36 is a cross-sectional view illustrating the movement of the screw and movable members of the solid-liquid separator shown in FIGS. 34 and 35.
Figure 37:
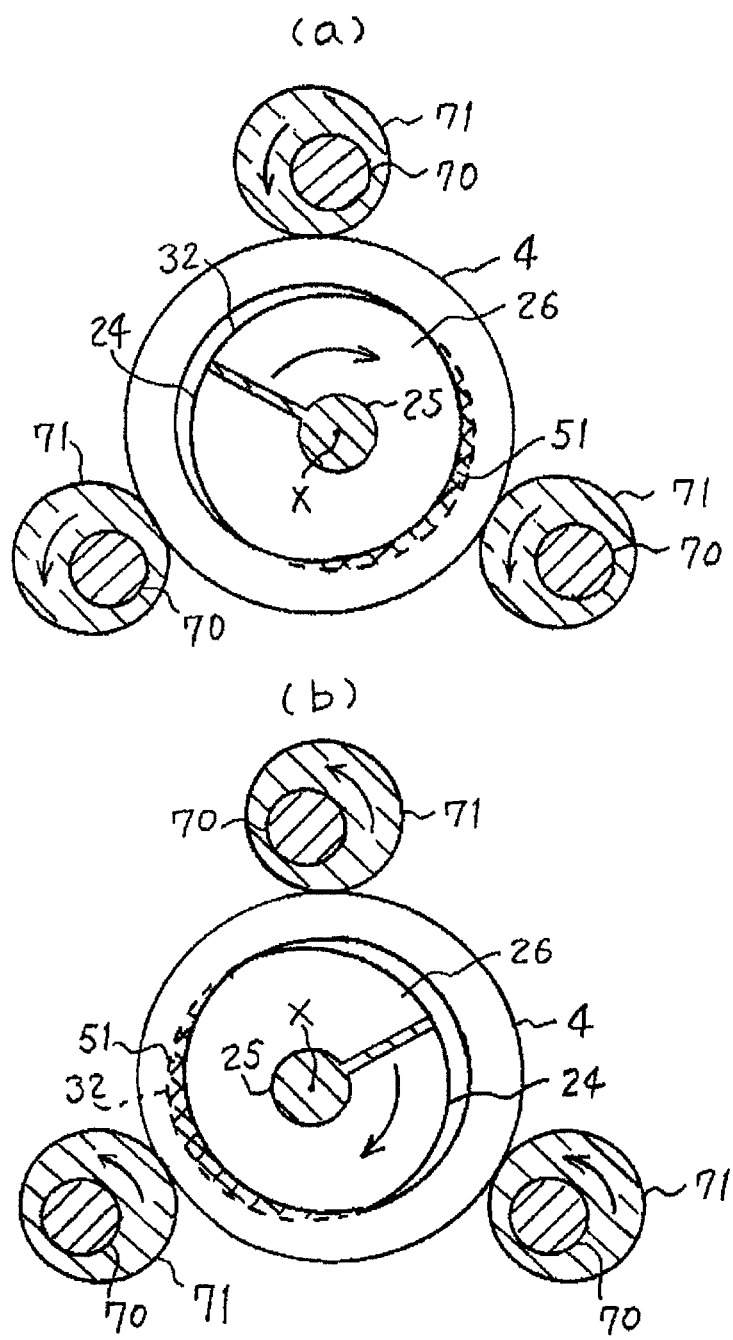
FIG. 37 is a cross-sectional view illustrating the movement of the screw and movable members of the solid-liquid separator shown in FIGS. 34 and 35.

FIGS. 36, 37A, and 37B, in which illustration of fixed members are omitted, are explanatory cross-sectional views illustrating how the movable member 4 performs a circular movement following the rotation of the screw 24 shown in FIGS. 34 and 35. As shown in these figures, the movable member 4 is formed to have a round outer circumference, and three eccentric cams 71 fixed to support shafts 70 abut on this round outer circumferential surface. As shown in FIGS. 34 and 35, the end portions, in the longitudinal direction, of the support shafts 70 are rotationally supported by bearings on the inlet member 1 and the gear box 74. As shown in FIGS. 36 and 37, angular positions of the eccentric cams 71 in the circumferential direction differ from each other, and the phases of the eccentric cams 71 differ from each other.

Further, as shown in FIG. 35, a drive gear 72 is fixed to the shaft 25 of the screw 24 and this drive gear 72 is meshed with a driven gear 73 fixed with the support shaft 70 of the eccentric cams 71.

Where the electric motor 28 is actuated, the screw 24 is rotationally driven around the center axis line X thereof, this rotation is transmitted by the drive gear 72 and the driven gear 73 to the support shaft 70 of the eccentric cams 71, and the eccentric cams 71 rotate in the direction shown by the arrow in FIGS. 36 and 37. In this case, since the phases of the eccentric cams 71 differ from each other as described hereinabove, when the eccentric cams 71 rotate in the direction shown by the arrow, the movable members 4 perform a circular movement and also rotate (revolve) around their own center axis line.

Sludge (not shown in the figure) is supplied from the inflow port 5 of the inlet member 1, as shown by arrow A in FIG. 35, flows into the solid-liquid separation portion 21 demarcated by the through holes 15, 16 of the fixed members 3 and the movable members 4, and is conveyed by the rotating screw 24 in the direction shown by arrow C. In this case, the filtrate flows down through filtrate discharge gaps between the fixed members 3 and the movable members 4, and the sludge with a reduced water content is discharged from the solid-liquid separation portion 21 to the outlet member 2 and falls down from the discharge port 11 of the outlet member 2.

When the sludge is subjected to solid-liquid separation in the above-described manner, since the movable members 4 perform a circular movement due to the rotation of the eccentric cams 71, solid matter of the sludge is prevented from clogging the gaps between the movable members 4 and the fixed members 3.

In this case, as clearly follows from FIGS. 35, 36, 37A, and 37B, the movable member 4 present in the region Z in which penetration is possible (FIG. 35) and which has been explained in the preceding embodiments performs a circular movement, while penetrating closer to the center axis line X of the screw 24 than the outer circumferential edge 32 of the screw 24. In FIGS. 36 and 37, the portion 51 of the movable member that has thus penetrated into the blade 26 of the screw 24 is represented by oblique hatching. The movable member 4 present in the region in which penetration is impossible and which is represented by the reference symbol W in FIG. 35, does not penetrate closer to the center axis line X of the screw 24 than the outer circumferential edge 32 of the screw 24. Solid-liquid separation of the sludge can thus be conducted with good efficiency.

The basic configuration of the solid-liquid separator shown in FIGS. 34 to 37 has been well known as described in WO 00/32292 A1.

Figure 38:
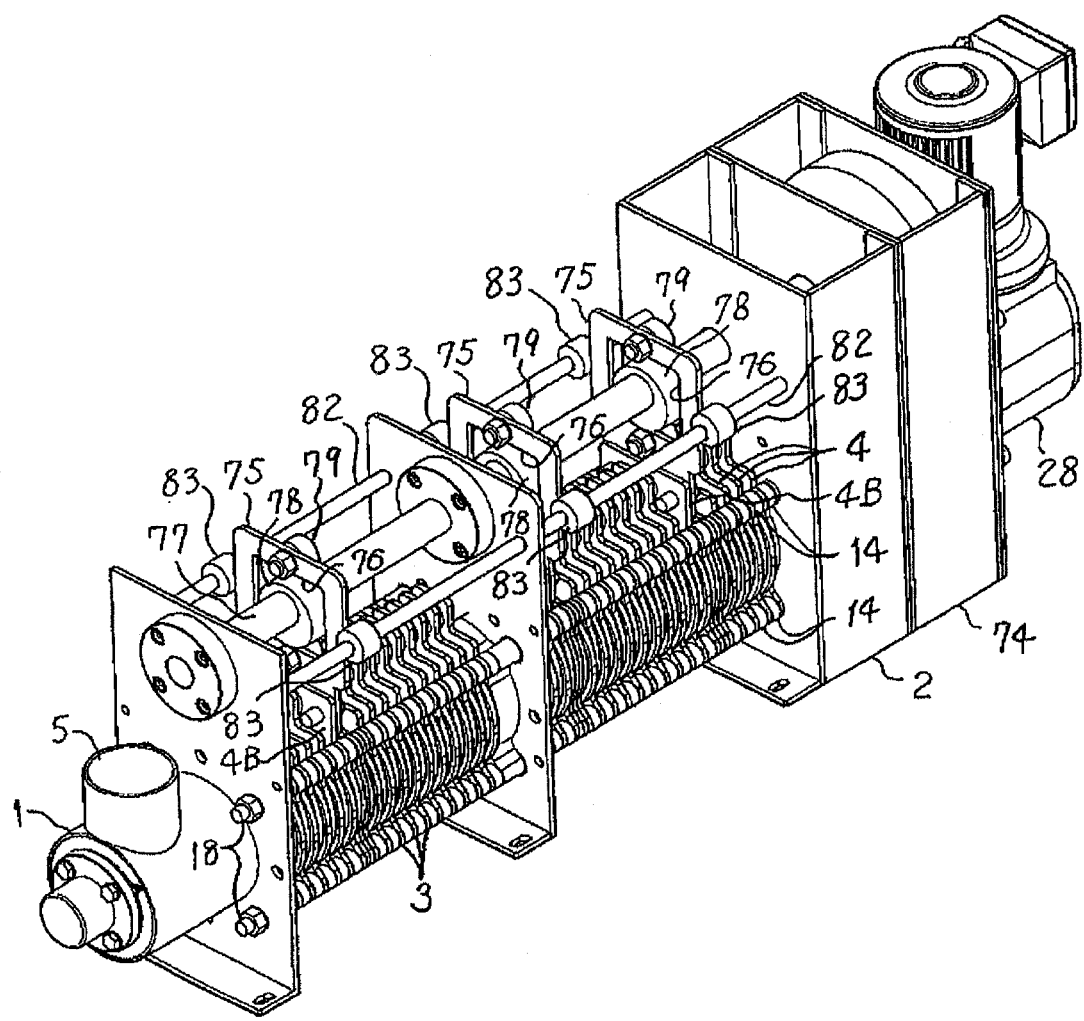
FIG. 38 is a perspective view of yet another solid-liquid separator.
Figure 39:
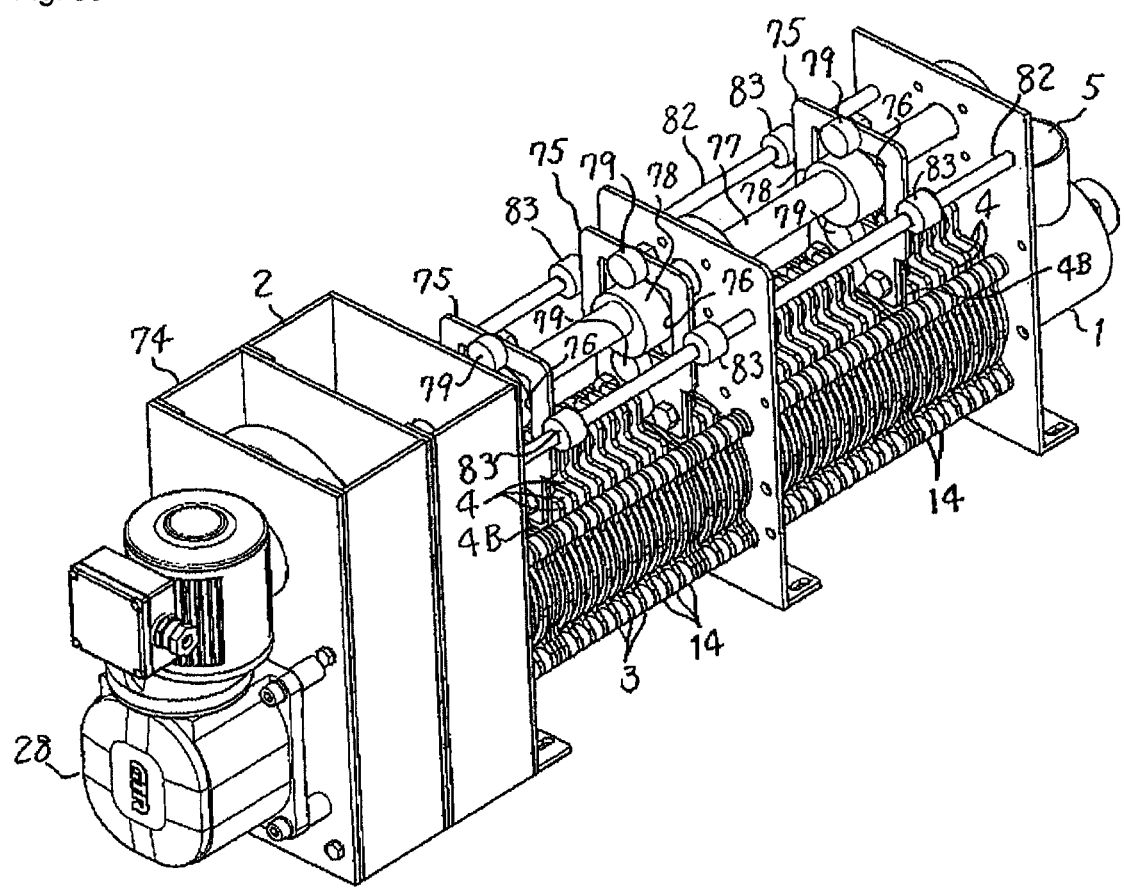
FIG. 39 is a perspective view in which the solid-liquid separator shown in FIG. 38 is viewed from the opposite side in the axial direction.
Figure 40:
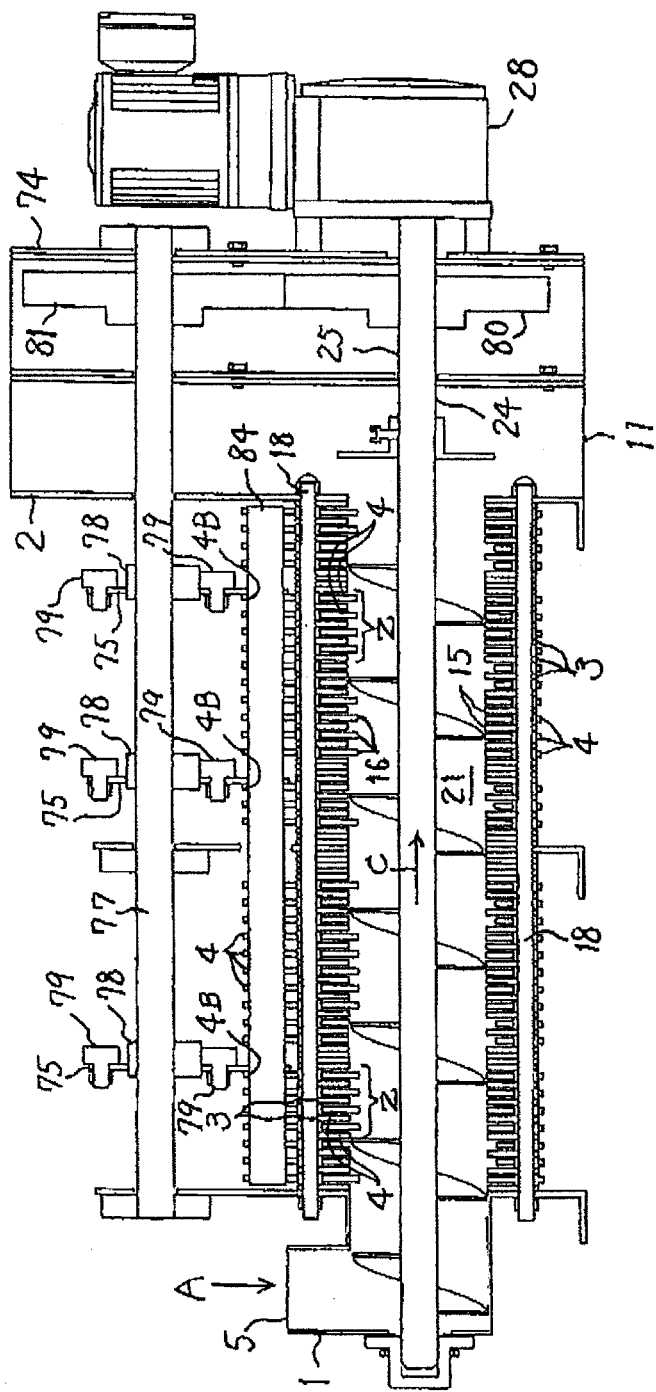
FIG. 40 is a vertical sectional view of the solid-liquid separator shown in FIG. 38.

FIG. 38 is a perspective view illustrating yet another solid-liquid separator. FIG. 39 is a perspective view, as viewed from the opposite side in the axial direction, of the solid-liquid separator shown in FIG. 38. FIG. 40 is a vertical sectional view of the solid-liquid separator shown in FIG. 38. Hatching that represents cross sections is removed to simplify the drawings. The solid-liquid separator shown in these figures also includes a plurality of fixed members 3 disposed with a small clearance therebetween formed by spacers 14, movable members 4 disposed between the adjacent fixed members 3, and a screw 24 extending through the through holes 15, 16 formed in the fixed members 3 and the movable members 4. The through holes 15, 16 are formed such that the fixed members 3 and the movable members 4 do not come into contact with the screw 24. Further, a large number of fixed members 3 are fixed to the inlet member 1 and the outlet member 2 by a plurality of stay bolts 18 and nuts, the end portion of the shaft 25 of the screw 24 on the side of the inlet member 1 is rotatably supported by a bearing on the inlet member 1, the end portion of the shaft 25 of the screw 24 on the side of the outlet member 2 is drivably connected to an electric motor 28, and the electric motor 28 is fixedly supported on a gear box 74 fixed to the inlet member 2.

Figure 41:
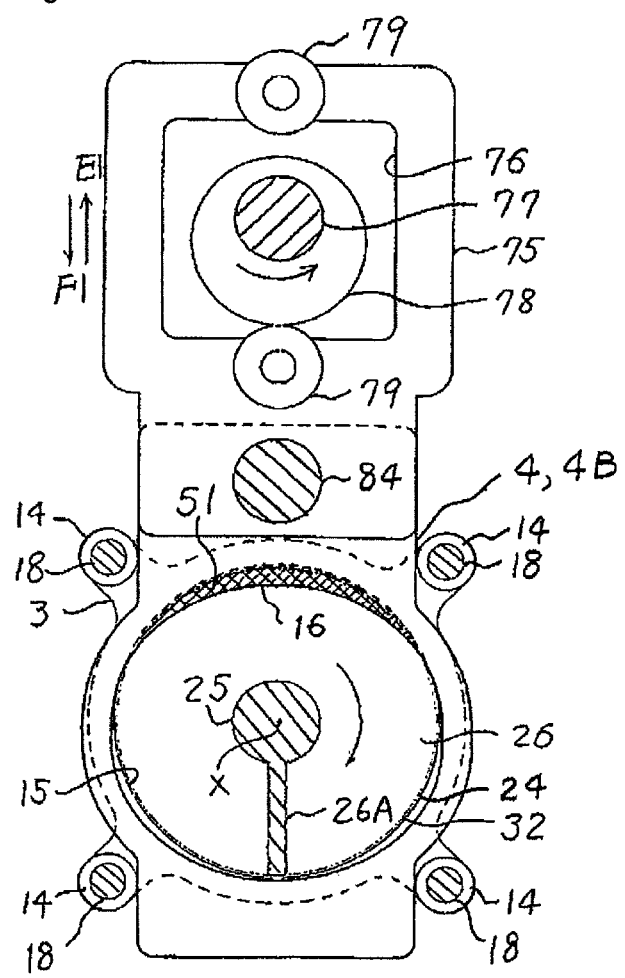
FIG. 41 is a transverse sectional view of the solid-liquid separator shown in FIG. 40, this view illustrates the movement of the screw and movable members.
Figure 42:
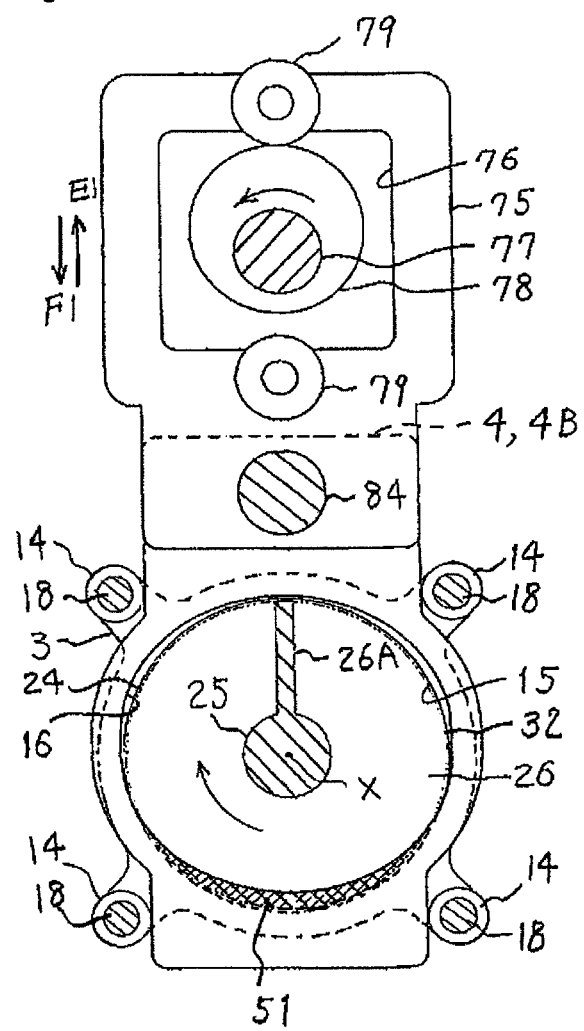
FIG. 42 is a cross-sectional view which is similar to that of FIG. 41 and illustrates a state in which the screw has further rotated from the position shown in FIG. 41.

FIG. 41 is an enlarged transverse sectional view of the solid-liquid separator shown in FIG. 40. FIG. 42 is a cross-sectional view similar to that shown in FIG. 41 and shows the state attained after the screw 24 has further rotated from the state shown in FIG. 41. In these drawings, the outer circumferential edge 32 of the blade 26 of the screw 24 is shown by a two-dot-dash line (same in FIGS. 43 to 48). The reference symbol 26A in FIGS. 41 and 42 denotes the cross section of the blade 26 of the screw 24.

In FIGS. 38 to 40, some movable members of a large number of movable members 4 (three movable members in the example shown in the figure) are assigned with a reference symbol 4B. Arms 75 are fixed to these movable members 4B by bolts and nuts (not shown in the figure). Holes 76 are formed in the arms 75. A shaft 77 passes through the holes 76. An eccentric cam 78 detachably attached to the shaft 77 is positioned in each hole 76. As shown in FIG. 40, end portions, in the longitudinal direction, of the shaft 77 are rotatably supported by bearings on the inlet member 1 and the gear box 74. Further, FIG. 40 also shows that a drive gear 80 is fixed to the shaft 25 of the screw 24, and this drive gear 80 is meshed with a driven gear 81 fixed to the shaft 77.

In each arm 75, cam followers 79 constituted by rollers are rotatably supported on both sides of the shaft 77. Further, as shown in FIGS. 38 and 39, end portions of a pair of support rods 82 are fixed to the inlet member 1 and the outlet member 2, a guide roller 83 is rotatably supported on each support rod 82, and these guide rollers 83 abut on the opposing surfaces of the arm 75. In FIGS. 41 and 42, the depiction of the support rods 82 and the guide rollers 83 is omitted. Further, as shown in FIGS. 40 to 42, a connecting rod 84 extends through all of the movable members 4, 4B, and all of the movable members 4, 4B are connected by the connecting rod 84.

Sludge (not shown in the figure) is supplied from the inflow port 5 of the inlet member 1, as shown by arrow A in FIG. 40, flows into the solid-liquid separation portion 21 demarcated by the through holes 15, 16 of the fixed members 3 and the movable members 4, and conveyed by the rotating screw 24 in the direction shown by arrow C. In this case, the filtrate flows down through filtrate discharge gaps between the fixed members 3 and the movable members 4, and the sludge with a reduced water content is discharged from the solid-liquid separation portion 21 to the outlet member 2 and falls down from the discharge port 11 of the outlet member 2.

When the sludge is subjected to solid-liquid separation in the above-described manner, the rotation of the shaft 25 of the screw 24 is transmitted by the drive gear 80 and the driven gear 81 meshed therewith to the shaft 77. As a result, the eccentric cams 78 rotate about the center axis line of the shaft 77 as shown by an arrow in FIGS. 41 and 42. Therefore, the eccentric cams 78 apply a pressure to the cam followers 79, and the cam followers move reciprocatingly, while rotating, in the directions shown by arrows E1, F1 in FIGS. 41 and 42 together with the arms 75 and movable members 4B fixed thereto. As a consequence, all of the movable members 4 connected by the connecting rods 84 move reciprocatingly in the direction of arrows E1, F1. When the sludge is thus subjected to solid-liquid separation, the movable members 4 move reciprocatingly with respect to the fixedly disposed fixed members 3. Therefore, solid matter of the sludge does not clog the clearances between the movable members 4 and the fixed members 3.

In this case, as clearly follows from FIGS. 40 to 42, the movable member 4 present in the region Z (FIG. 40) in which penetration is possible and which has been explained in the preceding embodiments performs a reciprocating movement, while penetrating closer to the center axis line X of the screw 24 than the outer circumferential edge 32 of the blade 26 of the screw 24. In FIGS. 41 and 42, the portion 51 of the movable member that has thus penetrated into the blade 26 of the screw 24 is represented by oblique hatching. In this case, too, the movable member 4 present in the region in which penetration is impossible does not penetrate closer to the center axis line X of the screw 24 than the outer circumferential edge 32 of the blade 26 of the screw 24. Solid-liquid separation of the sludge can thus be conducted with good efficiency.

Figure 43:
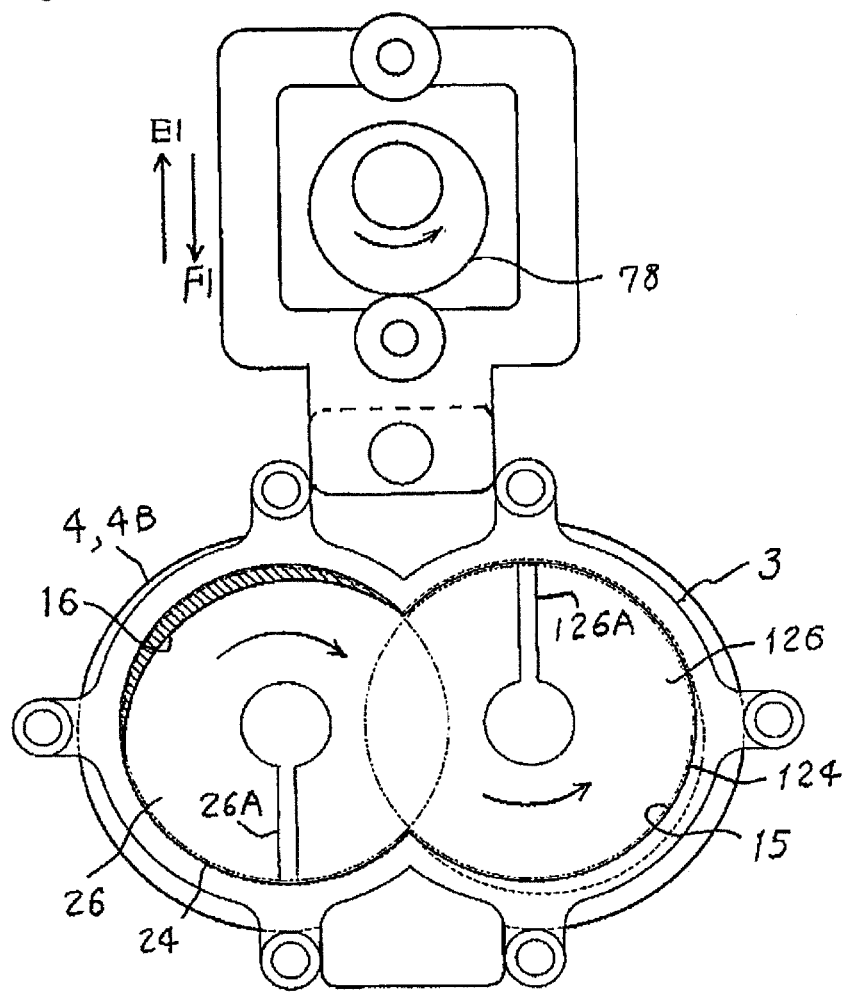
FIG. 43 is a cross-sectional view which is similar to that shown in FIG. 41 and shows a solid-liquid separator having two screws.
Figure 44:
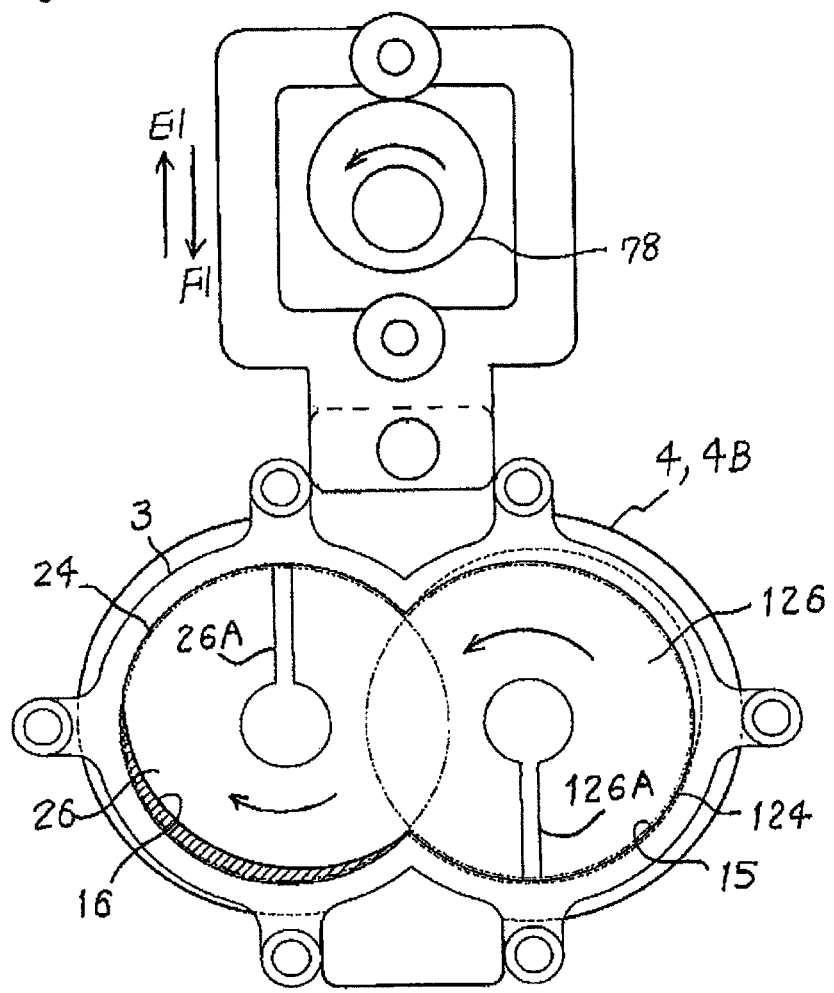
FIG. 44 is a cross-sectional view which is similar to that shown in FIG. 43 and illustrates a state in which the screw has further rotated from the position shown in FIG. 43.

The solid-liquid separator shown in FIGS. 38 to 42 has a single screw 24, but two or more screws can be also provided. FIG. 43 is a cross-sectional view of a solid-liquid separator in which two screws 24, 124 extend through the through holes 15 formed in the fixed members 3 and the through holes 16 formed in the movable members 4, 4B, and sludge is conveyed by the rotation of these screws 24, 124. The screws 24, 124 do not come into contact with the fixed members 3 or the movable members 4. FIG. 44 is a cross-sectional view illustrating a state attained when the screws 24, 124 have further rotated from the state shown in FIG. 43. In FIGS. 43 and 44, hatching representing the cross section of each member is omitted (same in FIGS. 45 to 48).

Figure 45:
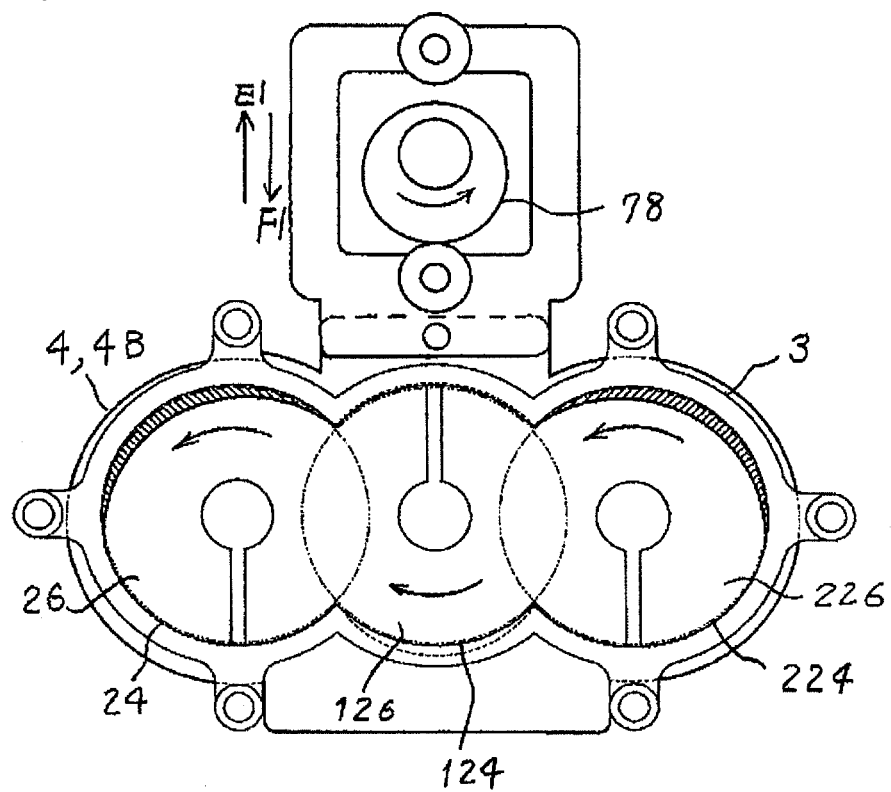
FIG. 45 is a cross-sectional view which is similar to that shown in FIG. 41 and shows a solid-liquid separator having three screws.
Figure 46:
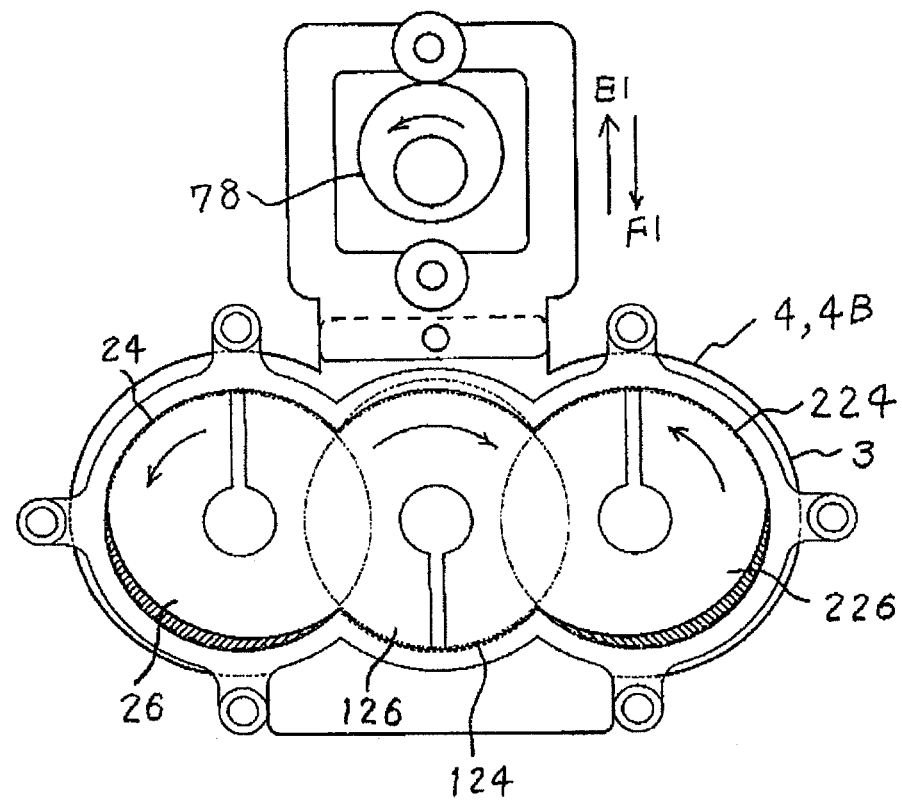
FIG. 46 is a cross-sectional view which is similar to that shown in FIG. 45 and illustrates a state in which the screw has further rotated from the position shown in FIG. 45.

FIG. 45 shows a solid-liquid separator having three screws 24, 124, 224. The screws 24, 124, 224 also extend via through holes formed in these members 3, 4, 4B and are rotationally driven in the direction shown by respective arrows, without coming into contact with the fixed members 3 or the movable members 4, 4B. FIG. 46 is a cross-sectional view illustrating the state attained after the screws 24, 124, 224 have further rotated from the state shown in FIG. 45.

Other features of the solid-liquid separator shown in FIGS. 43 to 46 are not substantially different from those of the solid-liquid separator shown in FIGS. 38 to 42, the eccentric cams 78 rotate following the rotation of the screws 24, 124, 224, and the movable members 4, 4B are thereby caused to perform a reciprocating movement in the directions of arrows E1, F1 in the same manner as in the solid-liquid separator shown in FIGS. 38 to 42.

In this case, parts of the blades 26, 126 of the screws 24, 124 are positioned in a state of overlapping, when the screws 24, 124 shown in FIGS. 43 and 44 are viewed in the direction of the center axis line thereof. Thus, when two screws 24, 124 are provided, the mutually adjacent screws 24, 124 should be rotated in the mutually opposite directions as shown by arrows in FIGS. 43 and 44 in order to prevent the blades 26, 126 of these screws 24, 124 from interfering with each other.

In the case of the solid-liquid separator shown in FIGS. 45 and 46, blades 26, 126, 226 of the mutually adjacent screws 24, 124, 224 partially overlap. Therefore, the mutually adjacent screws 24, 124, 224 are caused to rotate in the mutually opposite directions as shown by the arrows.

As shown by oblique hatching in FIGS. 43 to 46, the movable members 4, 4B present in the region in which penetration is possible perform a reciprocating movement, while penetrating closer to the center axis line than the outer circumferential edge of the screws 24, 224. In this case, in the example shown in the figure, the movable members 4, 4B do not penetrate into the blade of the screw 124 positioned adjacently to the screws 24, 224.

As follows from FIGS. 43 and 44, a cross-sectional portion 26A of the blade 26 of one screw 24 and the cross-sectional portion 126A of the blade 126 of the other screw 124 face in the mutually opposite directions. Therefore, when the movable members 4, 4B descend as shown in FIG. 43, the cross-sectional portion 26A of the blade 26 faces down, and the upper portions of the movable members 4, 4B penetrate into the blade of the screw 24, the cross-sectional portion 126A of the blade 126 of the other screw 124 faces up. Therefore, the upper portions of the movable members 4, 4B do not penetrate into the blade of the other screw 124. Thus, when the movable members 4, 4b are configured to penetrate into the blade of one screw from among the adjacent screws 24, 124, the solid-liquid separator should be configured such that the movable members 4, 4B do not penetrate into the blade of the other screw.

The same is true for the solid-liquid separator shown in FIGS. 45 and 46. When the movable members 4, 4B are configured to penetrate into the blades of the two screws 24, 224, the configuration is such that the movable members 4, 4B do not penetrate into the blade of the central screw 124. Conversely, where the movable members 4, 4B are configured to penetrate into the blade of the central screw 124, the configuration should be such that the movable members 4, 4B do not penetrate into the blades of both side screws 24, 224.

Figure 47:
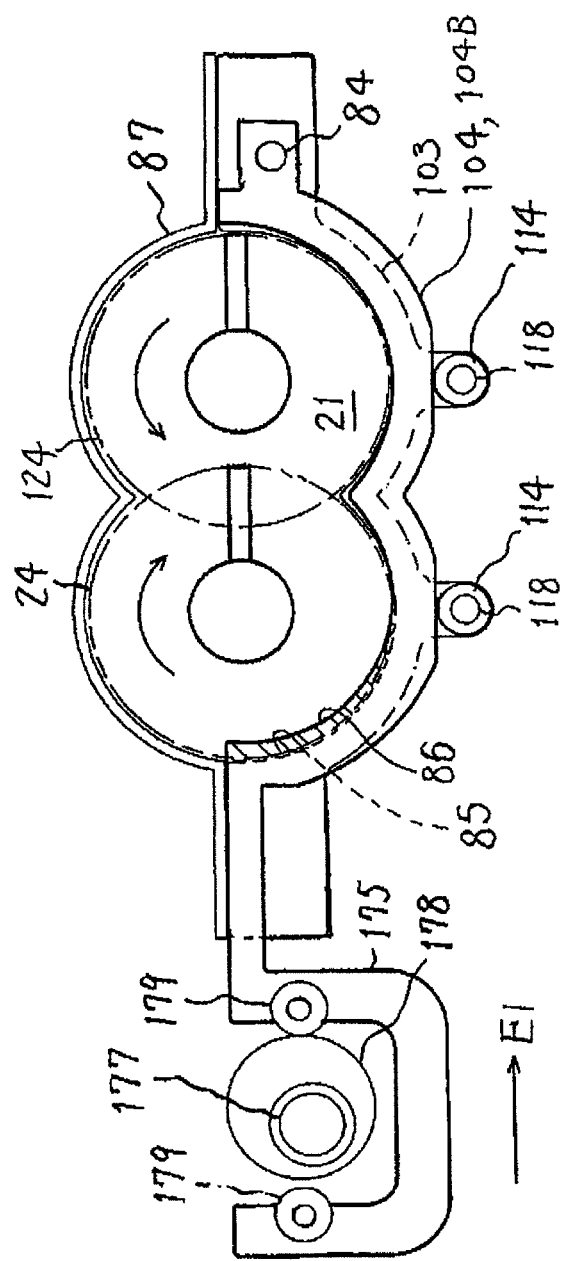
FIG. 47 is a cross-sectional view of a solid-liquid separator in which the movable member performs a reciprocating movement in the horizontal direction.
Figure 48:
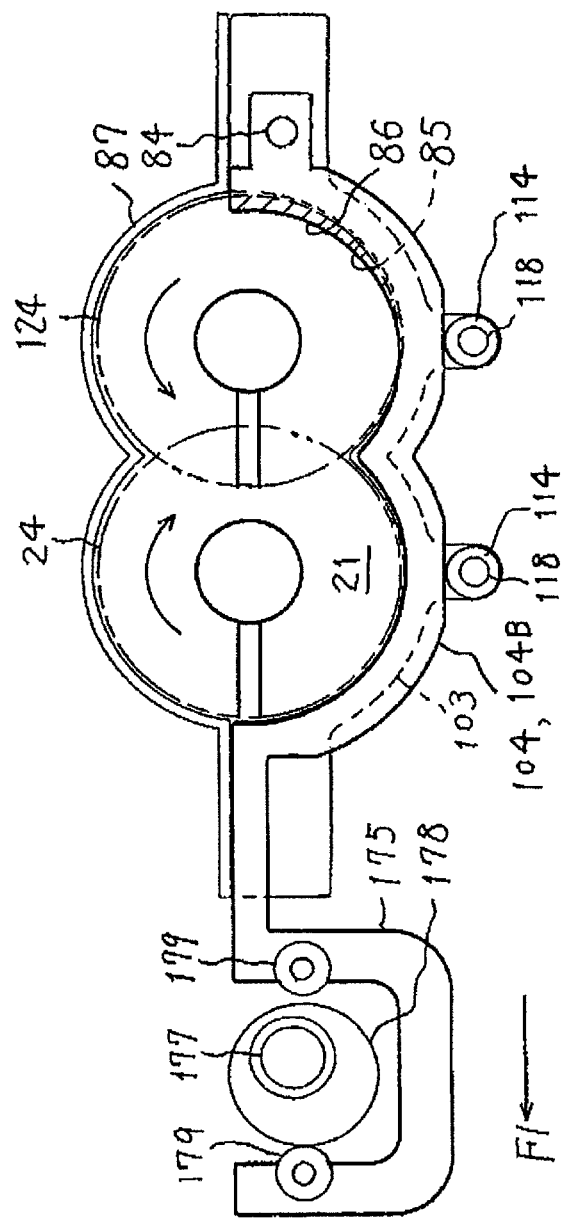
FIG. 48 is a cross-sectional view illustrating a state in which the movable member has further moved from the position shown in FIG. 47.

In the solid-liquid separator shown in FIGS. 47 and 48, a large number of fixed members 103 having a recess 85 formed in the upper portions thereof are disposed with a clearance in the axial direction formed by spacers 114, movable members 104 are disposed between the adjacent fixed members 103, and recesses 86 are also formed in the upper portion of the movable member 104. A plurality of fixed members 103 are fixedly connected by stay bolts 118, and two screws 24, 124 extend through the recesses 85, 86 of the fixed members 103 and the movable members 104 in a state without contact with the fixed members 103 and the movable members 104. These screws 24, 124 are also positioned in a state of partial overlapping, when viewed in the axial direction thereof. Therefore, in this case, too, the screws 24, 124 are rotationally driven in the mutually opposite directions, as shown by arrows, in order to prevent the screws from interfering with each other. The upper portions of the screws 24, 124 are covered with a cover 87.

When the screws 24, 124 are rotated, sludge is conveyed in a solid-liquid separation portion 21 demarcated by the recesses 85, 86 of the fixed members 103 and the movable members 104 and the cover 87, the filtrate flows down through the filtrate discharge gaps between the fixed members 103 and the movable members 104, and the cake-like sludge with a reduced water content ratio is discharged from the outlet port of the solid-liquid separation portion 21. The basic configuration of such solid-liquid separator is described in detail in JP-3638597-B and JP-4036383-B2.

The plurality of movable members 104 shown in FIG. 47 are connected by the connecting rod 84, and an arm 175 is integrally attached to some movable members 104B from among the plurality of movable members 104. A cam follower 179 is rotatably supported by the arm 175. An eccentric cam 178 is fixed to a rotationally driven shaft 177, and when the eccentric cam 178 is rotationally driven, the cam follower 179 and the movable member 104B move reciprocatingly in the direction shown by arrows E1, F1 in FIGS. 47 and 48. As a result, all of the movable members 104 move reciprocatingly. Solids of the sludge are thus prevented from clogging the gaps between the fixed members 103 and the movable members 104.

As shown by oblique hatching in FIGS. 47 and 48, in this solid-liquid separator, the movable members 104, 104B present in the region in which penetration is possible move reciprocatingly, while penetrating closer to the center axis line of the screws 24, 124 than the outer circumferential edge of the screws. Therefore, in this case, the sludge can be also dewatered with good efficiency.

The basic configuration of the solid-liquid separator shown in FIGS. 38 to 48 is by itself publicly known, as described in JP-4374396-B1.

Specific applications of the present invention to solid-liquid separators of various types are described hereinabove, but the present invention can be also applied to solid-liquid separators of other types, for example, solid-liquid separators described in JP-2000-135595-A and JP-2005-230852-A. Further, the present invention is not limited to the configurations described in the aforementioned embodiments and can be modified in a variety of ways.

LIST OF REFERENCE SYMBOLS

3, 103 fixed member,
4, 4A, 4B, 54, 54A, 104, 104A, 104B movable member,
15, 16, 16A, 16B through hole,
21 solid-liquid separation portion,
23 outlet port,
24, 124, 224 screw,
25 shaft,
26, 126, 226 blade,
32 outer circumferential edge,
33, 33A blade portion,
35 circumferential edge,
36 protruding section,
57, 157, 57A, 157A eccentric cam,
58, 158, 58A, 158A outer circumferential surface,
59, 159, 59A, 159A bearing,
60, 160, 60A, 160A cam hole,
61, 161, 61A, 161A connection plate,
66, 66A connecting rod,
69, 69A guide,
"g" filtrate discharge gap,
"H", "HA" straight line,
"I" virtual tube,
"J", "JA" outer circumferential edge crossing point,
"K" shortest distance,
"L", "LA" center parallel line,
"M", "MA" blade crossing point,
"N", "NA" center point,
"R" length,
"S" radius
"X", "Y", "YA", "YB" center axis line,
"Z", "ZA" region of possible penetration,
"δ" eccentricity

What is claimed is:

1. A solid-liquid separation device comprising:
a plurality of fixed members and movable members movably disposed between adjacent fixed members of the plurality of fixed members;
at least one screw extending through the fixed members and the movable members in a state where the screw is not in contact with the fixed members and the movable members, the screw being rotationally driven about a center axis line, an object to be treated that has penetrated into a solid-liquid separation portion demarcated by the fixed members and the movable members being caused to move toward an outlet of the solid-liquid separation portion by rotation of the screw, and a filtrate separated from the object to be treated being discharged to the outside of the solid-liquid separation portion through filtrate discharge gaps between the fixed members and the movable members, the object to be treated having a reduced liquid content ratio being discharged from the outlet to the outside of the solid-liquid separation portion,
at least one part of the movable members being movable to be synchronized with the driving of the screw through an eccentric mechanism, while penetrating closer to a center axis line of the screw than an outer circumferential edge of a blade of the screw, without coming into contact with the screw.

2. The solid-liquid separation device as recited in claim 1 wherein the at least one screw is a single screw having one blade extending spirally and through holes are formed in the fixed members and the movable members, the screw extending through the through holes of the fixed members and the movable members, a center axis line of the through holes of the movable members being decentered from the center axis line of the screw, the movable members performing a circular movement while the center axis line of the through holes of the movable members describes a circle with a radius equal to an amount of an eccentricity by the decentering around the center axis line of the screw, and in a case where a point in which a straight line drawn from the center axis line of the through hole of the movable member toward the center axis line of the screw in a radial direction of the screw crosses a virtual tube including the outer circumferential edge of the screw after passing beyond the center axis line of the screw is taken as an outer circumferential edge crossing point, a straight line passing through the outer circumferential edge crossing point and extending parallel to the center axis line of the screw is taken as a center parallel line, and points of the center parallel line crossing two blade portions of the screw adjacent in the direction of the center axis line of the screw are taken as respective blade crossing points, the movable member that performs the circular movement, while penetrating closer to the center axis line of the screw than the outer circumferential edge of the blade of the screw, is positioned within a region in which penetration is possible that includes a center point of the two blade crossing points and has a predetermined width in the center axis line direction of the screw, with the predetermined width being narrower than a distance between the two blade portions, and in a case where the shortest distance from the center axis line of the through hole of the movable member to a circumferential edge of the movable member demarcating the through hole is denoted by "K", the radius of the screw is denoted by "S", and the eccentricity is denoted by "δ", the through hole of the movable member performing the circular movement, while penetrating closer to the center axis line of the screw than the outer circumferential edge of the blade of the screw, is formed such that S−δ<K<S+δ is satisfied.

3. The solid-liquid separation device as recited in claim 1 wherein the at least one screw is a single screw having one blade extending spirally and through holes are formed in the fixed members and the movable members, the screw extending through the through holes of the fixed members and the movable members, the screw having a shaft formed integrally with the blade, the shaft constitutes a center portion of the screw, eccentric cams having a round outer circumferential surface being fixed to the shaft of the screw, with the cams being decentered from the center axis line of the shaft of the screw, the movable members being connected to the eccentric cams so that the movable members perform a circular movement with a radius equal to an eccentricity of the eccentric cams, and in a case where a point in which a straight line drawn from the center axis line of the eccentric cams toward the center axis line of the screw in a radial direction of the screw crosses a virtual tube including the outer circumferential edge of the screw after passing beyond the center axis line of the screw is taken as an outer circumferential edge crossing point, a straight line passing through the outer circumferential edge crossing point and extending parallel to the center axis line of the screw is taken as a center parallel line, and points of the center parallel line crossing two blade portions of the screw that are adjacent in the direction of the center axis line of the screw are taken as respective blade crossing points, the movable member performing the circular movement, while penetrating closer to the center axis line of the screw than the outer circumferential edge of the blade of the screw, being positioned within a region in which penetration is possible and which includes a center point of the two blade crossing points and has a predetermined width in the center axis line direction of the screw, with the predetermined width being narrower than the distance between the two blade portions, and in a case where the shortest distance from the center axis line of the eccentric cams to a circumferential edge of the movable member demarcating the through hole of the movable member is denoted by "K", the radius of the screw is denoted by "S", and the eccentricity is denoted by "δ", the through hole of the movable member that performs the circular movement, while penetrating closer to the center axis line of the screw than the outer circumferential edge of the blade of the screw, is formed such that S−δ<K<S+δ is satisfied.

4. The solid-liquid separation device as recited in claim 3 wherein all of the center axis lines of the through holes of the one part of the movable members coincide; all of the center axis lines of the through holes of the other part of the movable members also coincide; the center axis lines of the through holes of the one part of the movable members and the center axis lines of the through holes of the other part of the movable members do not coincide with each other; and the one part of the movable members and the other part of the movable members perform circular movements while the center axis lines of the through holes thereof describe circles with a radius equal to an eccentricity of the center axis lines of the through holes of the movable members around the center axis line of the screw.

5. The solid-liquid separation device as recited in claim 3 wherein a plurality of the eccentric cams have center axis lines that do not coincide with each other, and the plurality of eccentric cams rotate while the center axis lines thereof describe circles with a radius equal to the eccentricity of the center axis lines of the eccentric cams around the center axis line of the screw.

6. The solid-liquid separation device as recited in claim 2 wherein the screw has a shaft formed integrally with the blade, the shaft constituting a center portion of the screw, the center axis line of the through holes of the movable members being decentered from a center axis line of the shaft of the screw, the solid-liquid separation device further includes a connection for connecting the plurality of movable members such that the plurality of movable members can together perform a circular movement, eccentric cams that are decentered from the center axis line of the shaft of the screw and rotate integrally with the shaft, and bearings connected to the connection and provided with round cam holes mating with round outer circumferential surfaces of the eccentric cams, round outer circumferential surfaces of the eccentric cams slidably abutting along an entire circumference thereof on inner circumferential surfaces of the round cam holes of the bearings, the center axis line of the eccentric cams and the center axis line of the through holes of the plurality of movable members connected by the connection means coinciding with each other, the eccentric cams rotating following the rotation of the screw while the center axis line of the eccentric cams describes a circle with a radius equal to the eccentricity of the eccentric cams around the center axis line of the shaft of the screw, and as a result of the rotation the plurality of movable members connected by the connection perform a circular movement while the center axis line of the through holes thereof describes a circle with a radius equal to the eccentricity of the eccentric cams around the center axis line of the shaft of the screw.

7. The solid-liquid separation device as recited in claim 2 wherein the screw has a shaft formed integrally with the blade, the shaft constituting a center portion of the screw, the center axis line of the through holes of the movable members being decentered from a center axis line of the shaft of the screw, all of the center axis lines of the through holes of one part of the plurality of movable members coinciding with each other, all of the center axis lines of the through holes of another part of the plurality of movable members coinciding with each other, the solid-liquid separation device further comprising a first connection for connecting the one part of the plurality of movable members such that the one part of the plurality of movable members can together perform a circular movement, first eccentric cams that are decentered from the center axis line of the shaft of the screw and rotate integrally with the shaft, first bearings connected to the first connection and provided with round cam holes mating with round outer circumferential surfaces of the first eccentric cams, and a second connection for connecting the other part of the plurality of movable members such that the other part of the plurality of movable members can together perform a circular movement, second eccentric cams that are decentered from the center axis line of the shaft of the screw and rotate integrally with the shaft, and second bearings connected to the second connection and provided with round cam holes mating with round outer circumferential surfaces of the second eccentric cams, wherein the center axis line of the first eccentric cams and the center axis line of the second eccentric cams do not coincide with each other, the round outer circumferential surfaces of the first eccentric cams slidably abutting along the entire circumference thereof on inner circumferential surfaces of the round cam holes of the first bearings, the round outer circumferential surfaces of the second eccentric cams slidably abut along the entire circumference thereof on inner circumferential surfaces of the round cam holes of the second bearings, the center axis line of the first eccentric cams and the center axis line of the through holes of the one part of the plurality of movable members connected by the first connection coinciding with each other, the center axis line of the second eccentric cams and the center axis line of the through holes of the other part of the plurality of movable members connected by the second connection means also coincide with each other, the first eccentric cams rotate following the rotation of the screw while the center axis line of the first eccentric cams describes a circle with a radius equal to the eccentricity of the first eccentric cams around the center axis line of the shaft of the screw, and as a result of the rotation the one part of the plurality of movable members connected by the first connection performs a circular movement while the center axis line of the through holes thereof describes a circle with a radius equal to the eccentricity of the first eccentric cams around the center axis line of the shaft of the screw, the second eccentric cams rotate while the center axis line of the second eccentric cams describes a circle with a radius equal to the eccentricity of the second eccentric cams around the center axis line of the shaft of the screw, and as a result of the rotation the other part of the plurality of movable members connected by the second connection perform a circular movement while the center axis line of the through holes thereof describes a circle with a radius equal to the eccentricity of the second eccentric cams around the center axis line of the shaft of the screw.

8. The solid-liquid separation device as recited in claim 3 further comprising:
a connection for connecting the plurality of movable members so that the plurality of movable members can together perform a circular movement; and bearings connected to the connection and having round cam holes that mate with round outer circumferential surfaces of the eccentric cams,
the round outer circumferential surfaces of the eccentric cams slidably contacts the entire circumference thereof on inner circumferential surfaces of the round cam holes of the bearings, and following the rotation of the screw the eccentric cams rotate while the center axis line thereof describes a circle with a radius equal to the eccentricity of the eccentric cams around the center axis line of the shaft of the screw, and as a result the plurality of movable members connected by the connection performs a circular movement with a radius equal to the eccentricity of the eccentric cams.

9. The solid-liquid separation device as recited in claim 3 wherein first eccentric cams formed with a round outer circumferential surface are fixed to the shaft of the screw by being decentered from the center axis line of the shaft of the screw, and second eccentric cams formed with a round outer circumferential surface are also fixed to the shaft of the screw by being decentered from the center axis line of the shaft of the screw, the center axis line of the first eccentric cams and the center axis line of the second eccentric cams do not coincide with each other, the one part of the plurality of movable members being connected to the first eccentric cams so that the one part of the plurality of movable members perform circular movement with a radius equal to the eccentricity of the first eccentric cams, and the other part of the plurality of movable members are connected to the second eccentric cams so that the other part of the plurality of movable members perform circular movement with a radius equal to the eccentricity of the second eccentric cams.

10. The solid-liquid separation device as recited in claim 9 further comprising a first connection for connecting the one part of the plurality of movable members so that the one part of the plurality of movable members can together perform a circular movement, first bearings connected to the first connection and having round cam holes that mate with round outer circumferential surfaces of the first eccentric cams, a second connection for connecting the other part of the plurality of movable members so that the other part of the plurality of movable members can together perform a circular movement, and second bearings connected to the second connection and having round cam holes that mate with round outer circumferential surfaces of the second eccentric cams,
the round outer circumferential surfaces of the first eccentric cams slidably abutting along the entire circumference thereof on inner circumferential surfaces of the round cam holes of the first bearings, the round outer circumferential surfaces of the second eccentric cams slidably abutting along the entire circumference thereof on inner circumferential surfaces of the round cam holes of the second bearings, and following the rotation of the screw the first eccentric cams rotate while the center axis line thereof describes a circle with a radius equal to the eccentricity of the first eccentric cams around the center axis line of the shaft of the screw, as a result the one part of the plurality of movable members connected by the first connection perform a circular movement with a radius equal to the eccentricity of the first eccentric cams, and the second eccentric cams rotate while the center axis line thereof describes a circle with a radius equal to the eccentricity of the second eccentric cams around the center axis line of the shaft of the screw, as a result the other part of the plurality of movable members connected by the second connection perform a circular movement with a radius equal to the eccentricity of the second eccentric cams.

11. The solid-liquid separation device as recited in claim 10 further comprising: a first guide that prevents the first connection from rotating about the center axis line of the shaft of the screw together with the one part of the plurality of movable members connected by the first connection and preventing the movable members from abutting on other members; and a second guide that prevents the second connection from rotating about the center axis line of the shaft of the screw together with the other part of the plurality of movable members connected by the second connection and preventing the movable members from abutting on other members.

12. The solid-liquid separation device as recited in claim 7 further comprising: a first guide that prevents the first connection from rotating about the center axis line of the shaft of the screw together with the one part of the plurality of movable members connected by the first connection and preventing the movable members from abutting on other members; and a second guide that prevents the second connection from rotating about the center axis line of the shaft of the screw together with the other part of the plurality of movable members connected by the second connection and preventing the movable members from abutting on other members.

13. The solid-liquid separation device as recited in claim 2 wherein all of the center axis lines of the through holes of the one part of the movable members coincide; all of the center axis lines of the through holes of the other part of the movable members also coincide; the center axis lines of the through holes of the one part of the movable members and the center axis lines of the through holes of the other part of the movable members do not coincide with each other; and the one part of the movable members and the other part of the movable members perform circular movements while the center axis lines of the through holes thereof describe circles with a radius equal to an eccentricity of the center axis lines of the through holes of the movable members around the center axis line of the screw.

\* \* \* \* \*